(12) United States Patent
Jones et al.

(10) Patent No.: US 9,037,560 B2
(45) Date of Patent: May 19, 2015

(54) METHOD AND SYSTEM FOR TRIGGERING A SEARCH REQUEST

(75) Inventors: Scott A. Jones, Carmel, IN (US); Thomas E. Cooper, Indianapolis, IN (US)

(73) Assignee: ChaCha Search, Inc.

( * ) Notice: Subject to any disclaimer, the term of this patent is extended or adjusted under 35 U.S.C. 154(b) by 363 days.

(21) Appl. No.: 12/398,454

(22) Filed: Mar. 5, 2009

(65) Prior Publication Data

US 2009/0228464 A1      Sep. 10, 2009

Related U.S. Application Data

(60) Provisional application No. 61/033,976, filed on Mar. 5, 2008, provisional application No. 61/033,980, filed on Mar. 5, 2008, provisional application No. 61/044,994, filed on Apr. 15, 2008.

(51) Int. Cl.
   *G06F 7/00*      (2006.01)
   *G06F 17/30*     (2006.01)
   *G06Q 50/10*     (2012.01)
   *G06Q 30/02*     (2012.01)

(52) U.S. Cl.
   CPC .......... *G06Q 50/10* (2013.01); *G06F 17/30522* (2013.01); *G06Q 30/0255* (2013.01)

(58) Field of Classification Search
   CPC ................................................. G06F 17/30867
   USPC .......................................................... 707/705
   See application file for complete search history.

(56) References Cited

U.S. PATENT DOCUMENTS

| 5,555,376 A   | 9/1996  | Theimer |
| 5,592,664 A * | 1/1997  | Starkey ............................... 1/1 |
| 6,226,630 B1  | 5/2001  | Billmers |
| 6,594,654 B1  | 7/2003  | Salam |
| 6,654,749 B1  | 11/2003 | Nashed |
| 6,763,349 B1  | 7/2004  | Sacco |
| 6,779,019 B1* | 8/2004  | Mousseau et al. ............ 709/206 |
| 6,856,967 B1  | 2/2005  | Woolston |
| 6,873,982 B1  | 3/2005  | Bates |
| 7,080,069 B2  | 7/2006  | Abe |
| 7,117,207 B1  | 10/2006 | Kerschberg |
| 7,162,480 B2  | 1/2007  | Vishik |
| 7,200,563 B1  | 4/2007  | Hammitt |
| 7,376,649 B2  | 5/2008  | Yang |

(Continued)

FOREIGN PATENT DOCUMENTS

WO    WO 2007/052285    5/2007

OTHER PUBLICATIONS

Search Report for corresponding application PCT/US 09/36174, dated Apr. 20, 2009.

(Continued)

*Primary Examiner* — Fred I Ehichioya
*Assistant Examiner* — Kris Mackes
(74) *Attorney, Agent, or Firm* — Staas and Halsey

(57) ABSTRACT

A method and system providing a response to an unrestricted request for information responsive to an unrestricted triggering condition. A request is associated with a condition which initiates an information search. A result associated with a request and a condition may be provided to a user via any or all communication services and/or devices associated with the user. A response may be delivered according to instructions from a user.

20 Claims, 25 Drawing Sheets

(56) References Cited

U.S. PATENT DOCUMENTS

| | | | |
|---|---|---|---|
| 2002/0013711 A1 | 1/2002 | Ahuja | |
| 2003/0004838 A1* | 1/2003 | Kusuda et al. | 705/27 |
| 2003/0023584 A1* | 1/2003 | Brandin | 707/3 |
| 2003/0061060 A1 | 3/2003 | Tenorio | |
| 2003/0120662 A1 | 6/2003 | Vishik | |
| 2004/0002972 A1* | 1/2004 | Pather et al. | 707/6 |
| 2004/0193593 A1 | 9/2004 | Sacco | |
| 2004/0230572 A1 | 11/2004 | Omoigui | |
| 2004/0268419 A1 | 12/2004 | Danker | |
| 2005/0065773 A1 | 3/2005 | Huang | |
| 2005/0097188 A1 | 5/2005 | Fish | |
| 2005/0105712 A1 | 5/2005 | Williams | |
| 2005/0138115 A1 | 6/2005 | Llamas | |
| 2005/0165743 A1 | 7/2005 | Bharat | |
| 2005/0234957 A1 | 10/2005 | Olson | |
| 2005/0262005 A1 | 11/2005 | Woolston | |
| 2005/0283753 A1* | 12/2005 | Ho et al. | 717/102 |
| 2006/0018551 A1 | 1/2006 | Patterson | |
| 2006/0020571 A1 | 1/2006 | Patterson | |
| 2006/0020607 A1 | 1/2006 | Patterson | |
| 2006/0031195 A1 | 2/2006 | Patterson | |
| 2006/0036563 A1* | 2/2006 | Wu | 706/59 |
| 2006/0106792 A1 | 5/2006 | Patterson | |
| 2006/0106847 A1 | 5/2006 | Eckardt | |
| 2006/0242190 A1 | 10/2006 | Wnek | |
| 2006/0282312 A1* | 12/2006 | Carlson et al. | 705/14 |
| 2006/0286530 A1 | 12/2006 | Forrest | |
| 2007/0061244 A1 | 3/2007 | Ramer | |
| 2007/0073678 A1 | 3/2007 | Scott | |
| 2007/0073745 A1 | 3/2007 | Scott | |
| 2007/0081197 A1 | 4/2007 | Omoigui | |
| 2007/0112765 A1 | 5/2007 | Vishik | |
| 2007/0174389 A1* | 7/2007 | Armstrong et al. | 709/204 |
| 2007/0185843 A1 | 8/2007 | Jones | |
| 2007/0208688 A1 | 9/2007 | Bandhole | |
| 2007/0260591 A1 | 11/2007 | Ahi | |
| 2007/0266164 A1 | 11/2007 | Balfanz | |
| 2007/0282795 A1 | 12/2007 | Mashinsky | |
| 2008/0243828 A1* | 10/2008 | Reztlaff et al. | 707/5 |

OTHER PUBLICATIONS

A Personalizable Agent for Semantic Taxonomy-Based Web Search Larry Kerschberg, et al., E-Center for E-Business, George Mason University, 2003.

Semantic Taxonomy Induction from Heterogenous Evidence, Rion Snow, et al., 2006.

Learning for Automatic Personalization in a Semantic Taxonomy-Based Meta-Search Agent, Wooju Kim et al, Available online Sep. 27, 2002.

* cited by examiner

300

USER RECORD

| | Description | Example Content |
|---|---|---|
| 305 | User record ID | '502.331.2204 - 4772' |
| 310 | User channel identifier | '502.331.2204';'usertom@chacha.com' |
| 315 | User request list | '502.331.2204,12.12.08, 13 October 2006'; 'usertom@chacha.com,12.48.08, 13 October 2006' |

TRIGGER RESOURCE RECORD

| | Description | Example Content |
|---|---|---|
| 505 | Trigger resource record ID | 'sports scores' |
| 510 | Trigger resource channel ID | '317.331.2224'; 'scores@sportsscores.com'; 'www.sportsscores.com' |
| 515 | Trigger resource request ID | '502.331.2204,12.12.08, 13 October 2006'; '317.455.3301,12.48.08, 14 October 2006' |
| 520 | Trigger resource keyword ID | '"basketball";"indiana university";"NCAA";"NFL";"NHL"' |

RESULT RECORD

| | Description | Example Content |
|---|---|---|
| 605 | Result record ID | 'indiana 46, illinois 34 2:15 2H' |
| 610 | Result keyword ID | '"indiana university";"university of Illinois";"basketball"' |

GUIDE RECORD

| | Description | Example Content |
|---|---|---|
| 405 | Guide record ID | 'Bob Smith' |
| 410 | Guide channel identifier | '317.244.2444';'guidebob@chacha.com' |
| 415 | Guide request ID | '502.331.2204,12.12.08, 13 October 2006'; '317.455.3301,12.48.08, 13 October 2006' |
| 420 | Guide rating | 'Master - Voice' |
| 425 | Guide keyword ID | '"indiana";"basketball"' |

KEYWORD RECORD

|  | Description | Example Content |
|---|---|---|
| 705 | Keyword record ID | 'indiana university' |
| 710 | Keyword result ID | 'indiana 46, illinois 34 2:15 2H'; 'indiana 58, northwestern 48 final'; 'indiana 40, illinois 28 7:18 2H' |
| 715 | Keyword resource ID | 'sports scores'; 'colleges and universities'; 'indiana university calendar' |
| 720 | Keyword Result rating | '5';'2';'1.2' |
| 725 | Trigger resource rating | '5';'3';'1.5' |

REQUEST RECORD

|  | Description | Example Content |
|---|---|---|
| 805 | Request record ID | '502.331.2204,12.12.08, 13 October 2006' |
| 810 | Request user ID | '502.331.2204 - 4772';'mike 883' |
| 815 | Request guide ID | 'bob smith' |
| 820 | Request keyword ID | 'indiana university basketball score';'score';'basketball score' |
| 825 | Request result ID | 'indiana 46, illinois 34 2:15 2H'; 'indiana 40, illinois 28 7:18 2H' |
| 830 | Request trigger condition | 'elapsed time = 5 minutes' AND 'last result is not final' |
| 835 | Request trigger resource ID | 'calendar = minutes';'sports scores' |

CATEGORY RECORD

|  | Description | Example Content |
|---|---|---|
| 905 | Category record ID | 'Sports>NCAA' |
| 910 | Category resource ID | 'www.sportsinfo.com'; 'www.basketballscores.com' |
| 915 | Category resource rating | 'A';'B-' |

CATEGORIZATION RECORD

|  | Description | Example Content |
|---|---|---|
| 1805 | Categorization record ID | 'arts>music>jazz' |
| 1810 | Guide ID list | 'guide1';<br>'guide2';<br>'guide3' |
| 1815 | Guide rating list | '3';'5';'7' |
| 1820 | Guide Interests list | 'miles davis';'silvano monasterios'<br>'sara montes';<br>'sara montes'; 'daniel smith' |
| 1825 | Linked category ID list | 'shopping>music>jazz';<br>'arts>music';<br>'arts>music>jazz>artists'; |
| 1830 | Linked category function | '-0.5';'-1.2';'-0.8' |
| 1835 | Advertisement ID list | 'indiana jazz festival';<br>'www.cheaptickets.com' |
| 1840 | Advertisement rating list | '7';'7.3' |
| 1845 | Resource ID list | 'www.jazzismything.org';'www.jazzwiki.org';<br>'chicagoconcerts.org_17.dec.07' |
| 1850 | Resource rating list | 'A';'b-3';'6' |

| Categorization record ID (1805) | Cat. guide ID (1810) | Cat guide rating (1815) | Cat guide interests (1820) | Linked category ID (1825) | Linked category function (1830) |
|---|---|---|---|---|---|
| 'arts>music>jazz' (1800a) | 'guide1'; 'guide2'; 'guide3' | '3'; '5'; '7' | 'miles davis', 'silvano monasterios'; 'sara montes'; 'sara montes', 'daniel smith' | 'shopping>music>jazz'; 'arts>music'; 'arts>music>jazz>artists' | '-0.5'; '-1.2'; '-0.8' |
| 'arts>music' (1800b) | 'guide4'; 'guide5' | '3'; '5' | ........ | 'arts>music>jazz'; 'arts>music>rock'; 'shopping>music' | '-0.7'; '-0.8'; '-1.4' |
| 'arts>music>jazz>artists' (1800c) | 'guide6'; 'guide7' | '9'; '6' | ........ | 'arts>music>jazz'; 'shopping>restaurants>neworleans' | '-0.6'; '(+0.3)*0.7' |
| 'shopping>music>jazz' (1800d) | 'guide8' | '6' | ........ | 'arts>music>jazz>live' | '*0.8' |
| ...... | | | | | |

2200
USER RECORD

| Description | Example Content |
|---|---|
| 2205 User record ID | '502.331.2204 - 4772' |
| 2210 User channel ID | '502.331.2204';'usertom@chacha.com' |
| 2215 User request ID | '502.331.2204,12.12.08, 13 October 2006'; 'usertom@chacha.com,12.48.08, 13 October 2006' |

FIG. 22

2300
GUIDE RECORD

| Description | Example Content |
|---|---|
| 2305 Guide record ID | 'guide6' |
| 2310 Guide channel ID | '317.244.2444';'guidebob@chacha.com' |
| 2315 Guide request ID | '502.331.2204,12.12.08, 13 October 2006'; '502.455.3301,12.48.08, 13 October 2006' |
| 2320 Guide rating | 'Master - Voice' |
| 2325 Guide category ID | 'shopping>music>jazz'; 'science>chemistry>organic'; 'recreation>games>tennis'; 'sports>professional>bass fishing' |
| 2330 Guide interests ID | 'john coltrane';'thelonius monk'; 'synthesis'; 'history of the game'; 'oregon';'utah' |

FIG. 23

2400
TAXONOMIST RECORD

| Description | Example Content |
|---|---|
| 2405 Taxonomist record ID | 'taxonomist1' |
| 2410 Taxonomist channel ID | '317.331.2224'; 'taxpayer@taxonomist1.name'; 'www.blogspace.com/taxonomist1' |
| 2415 Taxonomist authorization information | 'arts>music_all'; 'geography>world_readonly' |
| 2420 Taxonomist rating list | '7.0';'rookie' |

FIG. 24

2500
REQUEST RECORD

| Description | Example Content |
|---|---|
| 2505 Request record ID | '502.331.2204,12.12.08, 13 October 2006' |
| 2510 Structured query ID | 'where is live jazz in chicago tonight' |
| 2515 User ID | '502.331.2204 - 4772' |
| 2520 Categorization ID | 'arts>music>jazz' |
| 2525 Guide ID | 'guide6';'guide1' |
| 2530 Advertisement ID | 'cheaptickets.com';'jazzmusicmp3' |
| 2535 Result ID | 'chicagoconcerts.org_17.dec.07' |
| 2540 Resource ID | 'www.chicagoconcerts.org' |

FIG. 25

2600
RESULT RECORD

|  | Description | Example Content |
|---|---|---|
| 2605 | Result record ID | 'chicagoconcerts.org_17.dec.07' |
| 2610 | Result categorization ID | 'arts>music>jazz'; 'shopping>music>jazz' |
| 2615 | Result access info | 'nora jones is live at the house of blues 8PM 17.dec.07' 'www.chicagoconcerts.org' |
| 1220 | Result rating | '7th'; '10' |

FIG. 26

2700
RESOURCE RECORD

|  | Description | Example Content |
|---|---|---|
| 2705 | Resource record ID | 'www.chicagoconcerts.org\schedules'_12.dec.07 |
| 2710 | Resource categorization list | 'arts>music>jazz'; 'arts>music>chicago'; 'regional>entertainment>chicago' |
| 2715 | Resource access info | 'www.chicagoconcerts.org' |

FIG. 27

2800
ADVERTISEMENT RECORD

|  | Description | Example Content |
|---|---|---|
| 2805 | Advertisement record ID | 'cheaptickets.com' |
| 2810 | Advertisement categorization ID | 'arts>music>jazz'; 'entertainment>concerts>tickets' |
| 2815 | Advertisement access info | banner_'www.cheaptickets.com/online'; audio_'www.cheaptickets.com/audio' |

Welcome Vikram Kumar — 3105

Home | Manage Index | Manage Requests | Logout
       3110c              3110b              3110a ChaCha® Taxonomy Tool
       3505

Administration  | Manage Categories |

Pending Categories/Topics — 3510

| Category | Topic | Verify | Comments |
|---|---|---|---|
| arts.music.jazz.neworleans | | ☐ 3520a | New Orleans is about jazz |
| arts.music.jazz.1960s | 1960's | ☐ 3520b | Donald Fagen is cool |
| shopping.music.jazz.arts | | ☐ 3520c | I like this order of words |
| sports.poker.professional | | ☑ 3520d | We all like it |
| amateur.sports.poker | | ☐ 3520e | Can't find this |

3512   3515   3520   3525

3530

3535  3540  3545
[Accept] [Cancel] [Clear]

FIG. 35

METHOD AND SYSTEM FOR TRIGGERING A SEARCH REQUEST

CROSS-REFERENCE TO RELATED APPLICATIONS

This application is related to and claims the benefit of priority to U.S. Provisional Application Ser. No. 61/033,976entitled "METHOD AND SYSTEM FOR TRIGGERING A SEARCH REQUEST" by Scott A. Jones, et al. filed Mar. 5, 2008, U.S. Provisional Application Ser. No. 61/033,980 entitled, "METHOD AND SYSTEM FOR CREATION OF AN INDEX" by Scott A. Jones, et al. filed Mar. 5, 2008, and U.S. Provisional Application Ser. No. 61/044,994 entitled, "METHOD AND SYSTEM FOR MARKETING USING AFFILIATE MESSAGING" by Scott A. Jones, et al. filed Apr. 15, 2008, in the United States Patent and Trademark Office, the disclosures of which are incorporated herein by reference.

BACKGROUND

1. Field

The invention relates to search engine technology and specifically to search engines which utilize human searcher(s) or guide(s). A method and system is disclosed whereby a search request may be modified to become a triggered search request.

2. Description of the Related Art

In current search systems, a user may submit a request which may include words, phrases and/or other information. A user may receive a result responsive to a request. Likewise, a user may elect to receive a notification regarding information from various sources. For example, a user may receive an alert via text, email, or other forms of messaging when a specific trigger event occurs, such as a change in a stock price, a final or partial score in an athletic event, a news alert, etc. Such alerts may be received by selecting from a menu of items offered by various service providers such as brokerage houses, telecommunications providers, news services, etc. A user may subscribe to such services using various mechanisms such as a web service, a text message service, e-mail or other types of communication services.

However there is no known method or system whereby a person is able to obtain a response to an unconstrained request for information which is triggered based on an unconstrained condition. Currently a user must find a service which can provide the information desired and may then needs to find a service or resource which can provide triggered access to the requested information, which may not be available.

In light of this, a method and system whereby a user of search services may associate any search query with any trigger condition is needed.

SUMMARY

A system and method is provided whereby a user may submit a request for information to a search system, and may designate the request for information to be triggered based on an unconstrained condition(s). Any type of user request may be converted into a triggered request. A human guide may be utilized to clarify a request and/or identify a result(s) and/or a resource(s) which may provide information which may be used to trigger or initiate a request. If a trigger condition occurs, a request is initiated and a result is provided to a user(s). A user may be presented with a result(s) responsive to a request using communication information provided by the user. A result(s) and/or a notification(s) may be provided to a user based on a triggered request. A request history is maintained which may be made available for review by a user.

These together with other aspects and advantages which will be subsequently apparent, reside in the details of construction and operation as more fully hereinafter described, reference being had to the accompanying drawings forming a part hereof, wherein like numerals refer to like parts throughout.

BRIEF DESCRIPTION OF THE DRAWINGS

Aspects and advantages of the invention will become apparent and more readily appreciated from the following description of the embodiments, taken in conjunction with the accompanying drawings, of which:

FIG. 3 illustrates a database record for a user.
FIG. 4 illustrates a database record for a guide.
FIG. 5 illustrates a database record for a resource.
FIG. 6 illustrates a database record for a search result.
FIG. 7 illustrates a database record for a keyword.
FIG. 8 illustrates a database record for a search request.
FIG. 9 illustrates a database record for a category.
FIG. 18 illustrates an exemplary categorization record.
FIG. 19 illustrates a database relationship.
FIG. 22 illustrates a database record for a user.
FIG. 23 illustrates a database record for a guide.
FIG. 24 illustrates a database record for a taxonomist.
FIG. 25 illustrates a database record for a search request.
FIG. 26 illustrates a database record for a search result.
FIG. 27 illustrates a database record for a search resource.
FIG. 28 illustrates a database record for an advertisement.
FIG. 35 illustrates a GUI.

DETAILED DESCRIPTION OF THE PREFERRED EMBODIMENTS

Figure 1:
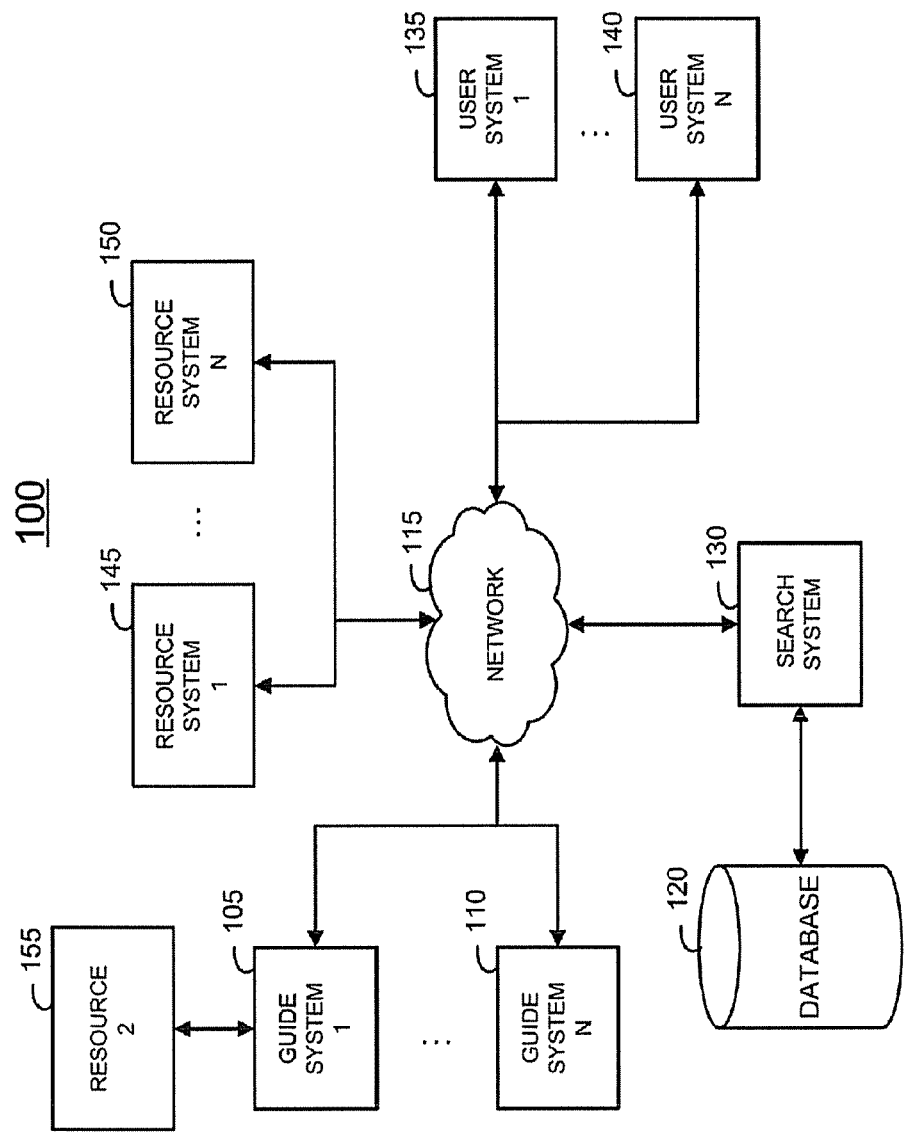
FIG. 1 is a block diagram of an exemplary system embodiment.

Reference will now be made in detail to the present embodiments discussed herein, examples of which are illustrated in the accompanying drawings, wherein like reference numerals refer to the like elements throughout. The embodiments are described below to explain the disclosed system and method by referring to the figures. It will nevertheless be understood that no limitation of the scope is thereby intended, such alterations and further modifications in the illustrated device, and such further applications of the principles as illustrated therein being contemplated as would normally occur to one skilled in the art to which the embodiments relate.

A request, a query, a search request or a search query which may include a keyword, a phrase, and/or a fully formed sentence, and/or information such as images, audio, video, or any type of media, is received by a search system utilizing the assistance of human searchers or guides. A request may be submitted using any communication service(s) which may access a search system. A result(s) is provided to a user responsive to a request. A result(s) may be produced using any resource(s) and/or other information which may be accessible to a guide(s) and/or a search system. A determination is made as to whether a user wishes to create a request which is initiated by a condition(s), also referred to as a triggered request. A trigger condition is established and recorded in a database. A resource(s) which may provide a result(s) and/or information regarding a trigger condition(s) may be recorded in a database. A result and/or notification is provided to a user(s) based on a triggered request. A user may elect to receive an alert(s) relating to a topic(s) and/or event (s). A user may respond to an alert and/or query response to cause a triggered request. A guide may be selected to respond to a request based at least in part on content of and/or information associated with a response to an alert.

A search history may be provided to a user and/or a guide. Information included in a search history may be used to create a triggered request. A URL or other information which indicates a triggered request may be provided. A user may provide information of a triggered request to one or more other users. A user may be added to a list of users associated with a triggered request. Information provided to a user may allow another user to be added to a list of users associated with a triggered request. A user may elect to receive a result(s) using any communication service(s) associated with a user. A result (s) may be returned to a user device(s) based on an occurrence of a condition(s).

A search history may be provided based on a request(s) and/or result(s) which are associated with one or more identifiers associated with a user. A search history may be presented using a GUI. A user may elect to create a triggered request using a current request, and/or using a previous request. A guide may interact with a user in order to create a triggered request. A human searcher or guide may interact with a user in order to determine a trigger condition(s) which may be associated with a triggered request. A guide may create a triggered request.

The terms voice and speech are used interchangeably herein. A user, a resource, and/or a guide may establish a communication session using a voice service, a messaging service such as Short Messaging Service (SMS), Enhanced Messaging Service (EMS), Multi-media Messaging Service (MMS), Instant Messaging (IM), email, an internet portal or web page, regular mail or any other type of communication. A connection may be established using any device which is capable of utilizing a communication service. For example, a wireless device such as a cell phone, PDA, smart phone, etc. might be used to establish a communication session using voice, SMS, IM, email or Internet browsing. A desktop, laptop or server system might be used to establish a communication session. A landline phone, a specialized communication terminal, or any other communication device might be used to establish a communication session.

Communication between a guide, a user, a resource and/or a search system may include conversion of text to speech and speech to text. Any type of media which can be sent or received using a communication system may be part of a communication session. A communication session may be conducted using any or all communication service(s) associated with a user, a resource and/or a guide.

An advertisement may be transmitted including during any or all communication sessions between a user, a guide and/or a search system. A resource, a guide, and/or an advertisement may be rated. Rating information may be obtained from a user, a guide(s), and/or a search system. Rating information may be used to select a resource(s), a guide(s), an advertisement(s) and/or any item(s) based on information associated with an item indicated in a database. For example, a resource most utilized by guides to obtain a result may be ranked higher than a resource used less. The search service may be compensated by advertising revenue.

A guide may be provided with a toolset which allows the guide to select a resource(s) which may satisfy a user request. Such a toolset may be configured to allow guides to share information regarding resources which may improve a selection made by a guide. A guide may transfer a user request and/or a communication session to another guide.

A system and method is provided whereby information of a guide, a search resource, a search result, an advertisement, a user, a profile or other item(s) may be associated with an index utilized by a human-assisted search system to select an item(s). An index may be created from a database which may be imported, and/or may be created based on any index of information. Linkage(s) may be established between nodes within an index. A human administrator or 'taxonomist' may review any or all linkage(s) and/or other information associated with an index in order to determine whether categorization(s) described by the index may be related, and/or to make other judgments which may improve the ability of the index to select a relevant guide(s), search resource(s), search result (s), and/or advertisement(s), etc.

A guide is registered with a human-assisted search system and is associated with one or more nodes or taxonomic branches within an index. A guide may be able to identify an area of related expertise (or 'guide interest') associated with a categorization or taxonomic node within an index. A search query or search request is associated with a category(ies), a keyword(s) and/or other information, and guides and/or other item(s) and/or information are ranked based on a categorization(s), keyword(s) and/or other information associated with the search request. One or more guide(s) is assigned to respond to a search request based on a ranking determined using information associated with the guide(s) and the search request. An index may be utilized to select any item(s) associated with the index. A target item(s) is identified and is associated with one or more selection keys. Relevant item(s) are then matched with the target item(s) based on information associated with the index. For example, a user(s) might be associated with a category(ies) which can be used to select an advertisement(s) to be delivered to a user(s). Likewise, an advertisement(s) might be associated with a category, which may be used to select a keyword(s) associated with the advertisement(s).

A "user" is any person or entity which may submit a request or search request

A "guide" is any person who may be compensated and/or may be a volunteer who may respond to and/or assist with a request. An "ambassador" is a guide who may perform processing of a request and/or a search result(s). A "searcher" is a guide who may perform an information search responsive to a request. A "transcriber" who may also be a guide may convert a spoken portion of a request into text.

Figure 15:
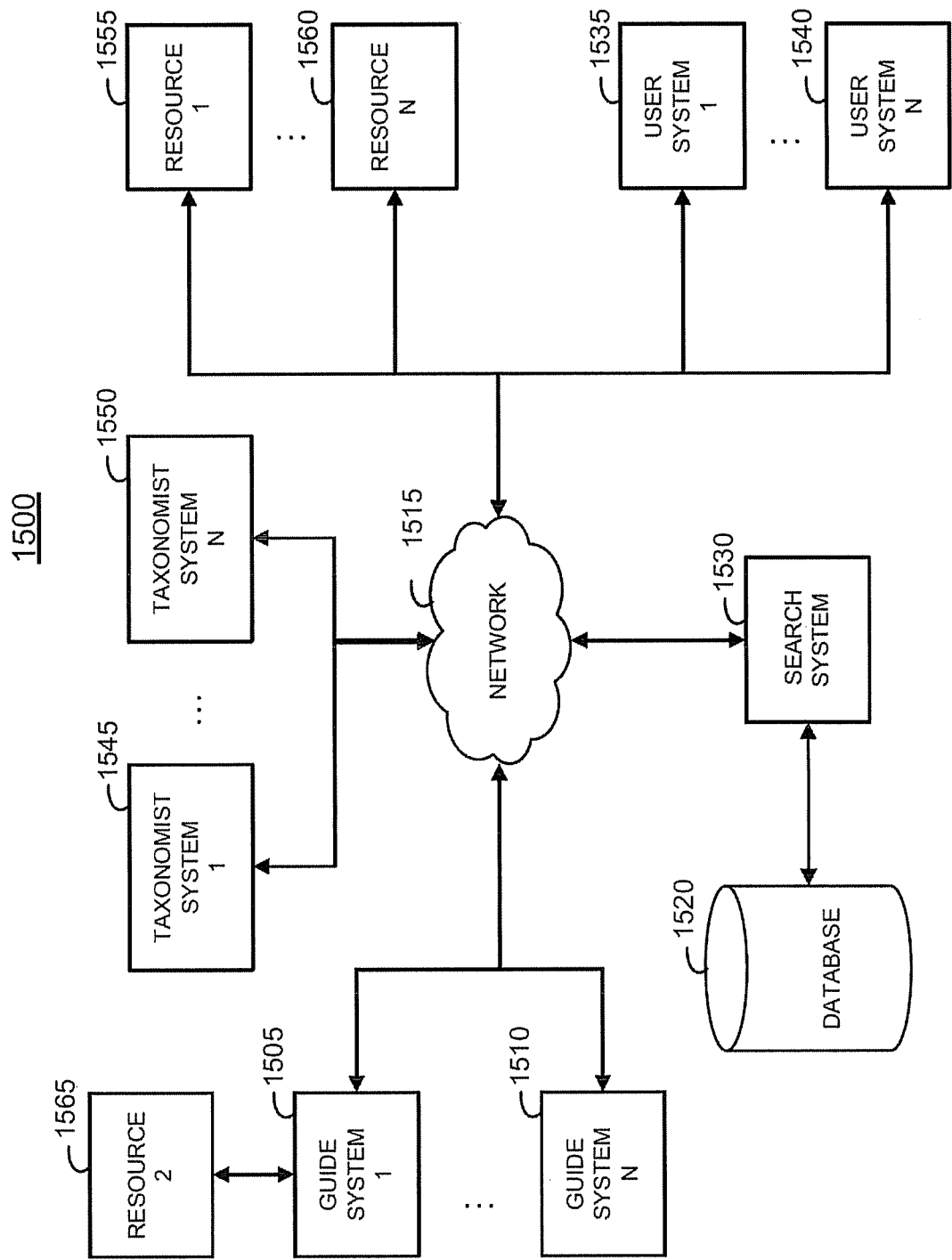
FIG. 15 is a block diagram of an exemplary system embodiment.

An "identifier" or ID includes character(s), number(s) and/or other type(s) of information which may be used to identify an item which is stored in the database 1520 (FIG. 15). Items may include but are not limited to a guide(s), a user(s), a resource(s), an advertisement(s), a keyword(s), a category(ies), a search result(s), a search request(s), a query(ies), a rating(s), ranking(s), a message(s) and/or a profile(s).

A "guided request" is a request which uses the assistance of one or more guides.

A "result" or "search result" is any information which may be provided responsive to a request. A search result includes, but is not limited to, any of an advertisement(s), a link to a web page, a message of any sort, image, audio, text, games, interactive media and/or software of any sort.

A "search resource" or "resource" is any source of information, including a resource which may be used to obtain a search result. A search resource includes automated and/or human-assisted systems, any repository of information, and any type of media and/or systems which may provide information. A resource may be a provider or source of item(s) and/or service(s). For example, a resource might provide an item such as a ringtone, a media file (e.g., audio, video, images, games, etc.), information such as news, lyrics, song titles, translations or any other type of information. A resource may be automated, and/or may utilize the assistance of a person(s).

A "profile" is one or more characteristics which may be associated with a person. Profile characteristics include but are not limited to demographic, geographic, personality, affiliations, areas of interest, historical actions, preferences, memberships, associations, etc.

An "advertisement" is any information which may be delivered to a user including to promote a provider, a product, a service, etc. An advertisement may include text, audio, video, images, printed materials, interactive media such as a game, or other forms of media which may be provided to a user device.

A "category" or "taxonomy branch" or "categorization" is a unique node within an index which may be associated with any number of items. If a query is associated with a category, items associated with the category may be more likely to be selected responsive to the query.

A "path term" is a word or phrase which may be used to define a category in an index. A "path root term" is a top-level node within a taxonomy. A "proper path" is a sequence of path terms which defines a category which begins with a path root term. A "path snippet" is a sequence of path terms which does not begin with a path root term. A "guide topic" or "interest" is a word or phrase which may be associated with a category which may be used at least in part to associate an item such as a query with a category.

A guide may be required to register with the search system and provide information which is utilized to select a guide(s) to respond to a request. A guide may be required to be associated with a minimum number of nodes within a system database. A guide may be required to provide a description of expertise which the guide is able to provide relating to a topic described by a node within a system index. A guide may be associated with a node in the index based on any information which is associated with the guide. A guide may be allowed to create and/or remove an association with a node of the index.

An administrator of an index, and database (also referred to as a 'taxonomist') may be registered with a search system. A taxonomist may be required to undergo training and/or testing prior to being allowed to make a modification(s) to information included in a database. A taxonomist may make modifications to an index and/or database which is utilized to select a guide(s), a search resource(s), an advertisement(s), and/or other information. A taxonomist may add and/or remove one or more nodes or categories from an index, and may add and/or modify linkage(s) between nodes. A taxonomist may review information of guides and/or other information associated with an index in order to assist in modifying the database.

A database is constructed which is utilized to select a guide(s) and/or other information, which is a hybrid of a taxonomic database and a 'flat' database. A hybrid database is constructed by allowing a linkage to be established between any nodes within a taxonomic hierarchy. The linkage allows a rating(s) of a guide and/or other item to be adjusted when ranking a guide(s) and/or information. An adjusted rating(s) may be utilized to select a guide(s) and/or item(s) such as a search resource(s) and/or an advertisement(s) responsive to a search request which has been associated with a categorization which is described in a selection index. A linkage(s) and/or change(s) to an adjustment(s) of ratings based on the linkage(s) may be performed by a human taxonomist and/or an automatic system.

As illustrated in FIG. 1, a system 100 includes guide system(s) 105, 110, a network 115 such as the Internet, a search system 130, user system(s) or information seeker system(s) 135, 140, a database 120, which may comprise various records, and resources 145, 150, 155.

While only a limited number of systems associated with a guide (also referred to as a human searcher), resource (also referred to as a search resource), user (also referred to as an information seeker or requester) and as a search system are depicted in FIG. 1, it is within the scope of the disclosure for multiple systems for guide, resource, information seeker and search systems to be utilized.

Any user system (e.g., the user systems 135, 140) can be operated by an information seeker, who may be a person or entity, to submit a search request to the search system 130 and/or receive a result(s) and/or other information. Any guide system (e.g., the guide systems 105, 110) can be operated by a human searcher to obtain a result(s) for an information seeker. Any resource system (e.g., the resource systems 145, 150) may be operated by a human provider of information and/or may be an automated system which may provide a result(s) and/or other information to a guide and/or a user, such as a search engine, a database, a local information source of a guide system such as a disk or removable memory, etc. A resource may not be accessible using the network 115. For example, a resource such as the resource 155 may be accessible to a guide operating a guide system such as the guide system 105. A resource might include printed materials, images, video, and/or audio information, a software application(s), any information accessible to a guide(s), a database(s), and/or any combination thereof.

The network 115 (FIG. 1) may be a global public network of networks (the Internet) and/or consist in whole or in part of one or more private networks and communicatively couples the guide systems, the resource systems and the user systems with the other components of the system such as the search system 130, and the database 120.

The search system 130 allows interaction to occur among the guide systems 105, 110, the resource systems 145, 150 and the user systems 135, 140. For example, an information search query(ies) can be transmitted from the user systems 135, 140 to the search system 130, where a search query(ies) can be accessed by the guide systems 105, 110 and/or the resource systems 145, 150. Similarly, a search result(s) produced from the resource systems 145, 150 using the guide systems 105, 110 in response to a search query(ies) submitted by the user systems 135, 140 may be transmitted to the search system 130, where it may be stored by the search system 130 and/or may be transmitted to the user systems 135, 140.

The search system 130 is communicatively coupled with the database 120. As will be described herein in further detail below, the database 120 includes data that is processed in association with operation(s) of the embodiments. Although FIG. 1 illustrates the database 120 as a separate component of the system, the database 120 may be integrated with the search system 130. Further, the records maintained in the database 120 may be stored in any typical manner, including in a Network Attached Storage (NAS), a Storage Area Network (SAN), etc. using any typical or proprietary database software such as DB2®, Informix®, Microsoft® SQLServer™, MySQL®, Oracle®, etc., and may also be a distributed database on more than one server. Elements of the database 120 may reside in any suitable elements of the system 100.

The user systems 135, 140, the guide systems 105, 110, the search system 130 and the resource systems 145, 150 may include equipment and personnel required to send and/or receive messages between a user system, a guide system, a resource system and/or the search system using the network 115. The database 120 includes information which may allow the search system 130 to establish communication between the other elements of the system.

A user system, a guide system, and/or a resource system may be a desktop or laptop PC or Mac®, a mobile phone, a smart phone, a PDA, a server system, a landline phone, a specialized communication terminal, a terminal connected to a mainframe, or any other communication device. The search system 130 may include one or more servers, computers, etc. After being presented with the disclosure herein, one of ordinary skill in the relevant art will immediately realize that any viable computer system(s) or communication device(s) known in the art may be used as user systems, guide systems, resource systems, and/or to implement the search system 130.

A guide may be required to register with the search system 130. As part of a registration process, at least one communication method is associated with a guide. In at least one embodiment, a guide may register with the search system 130 and establish a username and password which are associated with the guide. A guide may login to the search system 130 using a web browser functionality of a guide system in order to communicate with the search system 130. Multiple communication services may be associated with a guide and may allow a communication session to be established between a guide system such as the guide system 105 and a user system, a resource system and/or the search system 130. Multiple identifiers of a guide may be associated with each other. Information such as IM credential(s), an email address(es), a phone number(s), a URL, a username, etc. of a guide may be identified which may allow the search system 130 to establish a communication session between a guide system and a user system, a resource system, and/or the search system 130.

When a guide registers with the search system 130 the guide may be associated with one or more keywords, categories, and/or other information. For example a keyword(s) or category(ies) may be selected by a guide, or may be associated with a guide based on a test(s) administered to a guide and/or other information provided during and/or after a registration process. Information associated with a guide may be stored in the database 120 and may be used for purposes such as matching a guide to a user request, determining and/or providing compensation for a guide, communicating with a guide, etc. as will be described further herein below.

A user may be identified by the search system 130. When a user system such as the user system 135 establishes a communication session with the search system 130, an identifier of a user system is determined. An identifier of a user system may be associated with other information regarding a user. A user system may be identified using an email address, a telephone number, an IM credential, a username, and/or other identifier which may be used to associate information with a user. Multiple identifiers of a user may be associated with each other. Using information of a communication service(s) associated with a user, a communication session may be established between a user system such as the user system 135 and a guide system, a resource system and/or the search system 130. Information such as a keyword(s), a category (ies), a user profile(s), a previous search request(s), a result(s), etc. may be associated with a user. Information of a user may be stored in the database 120.

A resource, which may be a person(s), an entity(ies), a search engine, a database, a software application, a corpus of one or more types of media such as text or printed information, images, audio, video, etc. or a combination thereof, may be identified by the search system 130. Information of at least one method of communication is associated with a resource system which allows a communication session to be established between the search system 130, a user system 135, 140, and/or a guide system 105, 110 and a resource system such as the resource systems 145, 150. An identifier of a resource system may be associated with other information regarding a resource. A resource system may be identified using an email address, a telephone number, an IM credential, a resource username, a URL or other persistent identifier which may be used to associate information with a resource. Multiple identifiers of a resource may be associated with each other. Using the information of communication services associated with a resource, a communication session may be established between a resource system such as the resource system 145 and a user system, a guide system, and/or the search system 130. Information such as a keyword(s), a category(ies), a profile(s), or other information may be associated with a resource. Information of a resource may be stored in the database 120.

A resource such as the resource 155 and/or resources accessible via the resource systems 145, 150 may include any system(s), software, hardware, personnel and/or other facility (ies) which may provide information to a guide(s), a user(s), and/or the search system 130. For example, a resource may be a search engine, a database system, a library, a personal hard drive and/or other local storage, printed materials, recordings of any sort, a software program(s), a person or person(s), an organization, etc. A resource may be freely accessible to any user(s) and/or guide(s) and/or may be available on a restricted basis. The resource system(s) 145, 150 may include resource (s) which are available on an unrestricted and/or restricted basis. A resource may not be accessible using the network 115, but may be accessible to a guide(s). For example, a resource such as the resource 155 may be accessible to one or more guide(s) operating a guide system(s) such as the guide system 105 using any type of communication. For example, a guide(s) may obtain information of an event(s) to provide a result(s). Information in any form, such as printed media, audio and/or visual information, software, hardware, etc. which may be accessible to a guide(s), a user(s) and/or an operator(s) of a private database system(s) may be a resource.

The search system 130 may establish a communication session between any user system(s), guide system(s), or provider system(s) using information indicated in the database 120. For example, the user system 135 may establish a voice communication session with the search system 130, the search system 130 may establish a voice communication session between the user system 135 and the guide system 105, and the search system 130 may establish a voice communication session between the user system 135 and the resource system 145. While a voice communication session is used in this example, any type of communication session using one or more services such as SMS, EMS, MMS, email, IM, chat, web based communication, etc. may be established between any user system(s), guide system(s), and/or resource system(s) and/or the search system 130.

Information associated with a user(s), a guide(s) and/or a resource(s) may be obtained in various ways. For example, a registration process may be performed using a web form(s) provided by the search system 130, and/or information may be obtained from an external database, and/or information may be obtained based on analysis of information indicated by a user, a guide, and/or a resource.

Figure 2:
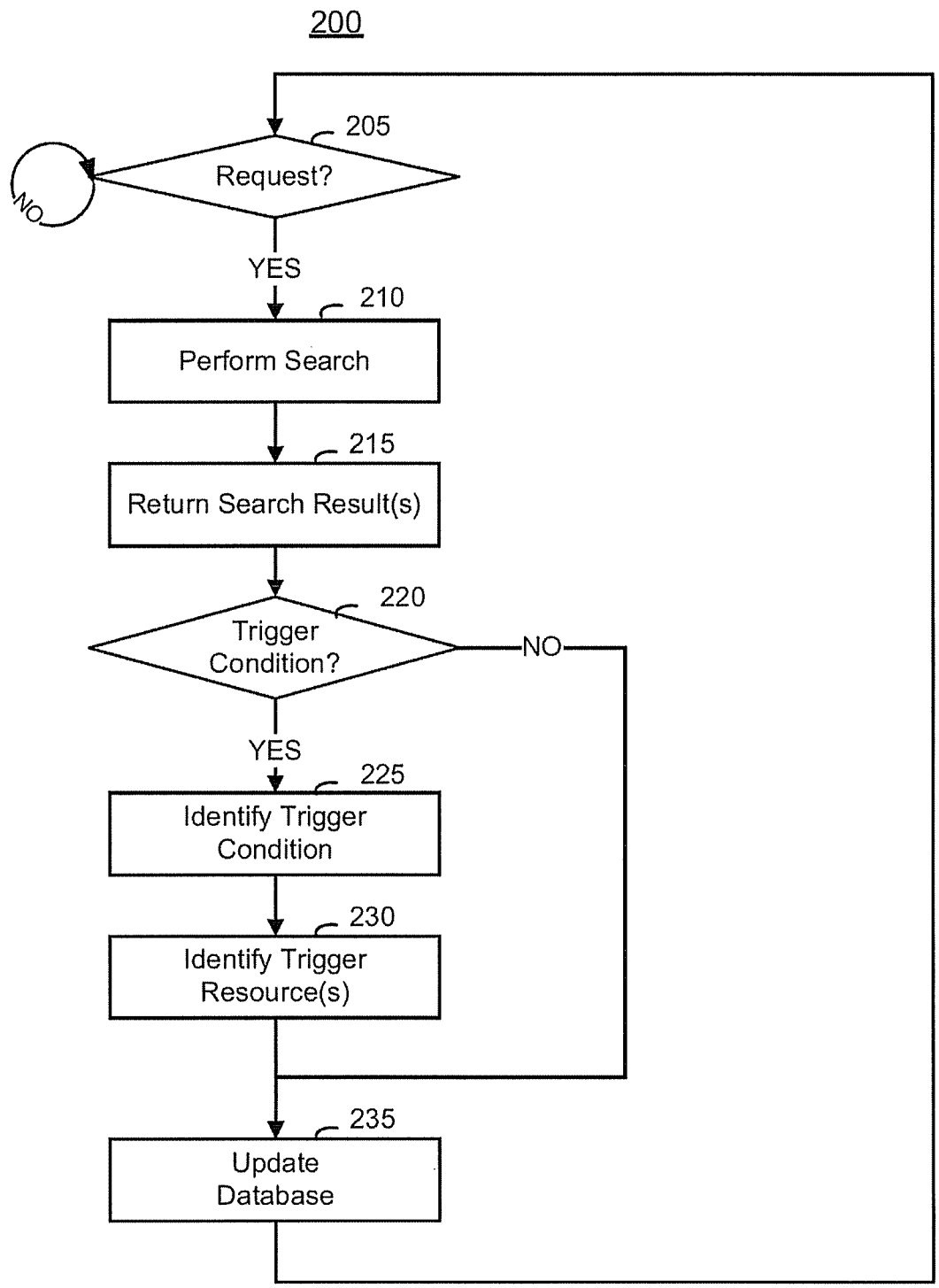
FIG. 2 is a flowchart of a process for performing an information search.

As illustrated in FIG. 2, a process 200 for performing an information search is provided.

In operation 205 a determination is made as to whether a request is received by the search system 130 (FIG. 1). If in operation 205 (FIG. 2) it is determined that a request is not received, control remains at operation 205 and process 200 continues. If in operation 205 it is determined that a request is received, control is passed to operation 210 and process 200 continues.

The determination in operation 205 may be made based on various criteria. For example, a user may transmit a request from a user system which is running web browser software via the Internet to a server of the search system 130, or a user may call an access number which establishes a voice connection between a user system and the search system 130, or a user may transmit a text message to a short code associated with the search system 130, or a user may send an IM message to an IM identifier associated with the search system 130, etc. A user may utilize any type of system to submit a request to the search system 130. Multiple user systems may be utilized to submit a request. A request is not constrained. In at least one embodiment a request may be determined to be received based on a condition associated with a triggered request. For example, a request may be triggered based on time information such as day, date, hour, etc., an event such as a change in a value of a price or other information, a change in inventory at a business, and/or any condition which may be identified based on information accessible using the system 100.

In operation 210 (FIG. 2) an information search is performed responsive to a request received in operation 205. An information search may be performed using the assistance of a guide, and/or an automated search may be performed. For example, a request may be presented to a guide ranked highest among guides registered with the search system 130 who may conduct a search to obtain requested information. Further, any of the search techniques disclosed in U.S. patent application Ser. No. 11/336,928, titled A SCALABLE SEARCH SYSTEM USING HUMAN SEARCHERS, inventor Scott A. Jones, filed Jan. 23, 2006 and/or U.S. patent application Ser. No. 12/275,864, titled METHOD AND SYSTEM FOR IMPROVING UTILIZATION OF HUMAN SEARCHERS, inventor Scott A. Jones, filed Nov. 21, 2008 may be utilized to perform a search in operation 210. Control is passed to operation 215 and process 200 continues.

In operation 215 a result(s) is provided to a user responsive to a request received in operation 205. A result(s) may be provided using any communication service(s) and/or system(s) associated with a user. A result(s) may be provided to any or all users associated with a request received in operation 205. For example, a result(s) may be provided to a user via a text message delivered to a mobile phone associated with a user, and a result(s) may be provided to the user via a browser function of a user system, and a result(s) may be provided utilizing a voice message to a second user via a VoIP telephone number associated with the second user. Any number of result(s) may be provided to any number of users associated with a request. An advertisement(s) and/or other information may be presented to a user before, simultaneous with and/or after a result(s) is provided. Control is passed to operation 220 and process 200 continues.

In operation 220 a determination is made as to whether a request is to be associated with a trigger condition. If in operation 220 it is determined that a request is to be associated with a trigger condition, control is passed to operation 225 and process 200 continues. If in operation 220 it is determined that a request is not to be associated with a trigger condition, control is passed to operation 235 and process 200 continues.

The determination in operation 220 may be made based on various criteria. A user may make the determination in operation 220. For example, a GUI such as the query selection GUI 1200 illustrated in FIG. 12 may be presented to a user to enable the user to elect to associate a trigger condition with a request. The determination in operation 220 may be made based on information included in a request. For example, a request such as 'tell me the score in the IU basketball game when it changes' might create a request (e.g., 'what is the score of the IU basketball game') and a trigger condition associated with the request (e.g., repeat if a previously provided score is not the same as a new or current score). A guide may interact with a user to determine whether a trigger condition is to be associated with a request. For example, if a user requests to know the weather condition in a particular location, a guide may obtain a result(s) and/or may ask the user's interest in being provided with additional and/or other relevant information based on a condition and/or other criteria. A guide(s) may determine that a trigger condition is to be associated with a request. An automated system may determine that a trigger condition is to be associated with a request(s). Any combination of a user(s), a guide(s) and/or an automated system(s) may determine that a trigger condition is to be associated with a request.

In operation 225 a trigger condition(s) is identified and may be associated with a request. A trigger or recurrence condition is one or more criteria which can cause a request to be initiated. A request may be initiated in association with a trigger condition including at a predetermined time interval, at a designated time, when a change occurs in information, etc. A trigger condition may be any condition which may or may not occur and/or may or may not occur periodically, and is not constrained.

A user may identify or formulate a trigger condition(s) associated with a request. For example, a user may be presented with a GUI such as the condition selection GUI 1300 (FIG. 13) or a user may identify a trigger condition(s) using a voice menu, a touch-screen interface, etc. A guide(s) may identify a trigger condition(s) associated with a request. For example, a guide may determine a trigger condition(s) based on interaction with a user(s). A guide may perform an information search in order to identify a trigger condition associated with a request. A trigger condition may be identified which may require one or more resources and/or other information to be obtained. For example, a user may request a trigger condition which utilizes information which is not accessible to the search system 130. A guide(s) may obtain information and/or identify a resource(s) which may provide information which is relevant to a trigger condition. A trigger condition may be identified by an automated system. Any combination of a user(s), a guide(s), and/or an automated system(s) may be used to identify or formulate a trigger condition associated with a request. Control is passed to operation 230 and process 200 continues.

In operation 230 a trigger resource(s) is identified and may be associated with a request and/or a trigger condition(s). A trigger resource is a resource which may be relevant to a trigger condition(s). Control is passed to operation 235 and process 200 continues.

A trigger resource(s) may be identified in various ways. A guide, a user and/or an automated system may identify a trigger condition resource. For example, a time interval, or a date and/or time trigger might be identified as a trigger condition, which would require a calendar type resource, which may be included in the search system 130 (FIG. 1) and/or other elements of the system 100. A watching service which provides monitoring of items such as prices of a commodity or equity, sporting events, news information, or any other resource which might provide information which may indicate whether one or more trigger condition has been met might be identified. Using the sports example above, a resource such as an RSS feed which updates whenever a change in scoring occurs might be identified as a trigger condition resource. A trigger condition resource may not be an automated system. For example, a person operating a guide system such as the guide system 105 might be identified as a trigger condition resource. In such a case, a guide might transmit a message regarding any or all trigger criteria associated with a request. Information obtained from trigger resource(s) may be used with other information to determine whether a trigger condition has been met. A trigger condition resource(s) may be associated with a keyword(s), a category(ies), a profile(s) of a guide and/or a user(s), an advertisement(s), a request(s) and/or any other information indicated in the database 120 which may assist a guide(s) and/or a user(s) of the system 100 to identify and/or utilize a trigger condition(s) and/or resource(s).

In operation 235 the database 120 is updated. Information related to a user(s), a guide(s), a request(s), a resource(s), an advertisement(s), a result(s), and/or other item(s) may be recorded, updated and/or modified and/or associated with each other. For example, a trigger condition(s), and a trigger resource(s) may be associated with a request(s), a guide(s), a user(s), etc. Rating(s) of any item(s) may be recorded and/or modified. Control is passed to operation 205 and process 200 continues.

While the process 200 has been described using specific examples, there is no limitation on a request, a trigger, a trigger resource, or a search result, which may be in "open format", generic and/or having no particular distinctive restriction or application. Additional examples are presented here for the purposes of illustration. In a first instance, a user may submit a request such as "send me a text with the traffic conditions on I-75 at DeSoto Blvd if there is a hurricane warning in Naples Florida". A guide might receive the request, and determine that a Really Simple Syndication (RSS) feed from the National Weather Service (NWS) provides information of hurricane warnings in Naples, Florida. The NWS RSS feed might be used as a trigger resource for the request "traffic conditions on I-75". Current traffic conditions on I-75 at DeSoto Boulevard might be available from an RSS feed from the Florida Highway Patrol (FHP). The FHP RSS Feed might be used as a search resource to provide a search result automatically and/or using the assistance of a guide responsive to the trigger condition information provided by NWS RSS feed trigger resource. A guide formulates a trigger and identifies a trigger resource in this instance, and a triggered request is generated, which may be served with an automated result.

In a different example, the search system 130 (FIG. 1) may analyze a query history and/or other information regarding a user to determine if the user might elect to establish a triggered search request. For example, if a user has submitted the request "what is the final score of the Pacers game?" four times in the previous 2 weeks, the search system 130 may send a message to the user to determine whether the user might want to receive scores of the Pacers games whenever the result becomes final when visiting a web page associated with the user provided by the search system 130. If the user accepts the invitation, the search system might formulate the trigger condition "when score is final and user is logged in" to trigger the request "what is the score of the Pacers game". In such an instance, an RSS feed including sports scores might be used as a trigger resource as well as a search resource. The login status of the user might be used to determine to use the most recent score when the user visits the web page.

Figure 11:
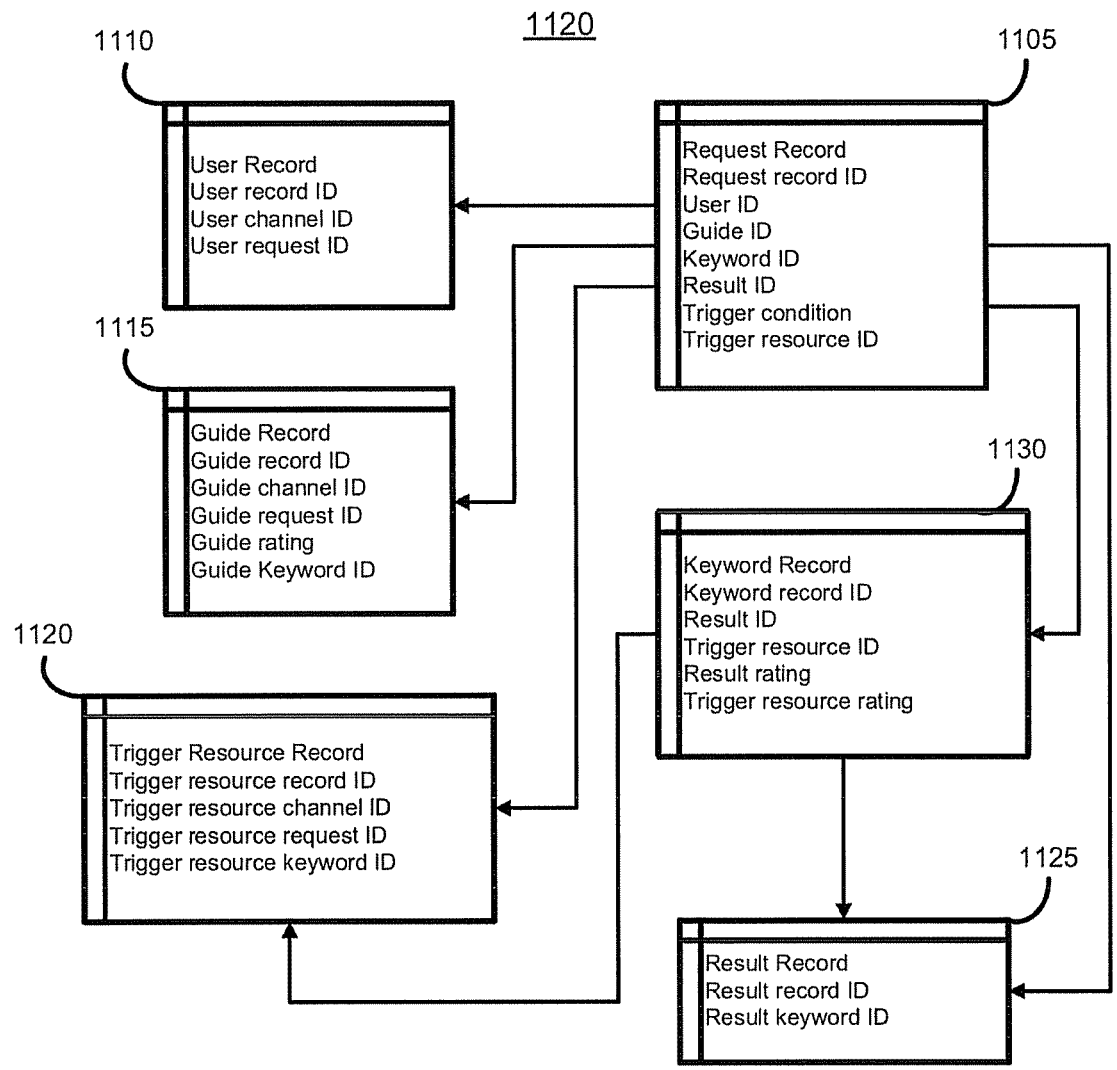
FIG. 11 illustrates a database relationship.
Figure 12:
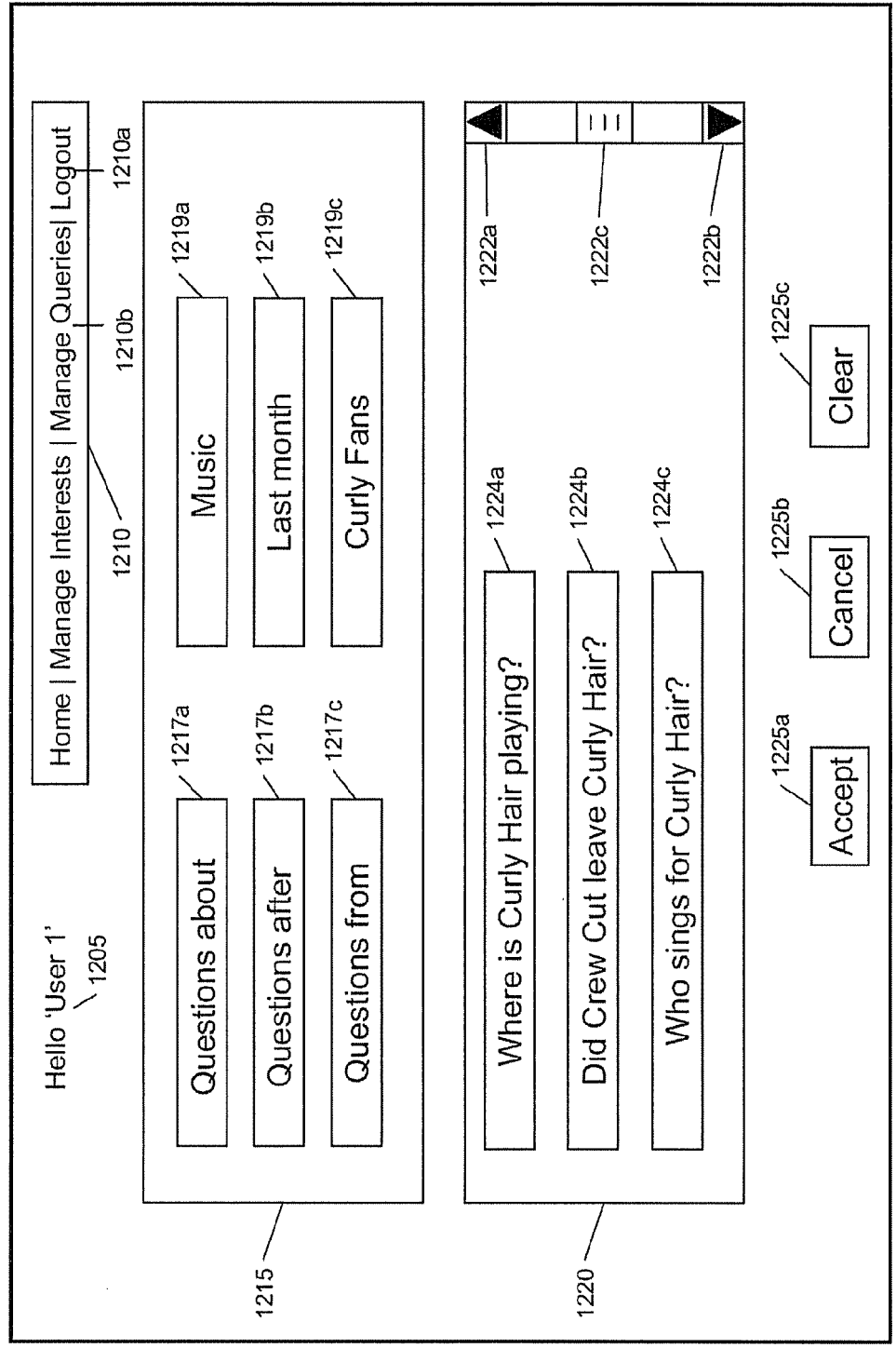
FIG. 12 illustrates a graphical user interface (GUI).
Figure 13:
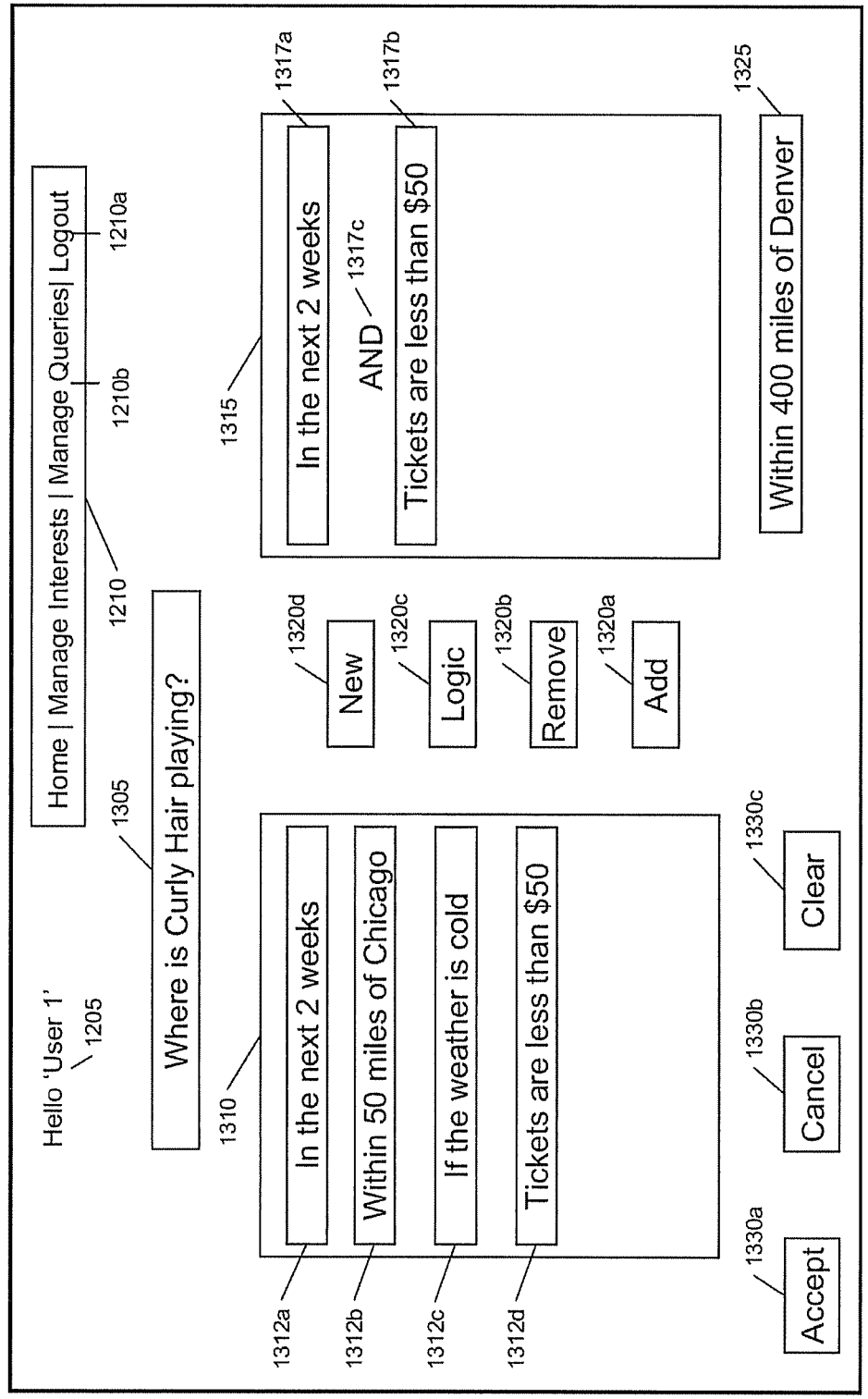
FIG. 13 illustrates a GUI.

To illustrate further, a user might desire to select a trigger resource and a trigger condition. The GUI's illustrated in FIGS. 11, 12, and 13, illustrate an embodiment which might be used by a user(s) and/or a guide(s) to select a trigger resource(s). A user might desire to use local information of a user system such as the user system 135 in order to trigger a search request. In such a case, the user might define a request such as "what is in this image" which is triggered by a phone call being sent from a device associated with the user such as the user system 140. A search resource might be a video feed from the user system 135, which would provide an image associated with the request "what is in this image". The trigger event "when an outgoing message is sent from the phone number 555.224.2242" might use a system monitor feed from the device associated with "555.224.2242" as a trigger resource, and the search system 130 and/or a guide might interpret an image provided by a search resource and provide an IM message to a user device designated by the user which included a search result. While specific examples have been provided to illustrate applications and operation of the embodiments, no limitation is implied thereby.

As illustrated in FIG. 3, an exemplary user record 300 is provided, of which one or more may be associated with or resident in the database 120 (FIG. 1), The user record 300 may include a user record identifier (ID) field 305, a user channel identifier field 310, and a user request field 315.

The user record ID field 305 contains an identifier of a user, which is preferably unique and preferably used consistently. For example, in at least one embodiment, the user record ID field 305 can include a randomly generated numerical code, and/or a string indicating a user. A user record ID serves to distinguish a user record associated with a user from a user record associated with other user(s). Although particular examples of identifiers are described herein, other types of identifiers uniquely indicating a user(s) may be utilized without departing from the spirit and scope of the embodiments. In at least one embodiment, a telephone number associated with a mobile phone service account may be included in the content of the user record ID field 305. A user record ID may include a username, an IM credential, an email address, a URL, an IP address, etc. Using the example in FIG. 3, '502.331.2204-4772' is the user record ID associated with the user record 300.

The user channel identifier field 310 may include one or more identifiers associated with a user. The user channel identifier field 310 may include one or more identifiers of a user and/or other information which may be used to establish communication with a user system. For example, a telephone number, an email address, an IM credential, a username, a URL, a street address, and/or other information which may allow communication to be established with a user may be included in the user channel identifier field 310. Using the example in FIG. 3, the telephone number '502.331.2204' and the email address 'usertom@chacha.com' have been associated with the user '502.331.2204-9722'. While only a few channel identifiers and types of identifiers have been illustrated in FIG. 3, any number and/or type of channel identifiers may be associated with a user.

The user request field 315 may include information of one or more requests or requests or search queries associated with a user identifier(s). For example, the user request field 315 may include a unique identifier(s) associated with a request(s) submitted using a user system associated with any channel identifier associated with a user. Using the example illustrated, the user request '502.331.2204,12.12.08, 13 Oct. 2006', and the user request 'usertom@chacha.com, 12.48.08, 13 Oct. 2006' have been associated with the user record 300. While only a few request identifiers have been illustrated in FIG. 3, any number of requests may be associated with a user.

As illustrated in FIG. 4, an exemplary a guide record 400 is provided, of which one or more may be associated with or resident in the search database 120 (FIG. 1). The guide record 400 may include a guide record ID field 405, a guide channel ID field 410, a guide request field 415, a guide rating field 420, and a guide keyword field 425.

The guide record ID field 405 contains an identifier of a guide, which is preferably unique and preferably used consistently. For example, in at least one embodiment, the guide record ID field 405 can include a randomly generated numerical code, and/or a string indicating a guide. A guide record ID serves to distinguish a guide record associated with a guide from a guide record associated with other guide(s). Although particular examples of identifiers are described herein, other types of identifiers uniquely indicating a guide(s) may be utilized without departing from the spirit and scope of the embodiments. In at least one embodiment, a guide record ID may include a first and last name of a guide. In at least one embodiment, a telephone number associated with a mobile phone service account may be included in the content of the guide record ID field 405. A guide record ID may include a guide username, an IM credential, an email address, etc. Using the example in FIG. 4, 'Bob Smith' is the guide record ID associated with the guide record 400.

The guide channel ID field 410 may include one or more identifiers associated with a guide. The guide channel ID field 410 may include one or more identifiers of a guide and/or other information which may be used to establish communication with a guide. For example, a telephone number, an email address, an IM credential, a username, a password, access information, a URL, a street address, and/or other information which may allow communication to be established with a guide may be included in the guide channel ID field 410. Using the example in FIG. 4, the telephone number '317.244.2444' and the email address 'guidebob@chacha.com' are the guide channel identifiers which have been associated with the guide 'Bob Smith'. While only a few channel identifiers have been illustrated in FIG. 4, any number of channel identifiers may be associated with a guide.

The guide request field 415 may include information of one or more requests associated with a guide ID. For example, the guide request field 415 may include a unique identifier(s) associated with a user request(s) which has been assigned to a guide. Using the example illustrated in FIG. 4, the request '502.331.2204,12.12.08, 13 Oct. 2006', and the request '502.455.3301,12.48.08, 13 Oct. 2006' have been associated with the guide 'Bob Smith'.

The guide rating field 420 may include information of one or more ratings associated with a guide. The content of the guide rating field 420 may include one or more ratings of a guide which may be used to select a guide(s) to be assigned to a request. In at least one embodiment, a rating may be associated with a keyword(s), a category(ies), or other information which has been associated with a request. Any information indicated in the database 120 (FIG. 1) may be used to determine a rating of a guide. Using the example illustrated in FIG. 4, the rating 'Master-Voice' has been associated with the guide 'Bob Smith'. This may indicate that the guide 'Bob Smith' may accept voice based requests and has the rating of 'Master' which may influence the probability that 'Bob Smith' will be selected to respond to a request. While only one type of rating has been illustrated in FIG. 4, ratings of a guide may be associated with various types of information. For example a guide may have a rating associated with one or more keywords, categories, skills, profiles, users and/or other types of information which may be associated with a guide and/or a request. Any type of information which may indicate a rating such as a number, text, etc. may be included in the guide rating field 420.

The guide keyword field 425 may include information of one or more keywords associated with a guide. For example, the guide keyword field 425 may include a unique identifier(s) associated with a keyword(s) which has been associated with a guide. Using the example illustrated in FIG. 4, the keyword record ID 'indiana', and the keyword record ID 'basketball' have been associated with the guide record 400. This may indicate that the guide 'Bob Smith' has registered to accept requests associated with the keywords 'indiana' and 'basketball'. Such information may be used to select a guide to respond to a request, as will be further described herein.

As illustrated in FIG. 5, an exemplary trigger resource record 500 is provided, of which one or more may be associated with or resident in the search database 120 (FIG. 1). The trigger resource record 500 may include a trigger resource record identifier (ID) field 505, a trigger resource channel ID field 510, a trigger resource request field 515, and a trigger resource keyword field 520.

The trigger resource record ID field 505 contains an identifier of a trigger resource, which is preferably unique and preferably used consistently. For example, in at least one embodiment, the trigger resource record ID field 505 can include a randomly generated numerical code, and/or a string indicating a trigger resource. A trigger resource record ID serves to distinguish a trigger resource record associated with a trigger resource from a trigger resource record associated with other trigger resource(s). Although particular examples of identifiers are described herein, other types of identifiers uniquely indicating a trigger resource(s) may be utilized without departing from the spirit and scope of the embodiments. In at least one embodiment, the trigger resource record ID is a URL. A trigger resource record ID may include a trigger resource URL, username, an IM credential, an email address, etc. Using the example in FIG. 5, 'sports scores' is the trigger resource record ID associated with the trigger resource record 500.

The trigger resource channel ID field 510 (FIG. 5) may include one or more identifiers associated with a trigger resource. The trigger resource channel ID field 510 may include one or more identifiers of a trigger resource and/or other information which may be used to establish communication with a trigger resource. For example, a telephone number, an email address, an IM credential, a username, a URL, a password(s), security information, etc. may be included in the trigger resource channel ID field 510. Using the example in FIG. 5, the telephone number '317.331.2224', the email address 'scores@sportsscores.com' and the URL 'www.sportsscores.com' are the trigger resource channel identifiers which have been associated with the trigger resource 'sports scores'. This may for example indicate that information may be obtained from the resource 'sports scores' via the URL 'www.sportsscores.com' or by sending email to 'scores@sportsscores.com' or by sending a message to a system(s) associated with the telephone number '317.331.2224'. While a few examples of channel identifiers have been illustrated in FIG. 5, any type of information which may allow a trigger resource to be accessed may be associated with a trigger resource.

The trigger resource request field 515 may include information of one or more requests associated with a trigger resource. For example, the trigger resource request field 515 may include a unique identifier(s) associated with a request(s) which have been associated with a trigger resource. Using the example illustrated in FIG. 5, the request '502.331.2204, 12.12.08, 13 Oct. 2006', and the request '317.455.3301,12.48.08, 14 Oct. 2006' have been associated with the trigger resource 'sports scores'. This may for example indicate that the request, '502.331.2204,12.12.08, 13 Oct. 2006' and '317.455.3301,12.48.08, 14 Oct. 2006' may access the trigger resource 'sports scores' to obtain information relevant to a trigger condition associated with the request(s).

The trigger resource keyword field 520 may include information of one or more keywords which have been associated with a trigger resource. The content of the trigger resource keyword field 520 may be used to determine a ranking of a trigger resource associated with a request. Using the example in FIG. 5, the keywords 'basketball', 'indiana university', 'NCAA', 'NFL' and 'NHL' have been associated with the trigger resource 'sports scores'. The association of a keyword (s) with a trigger resource may be utilized to rate and/or rank a trigger resource(s). For example, a trigger resource(s) may be presented to a guide and/or a user if it is determined that a trigger condition is to be associated with a request. This may allow a user(s) and/or a guide(s) to select a trigger resource which may be utilized to obtain information regarding a trigger condition(s) associated with a request(s). A trigger resource(s) may be presented in an order related to a ranking of the trigger resource. Trigger resources may be rated and/or ranked based on any information indicated in the search database 120 (FIG. 1). Preferred methods for rating and ranking resources are further described in the related U.S. patent application Ser. No. 11/777,505 previously mentioned and included herein by reference in its entirety. A resource may be ranked and/or rated based on any information associated with a resource such as a keyword(s), category(ies), a guide and/or user profile(s), geographic, demographic, or any other information indicated in the database 120.

As illustrated in FIG. 6, an exemplary result record 600 is provided, of which one or more may be associated with or resident in the search database 120 (FIG. 1), the result record 600 may include a result record ID field 605, and a result keyword field 610.

The result record ID field 605 contains an identifier of a result, which is preferably unique and preferably used consistently. For example, in at least one embodiment, the result record ID field 605 can include a randomly generated numerical code, and/or a string indicating a result. A result record ID serves to distinguish a result record associated with a result from a result record associated with other result(s). Although particular examples of identifiers are described herein, other types of identifiers uniquely indicating a result(s) may be utilized without departing from the spirit and scope of the embodiments. In at least one embodiment, the result record ID is a text string. A result record ID may include a result description, a random number, and/or any other information which uniquely identifies a result. Using the example in FIG. 6, 'indiana 46, illinois 34 2.15 2H' is the result record ID associated with the result record 600.

The result keyword field 610 includes information of a keyword(s) associated with a result. The content of the result keyword field 610 may be used to select a result to be associated with a request. Using the example in FIG. 6, 'indiana university', 'university of illinois', and 'basketball' are the keywords associated with the result 'indiana 46:Illinois 34 2:152#!'.

As illustrated in FIG. 7, an exemplary keyword record 700 is provided, of which one or more may be associated with or resident in the search database 120 (FIG. 1). The keyword record may include a keyword record ID field 705, a result ID field 710, a trigger resource ID field 715, a result rating field 720, and a trigger resource rating field 725.

The keyword record ID field 705 contains an identifier of a keyword, which is preferably unique and preferably used consistently. For example, in at least one embodiment, the keyword record ID field 705 can include a randomly generated numerical code and/or a string indicating a keyword. A keyword record ID serves to distinguish a keyword record associated with a keyword from a keyword record associated with other keywords(s). Although particular examples of identifiers are described herein, other types of identifiers uniquely indicating a keyword(s) may be utilized without departing from the spirit and scope of the embodiments. In at least one embodiment, the keyword record ID is a text string. A keyword record ID may include a keyword description, a random number, and/or any other information which uniquely identifies a keyword. Using the example in FIG. 7, 'indiana university' is the keyword record ID associated with the keyword record 700.

The keyword result ID field 710 includes information of a result(s) associated with a keyword. The content of the keyword result ID field 710 may be used to select a result to be associated with a request. Using the example in FIG. 7, the results 'indiana 46, illinois 34 2:15 2H', 'indiana 58, northwestern 48 final' and 'indiana 40, illinois 28 7:18 2H' are associated with the keyword 'indiana university'.

The keyword trigger resource ID field 715 includes information of a trigger resource(s) associated with a keyword. The content of the keyword trigger resource ID field 715 may be used to select a trigger resource to be associated with a request. Using the example in FIG. 7, the trigger resources 'sports scores', 'colleges and universities' and 'indiana university calendar' are the trigger resources associated with the keyword 'indiana university'.

The keyword result rating field 720 includes information of a rating(s) of a result(s) associated with a keyword. The content of the keyword result rating field 720 and the keyword result ID field 710 may be linked by, for example, a pointer. Any type of rating information may be indicated in the result rating field 720. For example, a higher result rating may increase the probability that a result will be selected to be associated with a request. For example, a list of results may be presented to a guide in an order based at least in part on a result rating associated with a keyword associated with a request. Using the example in FIG. 7, the result 'indiana 46, illinois 34 2:15 2H' has a rating of '5', the result 'indiana 58, northwestern 48 final' has a rating of '2', and the result 'indiana 40, illinois 28 7:18 2H' has a rating of '1.2'. Any rating system may be utilized within the scope of this disclosure. A rating(s) may be based on factors such as guide ratings, user ratings, result ratings, an external database, time, proximity, etc. and/or combinations thereof.

The keyword trigger resource rating field 725 includes information of a rating(s) of a trigger resource(s) associated with a keyword. The content of the keyword trigger resource rating field 725 and the keyword trigger resource ID field 715 may be linked by, for example, a pointer. Any type of rating information may be indicated in the trigger resource rating field 725. A higher trigger resource rating may increase the probability that a trigger resource will be selected to be associated with a request. For example, a list of trigger resources may be presented to a guide in an order based at least in part on a trigger resource rating associated with a keyword associated with a request. Using the example in FIG. 7, the trigger resource 'sports scores' has a rating of '5', the trigger resource 'colleges and universities' has a rating of '3', and the trigger resource 'indiana university calendar' has a rating of '1.5'. Any rating system may be utilized within the scope of this disclosure. A rating(s) may be based on factor(s) such as guide ratings, user ratings, provider ratings, an external database, time, proximity, etc. A ranking of a resource may be determined based on ratings associated with a resource and information associated with a request such as a keyword, a category, a profile, geographic location information, a user, a guide, etc.

As illustrated in FIG. 8, an exemplary request record 800 is provided, of which one or more may be associated with or resident in the search database 120 (FIG. 1). The request record 800 may include a request record ID field 805, a request user ID field 810, a request guide ID field 815, a request keyword ID field 820, an request result ID field 825, a request trigger condition field 830, and a request trigger resource ID field 835.

The request record ID field 805 contains an identifier of a request, which is preferably unique and preferably used consistently. For example, in at least one embodiment, the request record ID field 805 can include a randomly generated numerical code, and/or a string indicating a request. A request record ID serves to distinguish a request record associated with a request from a request record associated with other request(s). Although particular examples of identifiers are described herein, other types of identifiers uniquely indicating a request(s) may be utilized without departing from the spirit and scope of the embodiments. In at least one embodiment, the request record ID includes a telephone number. A request record ID may include a username, an IM credential, an email address, etc. Using the example in FIG. 8, '502.331.2204,12.12.08, 13 Oct. 2006' is the request record ID associated with the request record 800.

The request user ID field 810 may include an identifier of a user(s) associated with a request or request or search query. The content of the request user field 810 may be used to establish communication with a user(s) based on the content of a user record such as the user record 300 (FIG. 3). Using the example in FIG. 8, the user identifier '502.331.2204-4772' and 'mike 883' are the user identifiers associated with the request '502.331.2204,12.12.08, 13 Oct. 2006'. While only a few user IDs are associated with the request record 800, any number of users may be associated with a request. For example, a user may receive information related to a request, which may be provided to other user(s), who may be associated the request. Likewise, should an equivalent request be submitted by more than one user, multiple users may be associated with a request or. A group(s) of users may be indicated in the user ID field 810. For example, a group of users may be associated with a keyword(s), or other identifier (s) which may indicate the group.

The request guide ID field 815 may include information of one or more guides associated with a request. The content of the guide identifier field 815 may be used to establish communication with a guide based on the content of a guide record such as the guide record 400 (FIG. 4). Using the example illustrated in FIG. 8, the guide 'Bob Smith' has been associated with the request record 800, which may indicate that the guide 'Bob Smith' has been selected to respond to a user request associated with the request ID '502.331.2204, 12.12.08, 13 Oct. 2006'. While only a single guide ID is associated with the request record 800 illustrated in FIG. 8, multiple guide identifiers may be associated with a request.

The request keyword ID field 820 may include information of one or more keywords associated with a request. The content of the keyword identifier field 820 may for example be used to select an item or information associated with a keyword based on the content of a keyword record such as the keyword record 700 (FIG. 7). Using the example illustrated in FIG. 8, the keywords 'indiana university basketball score', 'score' and 'basketball score' have been associated with the request record 800, which may indicate that the keywords 'indiana university basketball score', 'score' and 'basketball score' may be used to select information responsive to the request '502.331.2204,12.12.08, 13 Oct. 2006'.

The request result ID field 825 may include information of one or more results associated with a request. The content of the result ID field 825 may be used to deliver a result(s) to a user based on information included in a result record such as the result record 600 (FIG. 6). Using the example illustrated in FIG. 8, the results 'indiana 46, illinois 34 2:15 2H' and 'indiana 40, illinois 28 7:18 2H' have been associated with the request record 800, which may indicate that the results 'indiana 46, illinois 34 2:15 2H' and 'indiana 40, illinois 28 7:18 2H' may be provided to the user '502.331.2204-4772' and/or 'mike 883' responsive to a request with the request ID '502.331.2204,12.12.08, 13 Oct. 2006'.

The request trigger condition field 830 may include information of a trigger condition(s) associated with a request. As explained herein above with respect to FIG. 2, a trigger condition may be associated with a request using various techniques. A trigger condition may specify a condition(s) which may cause a request to be received by the search system 130 (FIG. 1). A result(s) may be provided to a user(s) based on information included in a request record such as the request record 800 and a user record such as the user record 300 (FIG. 3). Using the example illustrated in FIG. 8, the trigger condition 'elapsed time=5 minutes' AND 'last result is not final' has been associated with the request '502.331.2204,12.12.08, 13 Oct. 2006'. This may for example indicate that a request is to be initiated and/or that a result is to be returned to a user(s) whenever five minutes have elapsed on the game clock, and the score of the game is not final. While a limited number and type of criteria have been described as a trigger condition, any type of trigger condition may be defined and associated with a request or query. A condition triggering a request may be indicated by a user or a guide and/or may be automatically set by the system 100. For example, a user may request a search be triggered when there is a change to information of interest to the user, or the system 100 may set a condition triggering a request based on content or type of information (e.g. volatile data such as stock prices, etc.).

The request trigger resource ID field 835 may include information of a trigger resource(s) associated with a request. As explained herein above with respect to FIG. 2, a trigger resource may be associated with a request using various techniques. A trigger resource may specify a resource(s) which may be utilized to cause a request to be received by the search system 130 (FIG. 1). A trigger resource(s) may be provided to a user(s) and/or a guide(s) based on information included in a request record such as the request record 800 (FIG. 8) and/or other information indicated in the database 120 (FIG. 1). Using the example illustrated in FIG. 8, the resources 'calendar=minutes' and 'sports scores' have been associated with the request '502.331.2204,12.12.08, 13 Oct. 2006'. This may for example indicate information relevant to a trigger condition(s) indicated in the trigger condition field 830 that may be obtained using information obtained from the resources 'calendar=minutes' and 'sports scores'. For example, a guide might receive an alert from the trigger resource 'calendar=minutes', and might examine information from the trigger resource 'sports scores' in order to determine if a trigger condition has occurred. Likewise, a trigger resource might be rated and/or ranked when associated with a keyword(s), category(ies), or other information, based on the association of a trigger resource with other information in the database 120 (FIG. 1).

As illustrated in FIG. 9, an exemplary category record 900 is provided, of which one or more may be associated with or resident in the search database 120. The category record 900 may include a category record ID field 905, a category resource ID field 910, and a category resource rating field 915.

The category record ID field 905 contains an identifier of a category, which is preferably unique and preferably used consistently. For example, in at least one embodiment, the category record ID field 905 can include a randomly generated numerical code and/or a string indicating a category. A category record ID serves to distinguish a category record associated with a category from a category record associated with other category(ies). Although particular examples of identifiers are described herein, other types of identifiers uniquely indicating a category(ies) may be utilized without departing from the spirit and scope of the embodiments. In at least one embodiment, the category record ID is a text string. A category record ID may include a category description, a random number, and/or any other information which uniquely identifies a category. Using the example in FIG. 9, 'Sports>NCAA' is the category record ID associated with the category record 900.

The category resource ID field 910 includes information of a resource(s) associated with a category. The content of the category resource ID field 910 may be used to select a resource to be associated with a request. Using the example in FIG. 9, the resources 'www.sportsinfo.com', and 'www.basketballscores.com' are the resources associated with the category 'sports NCAA'.

The category resource rating field 915 includes information of ratings of a resource(s) associated with a category. The content of the category resource rating field 915 and the category resource ID field 910 may be linked by, for example, a pointer. Any type of rating information may be indicated in the category resource rating field 915. A higher resource rating may increase the probability that a resource will be selected to be associated with a request. A list of resources may be presented to a guide in an order based at least in part on a resource rating associated with a category associated with a request. Using the example in FIG. 9, the resource 'www.sportsinfo.com' has a rating of 'A', and the resource 'www.basketballscores.com' has a rating of 'B-'. Any rating system may be utilized within the scope of this disclosure. A rating(s) may be based on factors such as guide ratings, user ratings, provider ratings, an external database, time, proximity, etc. A ranking of a resource may be determined based on ratings associated with a resource and information associated with a request such as a keyword, a category, a profile, geographic location information, a user, a guide, etc.

Figure 10:
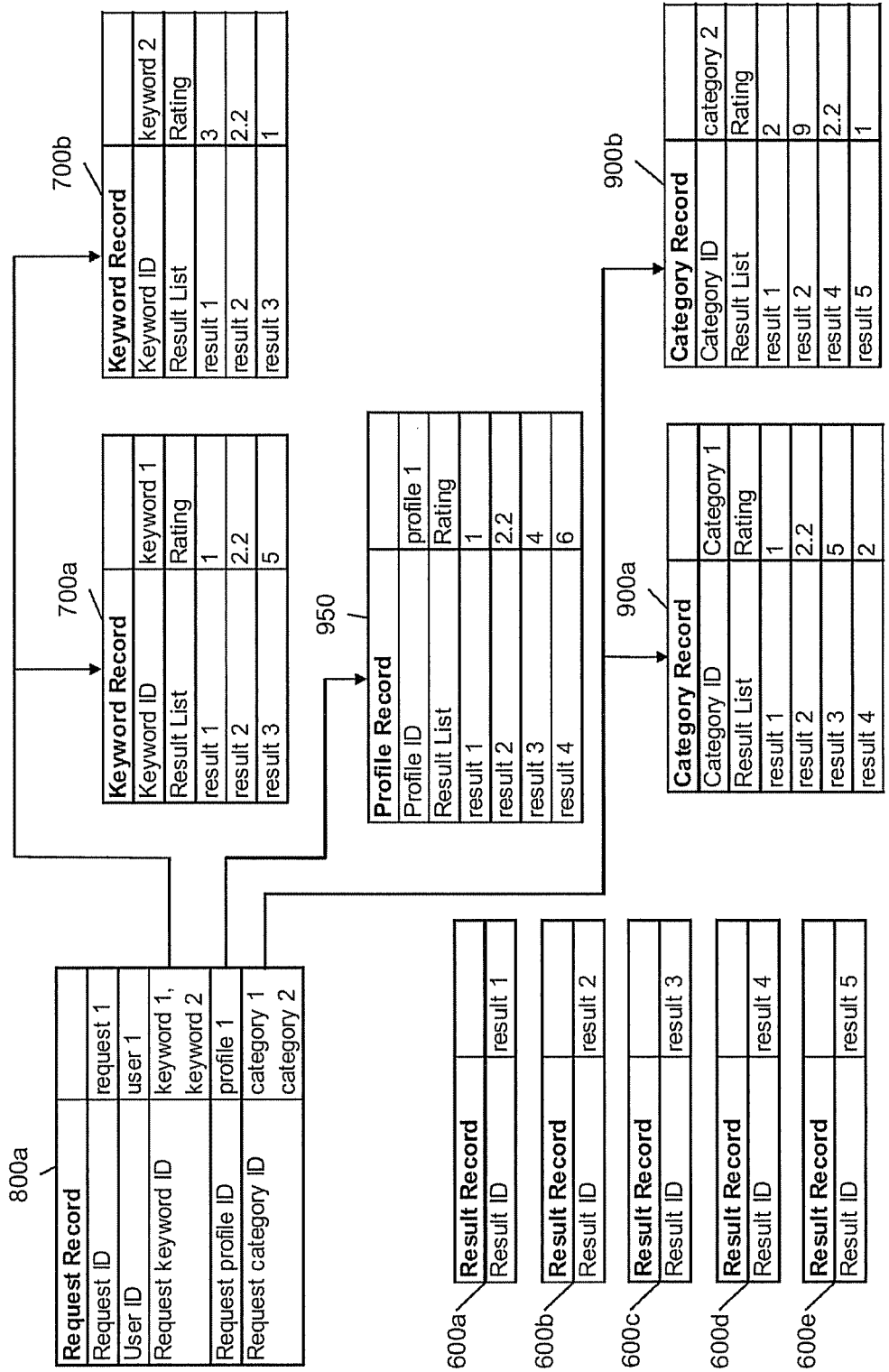
FIG. 10 illustrates selection of an item(s).

FIG. 10 illustrates a selection 1000 of item(s) indicated in the database 120. A record(s) associated with a guide, a user, an advertisement, a result, a search resource, a profile, or any other record(s) may be selected as illustrated in FIG. 10. The example of ranking and selection of a result based on keywords, a profile, and categories is used for the purpose of illustration. No limitation is implied thereby. Any number of records and any type of rating, identifiers, and information which may be indicated in a record(s) may be utilized within the scope of the embodiments herein.

As illustrated in FIG. 10, a request record 800a is created. The request record 800a may include information which indicates a request(s), a user ID(s), a keyword(s), a profile(s), and a category(ies) which are associated with a request indicated in the request record 800a. In order to select one or more results, such as the results 'result 1', 'result 2', 'result 3', 'result 4', and 'result 5' which may be associated with a result record such as the result record 600 (FIG. 6), it is desirable to rank the results. For example, in order to rank results, a numeric value is assigned to any or all of the results and the results are sorted or ranked based on the numeric value.

As illustrated in FIG. 10, an item such as the result records 600a-600e are assigned a rating associated with an item such as a category, a keyword, and a profile. As illustrated in FIG. 10 a result indicated by a result record may or may not have a rating associated with any or all of the items associated with a request. For example, the result 'result 4' has no rating associated with the keywords 'keyword 1' and 'keyword 2' as indicated in the keyword records 700a and 700b, but the result 'result 1' has a rating associated with 'keyword 1, 'keyword 2', 'profile 1', 'category 1' and 'category 2', as indicated in the category records 900a, and 900b, and the profile record 950.

In order to select an item such as a result to be associated with a target item such as a request, a formula may be applied which computes a rating of an item(s) based on any or all information associated with the target item. Continuing with the example illustrated in FIG. 10, the results 'result 1', 'result 2'and 'result 3' might be ranked based on a corresponding rating associated with the keyword, 'keyword 2'. In such a case, if results are ranked from lowest rating value to highest rating value, 'result 3' would be ranked first, 'result 2' would be ranked second, and 'result 1' would be ranked third.

Alternately, an item might be selected based on a ranking which includes ratings associated with more than one item associated with a target item. Using the example illustrated in FIG. 10, a result(s) might be ranked based on rating information associated with the keywords 'keyword 1'and 'keyword 2', the profile 'profile 1', and the categories 'category 1' and 'category 2'For example a result might be assigned a rating which is a sum of all rating(s) associated with the result which are associated with 'keyword 1', 'keyword 2', 'profile 1', 'category 1'and 'category 2'. Thus, 'result 1'would have a rating of '1'+'3'+'1'+'1'+'2' (8), the result 'result 2' would have a rating of '2.2'+'2.2'+'2.2'+'2.2'+'9' (17.8), the result 'result 3' would have a rating of '5'+'1 '+'4'+'5' (15), the result 'result 4' would have a rating of '6'+'2'+'2.2' (10.2), and the result 'result 5' would have a rating of '1'. If the results are ranked from highest to lowest based on the computed rating, the result 'result 2' would be ranked first, 'result 3' would be ranked second, 'result 4' would be ranked third, 'result 1' would be ranked fourth, and 'result 5' would be ranked fifth.

Other methods of computing a rating(s) and/or ranking(s) of an item(s) in order to select an item(s) to be associated with a target item will readily occur to one of ordinary skill in the relevant art. While the selection in FIG. 10 has been illustrated with a limited number of records, and limited types of items or records, any number of records and any types of information may be used in order to select an item(s) to be associated with a target item(s). For example, a guide(s), a result(s), an advertisement(s), a search resource(s), a category (ies), etc. may be selected to be associated with a request using a selection such as that illustrated in FIG. 10. Likewise, a selection may be made recursively and/or to multiple types of records and/or items. For example, a keyword(s) associated with a request(s) might be used to select a category(ies), and the category(ies) associated with the request might be used to select a guide(s) to be associated with the request.

A simplified database relationship between records in the database 120 is depicted in FIG. 11. Using the example relationship in FIG. 11, a guide, a result and a trigger resource(s) may be selected to be associated with a user request. Communication may be established between any user system and/or guide system and/or resource system by the search system 130 (FIG. 1) using information indicated in the database 120.

While the relationships in the database have been depicted using a limited number of user, guide, result, resource, category, keyword, and request records, any number of records required to operate the embodiments may be utilized by the search system 130.

A user record, a guide record, a result record, a resource record, a keyword record, a category record and/or a request record may include additional fields and any field(s) may be blank. For example, a user record may include information which may be used to provide payment to the search system 130, information which may be used to select a guide(s), a result(s), a resource(s), and/or other information, etc. For example, a guide record may include information which may be used to provide compensation to a guide, information which may be used to select a guide(s), a result(s), an advertisement(s), a resource(s), a keyword(s), a category and/or other information, etc. For example, a result record may include information regarding delivery of a result, a provider of a result, etc. For example, a keyword record may include information of a category(ies), a guide(s), a user(s), a search resource(s), etc. which may be associated with a keyword.

While the selection of a guide and/or result(s) and/or resource(s) has been illustrated using a particular data structure(s), other equivalent types of data structures may be used within the scope of the embodiments described herein. The selection of a guide(s), a resource(s), and/or a result(s) is not limited to the particular example illustrated herein. One of ordinary skill in the relevant art will immediately recognize that other selection criteria and mechanisms may be utilized within the spirit and scope of the embodiments herein.

In at least one embodiment, historical information may be utilized to select a guide(s) and/or a resource(s) and/or a result(s). For example, if a user previously submitted a request for information regarding restaurants, and was provided with one or more result(s) relating to that query, a guide and/or a search resource associated with information associated with a previous request may be more likely to be selected. Likewise, if a user previously received a result(s) associated with a request, the result(s) may be less likely selected. In at least one embodiment, a guide and/or other information may be selected based at least in part on information associated with a request which was submitted in response to an alert which was delivered to a user(s).

An exemplary graphical user interface to select a request and/or information pertaining thereto is illustrated in FIG. 12. The query selection GUI 1200 may be used for various purposes, such as selection of a historical request(s), or to select queries associated with a user(s), a guide(s), a category(ies), a keyword(s), etc.

As illustrated in FIG. 12, the query selection GUI 1200 may include a guide/user identifier 1205, login controls 1210, query selection controls 1215, query viewing window 1220, query viewing controls 1222, query indicators 1224 and action controls 1225. The query selection GUI 1200 may be presented to a user, and/or a guide in order to review and select a request(s). For example, the query selection GUI 1200 may be used by a guide and/or a user to select a request or search query based on information indicated in the database 120.

The guide/user identifier 1205 may include information associated with a user of the query selection GUI 1200. For example a login ID or other information associated with a user of the query selection GUI 1200 may be displayed in the guide/user identifier 1205. While a specific indicator is utilized in the example illustrated in FIG. 12, any identifying information may be indicated in the guide/user identifier 1205.

The login controls 1210 may be used to logon or logoff of the search system 130 (FIG. 1) to navigate to one or more GUIs. Activation of the 'logout' control 1210*a* may toggle between logged in and logged out of the system. In order to login, a user of the GUI 1200 may be required to enter security information, etc. The login controls 1210 may allow navigation to other graphical user interfaces. For example, the 'manage queries' control 1210*b* causes the query selection GUI 1200 to be presented.

The query selection controls 1215 may be used to apply filtering criteria in order to select a search query(ies). The query selection controls 1215 may include selection criteria boxes 1217*a*, 1217*b*, and 1217*c* and selection value boxes 1219*a*, 1219*b*, and 1219*c*. The selection criteria boxes 1217 may allow selection of a filtering condition, such as a keyword(s), a category(ies), a guide(s), a time period(s), a user (s), and/or other information indicated in the database 120. The selection value boxes 1219 allow selection of a value(s) associated with a filtering condition(s) identified in the selection criteria boxes 1217. Alternately, the query selection controls 1215 might be implemented as a search box, a typing box, or equivalent interface. Although specific examples of content are illustrated in the selection criteria boxes 1217 and the selection value boxes 1219, any information indicated in the database 120 (FIG. 1) might be indicated in the query selection controls 1215 (FIG. 12).

The query viewing window 1220 displays information of one or more requests which have been selected using the query selection controls 1215. As illustrated in FIG. 12, the query viewing controls 1222 allow a user to scroll through a list of information displayed in the query viewing window 1220. The up arrow 1222*a* scrolls upward in the list of items displayed in the query viewing window 1220, the down arrow 1222*b* scrolls downward in the list of items displayed in the query viewing window 1220, and the scrolling control 1222*c* moves to a location within information displayed in the query viewing window 1220. The query indicators 1224*a*, 1224*b* and 1224*c* allow selection of one or more queries. A user may select an item displayed in the query viewing window 1220 by, for example, highlighting and/or clicking on a query indicator such as the query indicators 1224*a*, 1224*b*, and/or 1224*c*. Such an action may cause the condition selection GUI 1300 illustrated in FIG. 13 to be displayed. Although a request is described as being selected from one or more requests displayed in the query viewing window 1220, the present invention is not limited. For example, a user may enter a request to be associated with any condition such that upon an occurrence of the condition, an action is performed and the user is notified of results thereof. Further, a request that is independent of previously defined categories of information may be set to trigger an action.

The query selection GUI action buttons 1225 allow actions to be taken regarding information indicated in the query selection GUI 1200. The 'Accept' button 1225*a* opens the condition selection GUI 1300. The 'Cancel' button 1225*b* exits the query selection GUI 1200. The 'Clear' button 1225*c* clears all information indicated in the query selection controls 1215.

An exemplary graphical user interface to associate a trigger condition with a search query is illustrated in FIG. 13. The trigger selection GUI 1300 may be used to choose a trigger condition from a selection of a trigger resource(s), or to identify a new trigger condition to be associated with a request.

As illustrated in FIG. 13, a trigger selection GUI 1300 may include guide/user identifier 1205, login controls 1210, a search query box 1305, a trigger option window 1310, a trigger definition window 1315, trigger action controls 1320, a trigger entry box 1325 and trigger GUI action buttons 1330. The trigger selection GUI 1300 may be presented to a user, and/or a guide on demand. For example, the trigger selection GUI 1300 may be used by a guide and/or a user to select a trigger condition(s) to be associated with a request based on information indicated in the database 120 (FIG. 1).

The guide/user identifier 1205 and login controls 1210 display an identifier of a user and/or guide, and allow a user of the trigger selection GUI 1300 to logon or logoff of the system 100 (FIG. 1) and to navigate as previously explained with respect to FIG. 12.

The search query box 1305 includes information of a request. Although a text query is illustrated in FIG. 13, other information associated with a request, such as audio, images, videos, etc. which may be associated with a request may be indicated in the search query box 1305. For example, an audio recording of a request, or an image associated with a request may be accessible using the search query box 1305. An indicator of a group of requests such as a category(ies), keyword (s), etc. might be present in the search query box 1305. In such an instance, a group of requests associated with a topic might have been selected using the query selection GUI 1200 (FIG. 12).

The trigger option window 1310 includes information of trigger conditions which may be associated with a request indicated in the search query box 1305. Information in the trigger option window may be presented based on any information indicated in the database 120 (FIG. 1). For example, a trigger condition(s) which have been associated with requests which are associated with a keyword(s) and/or category(ies) associated with a request indicated in the search query box 1305 may be displayed in the trigger option window 1310. A trigger condition may be indicated in an action control such as the trigger indicator controls 1312*a*, 1312*b*, 1312*c* and 1312*d*. Trigger conditions may be transferred from the trigger option window 1310 to the trigger definition window 1315. For example, double clicking on the trigger indicator control 1312*a* may transfer the condition 'in the next two weeks' from the trigger option window 1310 to the trigger definition window 1315.

The trigger definition window 1315 displays information of one or more conditions which may be associated with a request indicated in the search query box 1305. A trigger condition may be indicated in a control such as the trigger definition indicators 1317*a*, 1317*b* and 1317*c*. Any number of trigger conditions may be indicated in the trigger definition window 1315. A trigger condition may be removed from the trigger definition window. For example, double clicking on the trigger definition indicator 1317*b* may remove the condition 'tickets are less than $50' from the trigger definition window 1315. A logical combination of conditions is indicated in the trigger definition indicator 1317*c*.

The trigger action controls 1320 allow actions to be taken regarding information indicated in the trigger definition window 1315 and/or the trigger option window 1310. The 'Add' button 1320*a* transfers a condition selected in the trigger option window 1310 to the trigger definition window 1315. The 'Remove' button 1320*b* removes a condition selected in the trigger definition window 1315 from the trigger definition window 1315. The logic control 1320*c* allows logical functions to be applied to information in the trigger definition window 1315. A drop-down list of operations may be provided to allow any or all conditions indicated in the trigger definition window 1315 to be combined. Using the example illustrated in FIG. 13, the conditions 'in the next 2 weeks' and 'tickets are less than $50' are combined with the function 'AND' to determine if the request 'where is curly hair playing' will be activated. The 'New' button 1320*d* allows a user to enter a condition to be added to the trigger definition window 1315 using the trigger entry box 1325.

The trigger entry box 1325 may be implemented as a search box and/or a typing box. As a condition is entered in the trigger entry box, similar trigger conditions which may be indicated in the database 120 (FIG. 1) may be presented. For example a drop-down list of suggested trigger conditions may be presented as a condition is entered in the trigger entry box 1325. A trigger condition entered in the trigger entry box 1325 may be transferred to the trigger definition window 1315 using the 'Add' button 1320*a*.

The trigger GUI action buttons 1330 allow actions to be taken regarding information obtained using the trigger selection GUI 1300. The 'Accept' button 1330*a* causes information obtained using the trigger selection GUI 1300 to be recorded in the database 120 (FIG. 1), and may close the trigger selection GUI 1300. The 'Cancel' button 1330*b* exits the trigger selection GUI 1300 without recording information obtained. The 'Clear' button 1330*c* clears any conditions indicated in the trigger definition window 1315.

Figure 14:
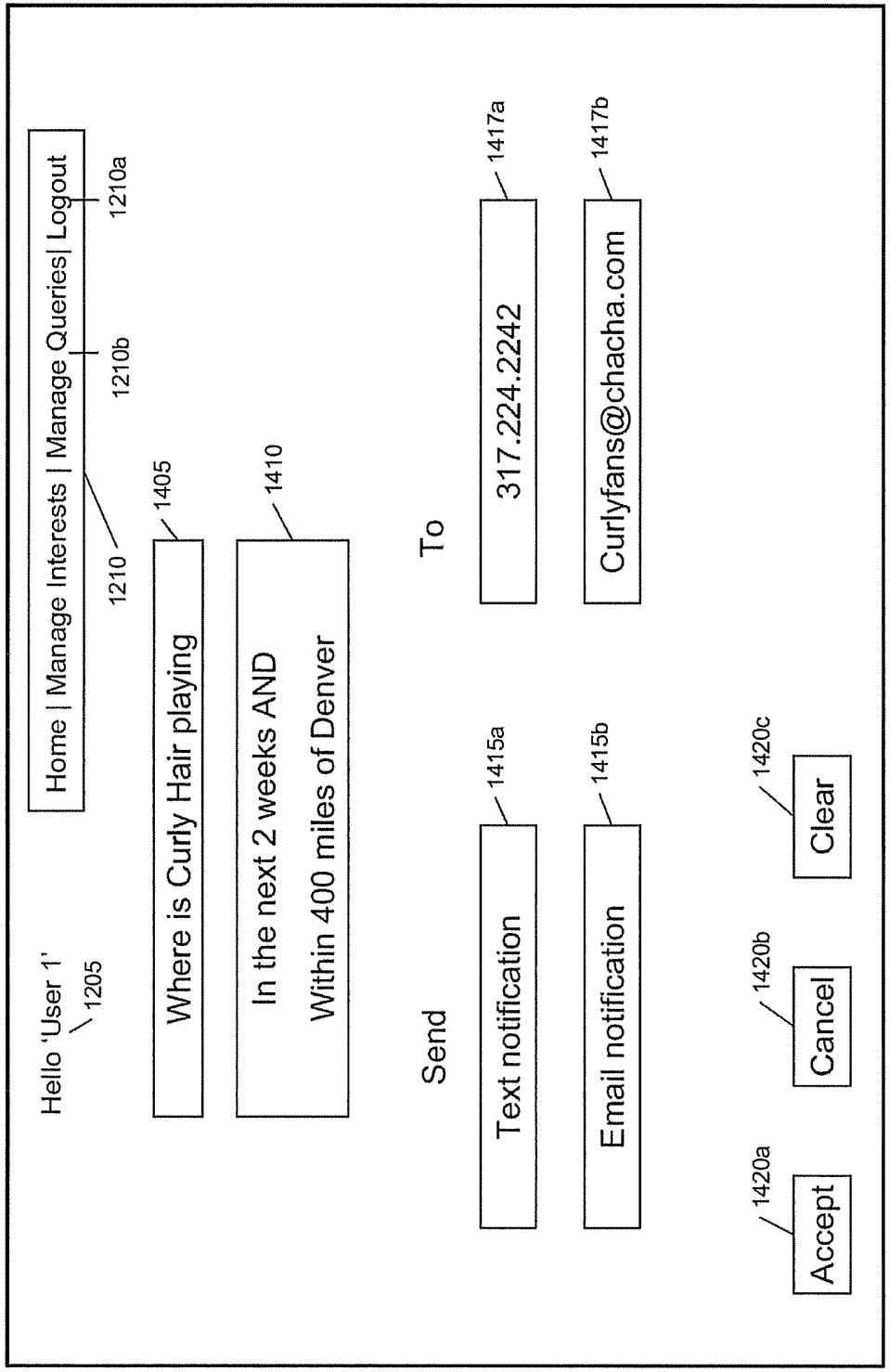
FIG. 14 illustrates a GUI.

As illustrated in FIG. 14, a result delivery GUI 1400 may include a guide/user identifier 1205, login controls 1210, a search query box 1405, a trigger condition box 1410, result delivery controls 1415, delivery target indicators 1417 and delivery GUI action controls 1420. The result delivery GUI 1400 may be presented to a user, and/or a guide on demand. For example, the result delivery GUI 1400 may be used by a guide and/or a user to designate how a result(s) is delivered to a user and/or a guide based on information indicated in the database 120 (FIG. 1), such as a user record(s) and/or guide record(s).

The guide/user identifier 1205 and login controls 1210 display an identifier of a user and/or guide, and allow a user of the result delivery GUI 1400 to logon or logoff of the system 100 (FIG. 1) and to navigate as previously explained with respect to FIG. 12.

The search query box 1405 includes information of a request. Although a text query is illustrated in FIG. 14, other information associated with a request, such as audio, images, videos, etc. which may be associated with a request may be indicated in the search query box 1405. For example, an audio recording of a request, or an image associated with a request may be accessible using the search query box 1405. The search query box may indicate a specific request, and/or topics which are associated with a request(s). Using the example illustrated in FIG. 14, the query 'where is curly hair playing' is the search query. However an indicator of a group of requests might also be utilized. For example, a group of requests regarding a topic such as 'music' or 'basketball' or any other grouping might be displayed in the search query box 1405.

The trigger condition box 1410 includes information of a trigger or alert condition(s) associated with a request(s) indicated in the search query box 1405. If no trigger condition is associated with a request(s), the trigger condition box 1410 may be blank. The trigger condition box 1410 may be implemented as a text entry box, and/or an indexing box, which may allow entry of and/or selection of a trigger condition to be associated with a request(s) indicated in the search query box 1405. Such an interface may allow a trigger condition to be associated with a request(s) as an alternative to, or in conjunction with the trigger selection GUI 1300.

The result delivery controls 1415 allow a communication service and/or system(s) to be identified for delivery of a result(s) associated with request(s) indicated in the search query box 1405. The delivery controls may be implemented as a pick list(s) and/or drop-down menu which may indicate communication channels associated with one or more users and/or guides. Using the example illustrated in FIG. 14, the delivery control 1415a indicates that a text message is to be sent to the phone number '317.242.2422' as indicated in the delivery target indicator 1417a if a result associated with the query 'where is curly hair playing' is obtained responsive to the condition 'in the next two weeks' AND 'within four hundred miles of Denver' as indicated in the trigger condition box 1410. The delivery control 1415b indicates that an email is to be sent to 'curlyfans@chacha.com' as indicated in the delivery target indicator 1417b if a result associated with the query 'where is curly hair playing' is obtained responsive to the condition 'in the next two weeks' AND 'within 400 miles of Denver.' The delivery controls 1415 and the delivery target indicators 1417 may include any number of elements required to deliver information including result(s), alert(s) and/or notification(s). A group(s) of users and/or guides may be designated using the delivery controls 1415. For example, a group of guides and/or user(s) associated with a keyword(s) and/or category(ies) may be designated to receive a result(s) associated with a request(s) and a trigger condition indicated in the request box 1405 and the trigger condition box 1410.

The delivery GUI action buttons 1420 allow actions to be taken regarding information obtained using the result delivery GUI 1400. The 'Accept' button 1420a causes information obtained using the result delivery GUI 1400 to be recorded in the database 120 (FIG. 1), and may close the result delivery GUI 1400. The 'Cancel' button 1425b exits the result delivery GUI 1400 without recording information obtained. The 'Clear' button 1425c clears the content of the delivery controls 1415 and the delivery target indicators 1417.

While the GUIs 1200, 1300 and 1400 have been illustrated using particular types of control elements, other equivalent control elements as are well known in the art may be utilized to implement the GUIs. While specific examples of trigger conditions and options for selection of a query and/or a trigger condition are used for the purposes of illustration there is no limitation or constraint on a request and/or a trigger. For example historical queries and resources may be provided to a guide in order to facilitate selection of resources or a search resource(s), trigger resource(s) associated with a category (ies) and/or a keyword(s) of a request may be provided to a user and/or a guide in order to simplify the task of formulating a request and/or a trigger condition, etc. Such aides are provided to facilitate a task, but do not require that any exiting request(s), resource(s), result(s), etc. be utilized for a triggered request.

In at least one embodiment, the GUIs 1200, 1300, and 1400 may be used by a guide in order to associate a trigger condition with a request. For example, a guide may create a search query based on a spoken query received from a user, and may subsequently associate a condition with the request. A guide may associate one or more users with an existing request. For example, if a request submitted by a user is matched to an existing request, a user ID may be added to a record associated with the request. A user may be associated with a request automatically. For example, a user may elect to be associated with a keyword(s), a category(ies) and/or other item(s) and if the item(s) is associated with a request(s) a user may be associated with the request(s). Information of a request(s) may be provided to one or more user(s) who may elect to be associated with a request(s). User(s) may be provided with information of a request(s) using any user system(s). For example, a user may receive information of a request(s) using a text message and may elect to receive a result(s) based on a response using a text message, a website, an email, an IM, etc.

As illustrated in FIG. 15, system 1500 includes guide systems 1505, 1510, a network 1515 such as the Internet, a database 1520, which may comprise various records, a search system 1530, user system(s) 1535, 1540 and taxonomist systems 1545, 1550 and resources 1555, 1560, 1565.

Communication between the guide systems 1505, 1510 the user systems 1535, 1540 and/or the search system 1530 may include conversion of text to speech and speech to text. Any type of media which can be sent or received using a communication service associated with a guide system, a user system, and/or the search system 1530 may be part of a communication session. A communication session may be conducted using any or all communication service(s) associated with a user and/or a guide and/or the search system 1530. An advertisement may be transmitted including during any or all communication sessions between a user, a guide and/or the search system.

The network 1515 (FIG. 15) may be a global public network of networks (the Internet) and/or consist in whole or in part of one or more private networks and communicatively couples the guide systems 1505, 1510, the user systems 1535, 1540, the taxonomist systems 1545, 1550 and the resources 1555, 1560, 1565 with other components of the system such as the search system 1530, and the search system 1530. The network 1515 may include any type of wired and/or wireless networks such as GSM, WiFi, WiMax, 2G, 3G, Bluetooth, etc.

The search system 1530 allows interaction to occur between the guide systems 1505, 1510, the user systems 1535, 1540, the taxonomist systems 1545, 1550 and the resources 1555, 1560, 1565. For example, an information search query(ies) can be transmitted from the user systems 1535, 1540, to the search system 1530, where a search query (ies) can be accessed by the guide systems 1505, 1510. Similarly, a search result(s) produced using the guide systems 1505, 1510 in response to a search query(ies) submitted by the user systems 275, 280 may be transmitted to the search system 1530, where it may be stored by the search system 1530 and/or may be transmitted to the user systems 1535, 1540. The resources 1555, 1560, 1565, may be accessed by the guide system 1505 to obtain a search result which may be provided to the search system 1530 and/or the user system 1535.

While only a limited number of systems associated with a human searcher (also referred to as a guide), information seeker (also referred to as a user or requester), a taxonomist, a resource and a search system are depicted in FIG. 1, it is within the scope of the disclosure for any number of guide systems, user systems, taxonomist systems, and resource systems to be utilized.

Any guide system (e.g., the guide systems 1505, 1510) can be operated by a human searcher to obtain search results for an information seeker located at a user system(s) (e.g., the user systems 1535, 1540). Any user system (e.g., the user systems 1535, 1540) can be operated by a person or entity to submit a request to the search system 1530 and/or receive a search result(s). Any taxonomist system (e.g., the taxonomist systems 1545, 1550) can be operated by a person to review and/or modify information indicated in the search system 1530 and/or the search system 1530 and/or other elements of the system 1500.

A resource such as resources 1555, 1560, 1565 may include any system(s), software, hardware, personnel and/or other facility(ies) which may provide information to a guide (s), a user(s), a taxonomist, a resource and/or the search system 1530. For example, a resource may be a search engine, a database system, a library, a personal hard drive and/or other local storage, printed materials, recordings of any sort, a software program(s), a person or person(s), an organization, etc. A resource may be freely accessible to any user(s) and/or guide(s) and/or may be available on a restricted basis. A resource may not be accessible using the network 1515, but may be accessible to a guide(s) and/or a user(s). For example, a resource such as the resource 1565 may be accessible to one or more guide(s) operating a guide system(s) such as the guide system 1505 using various types of communication. For example, a guide(s) may observe and/or become aware of an event(s) that may be presented as a search result(s). Information in any form, such as printed media, audio and/or visual information, software, hardware, etc. which may be accessible to a guide(s), a user(s) and/or a taxonomist may be a resource.

The search system 1530 is communicatively coupled with the search system 1530. As will be described herein in further detail below, the search system 1530 includes data that is processed in association with operation(s) of the embodiments. Although FIG. 1 illustrates the search system 1530 as a separate component of the system, the search system 1530 may be integrated with the search system 1530. Further, the records maintained in the search system 1530 may be stored in any conventional manner, including in a Network Attached Storage (NAS), a Storage Area Network (SAN), etc. using any conventional or proprietary database software such as DB2®, Informix®, Microsoft® SQL Server™, MySQL®, Oracle®, etc., and may also be a distributed database on more than one server.

A user system, a guide system and/or a taxonomist system may be a desktop or portable computer, such as a PC or Mac®, a mobile phone, a smart phone, a PDA, a server system, a landline phone, a specialized communication terminal, a terminal connected to a mainframe, or any other communication device. The search system 1530 may include one or more servers, computers, etc. For example, servers such as the PowerEdge® 2900 by Dell, or the Blade-CenterJS22 by IBM, or equivalent systems might be used to implement elements of the search system 1530. The search system may utilize an operating system (OS) such as Microsoft Windows XP, or Linux, etc. Voice routing and packet switching may be accomplished using well established technologies such as those provided by Cisco, or other networking companies. After being presented with the disclosure herein, one of ordinary skill in the relevant art will immediately realize that any viable computer system(s) or communication device(s) known in the art may be used as user systems, guide systems, and/or to implement the search system 1530.

The user systems 1535, 1540, the guide systems 1505, 1510, the taxonomist systems 1545, 1550 and the search system 1530 may include equipment and/or personnel required to send and/or receive messages between a user system, a guide system, and/or the search system using the network 1515. The search system 1530 includes information which may allow the search system 1530 to establish communication between the elements of the system 1500.

A guide may be required to register with the search system 1530. As part of a registration process, at least one communication method is associated with a guide. In at least one embodiment, a guide may register with the search system 1530 and establish a username and password which are associated with the guide. A guide may login to the search system 1530 using a web browser functionality of the guide systems 1505, 1510 in order to communicate with the search system 1530. Multiple communication services may be associated with a guide and may allow a communication session to be established between the search system 1530 and a guide system such as the guide system 1505. Multiple identifiers of a guide may be associated with each other. Information such as an IM credential(s), an email address(es), a phone number (s), a username(s), etc. of a guide may be identified which may allow the search system 1530 to establish a communication session between a guide system(s) and a user system(s), a taxonomist system(s), and/or the search system 1530.

When a guide registers with the search system 1530, the guide may be associated with one or more keyword(s), category(ies), profile(s) and/or other information. For example a keyword(s) and/or category(ies) may be selected by a guide, and/or may be associated with a guide based on a test(s) administered to a guide and/or other information provided during and/or after a registration process. Information associated with a guide may be stored in the search system 1530 and may be used for purposes such as matching a guide to a user request, determining and providing compensation to a guide, communicating with a guide.

A process for associating a guide with a database or index, which may be used to select a guide responsive to a search request, is further described herein below. A guide may be required to provide information to the search system 1530 as part of a registration process. As explained herein, a guide may select to be associated with a category or the system 1500 may associate a guide with a category, keyword, and/or item (s) based on information of the guide.

A user may be identified by the search system 1530. When a user system such as the user system 1535 establishes a communication session with the search system 1530, an identifier of a user system is determined. An identifier of a user system may be associated with other information regarding a user. A user system may be identified using an email address, a telephone number, an IM credential, a username, and/or other identifier which may be used to associate information with a user. Multiple identifiers of a user may be associated with each other. Using information of a communication service(s) associated with a user, a communication session may be established between a user system(s) and a guide system (s), a taxonomist system(s), a resource(s) and/or the search system 1530. Information such as a keyword(s), category (ies), a user profile(s), previous request(s), previous search result(s), etc. may be associated with a user. Information of a user may be stored in the search system 1530.

A taxonomist, which may be a person(s) and/or entity(ies), may be identified by the search system 1530. Information of at least one communication service is associated with a taxonomist system which allows a communication session to be established between a taxonomist system and the search system 1530. An identifier of a taxonomist system may be associated with other information regarding a taxonomist. The taxonomist systems 1545, 1550 may be identified using an email address(es), a telephone number(s), an IM credential (s), a taxonomist username(s), a URL(s) and/or other identifier(s) which may be used to associate information with a taxonomist. Multiple identifiers of a taxonomist may be associated with each other. Using the information of communication services associated with a taxonomist, a communication session may be established between a taxonomist system such as the taxonomist system 1545 and a user system(s), a guide system(s), and/or the search system 1530. Information such as a keyword(s), a category(ies), a profile(s), or other information may be associated with a taxonomist. Information of a taxonomist may be stored in the search system 1530.

The search system 1530 may be able to establish a communication session between any user system(s), guide system (s), resource(s) and/or taxonomist system(s) using information indicated in the database 1520. For example, the user system 1535 may establish a voice communication session with the search system 1530, and subsequently the search system 1530 may provide information of a request to the guide system 1505 using internet-based communication. The guide system 1505 may establish an IM communication with the resource system 1555 and may obtain a search result. The guide system 1505 may provide the search result to the search system 1530 using an email message, and the search system may provide a search result to the user system 1535 using an SMS message. While a few types of communication services are used in this example, any type of communication session using one or more services such as voice, SMS, EMS, MMS, email, IM, chat, web based communication, etc. may be established between any user system(s), guide system(s), resource(s) and/or taxonomist system(s) and/or the search system 1530 using the network 1515. The search system 1530 may include hardware, software and/or personnel which enable the search system to communicate with other elements of the system using various communication services.

Figure 16:
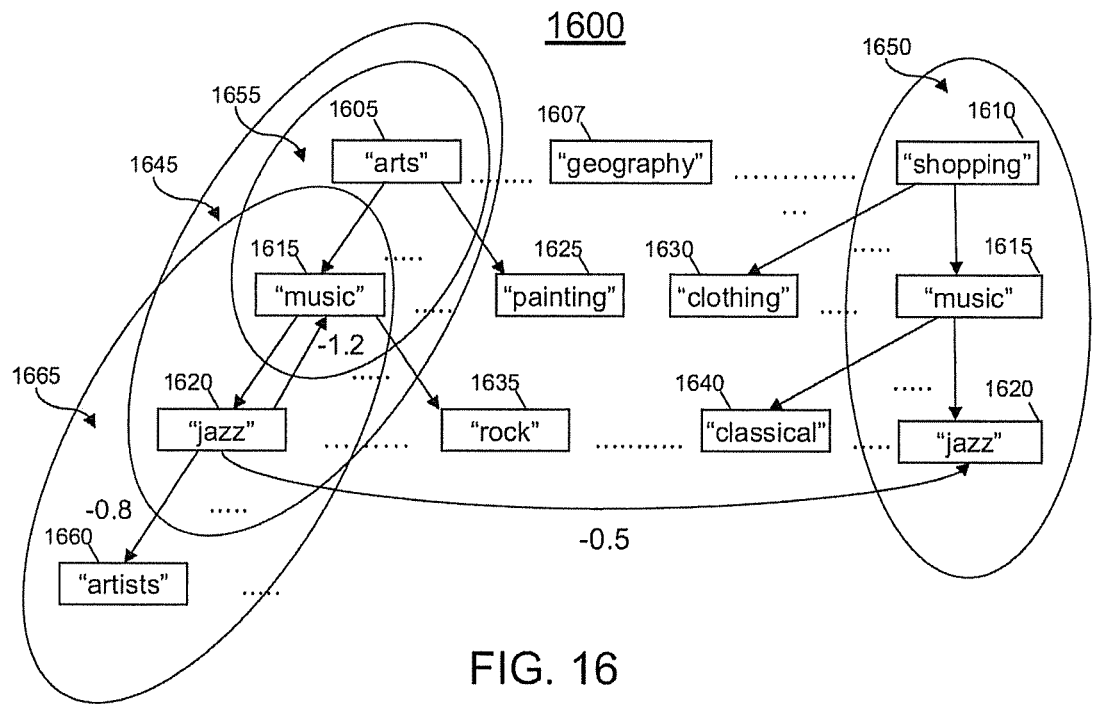
FIG. 16 illustrates a database relationship.

An index 1600 is illustrated in FIG. 16. Top-level elements or nodes of the index tree (also referred to as 'path root terms') represent broad categories of information which are intended to encompass as much information as possible without overlapping each other. Path root terms such as the path root terms "arts" 1605, "geography" 1607 and "shopping" 1610 may be a limited set of words and/or phrases which may be used to classify or categorize information such as a search request, a guide, an advertisement, a search result, etc.

Figure 17:
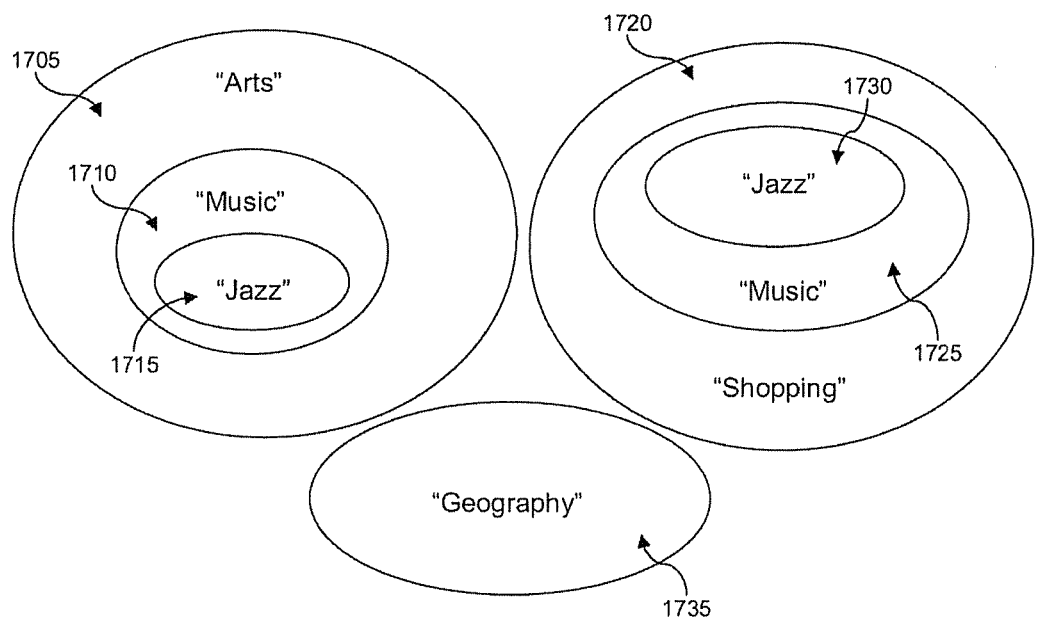
FIG. 17 illustrates a database relationship.

A word(s) or phrase(s) associated with lower-level nodes may appear in multiple locations within an index or database. Such words and/or phrases may be referred to as 'topics'. For example, words and/or phrases such as the path terms "music" 1615, "jazz" 1620, "painting" 1625, "clothing" 1630, "rock" 1635, "classical" 1640, "artists" 1660 and/or others may be utilized in any path defined in the index 1600. A subset of information is defined by specifying 'path terms' which may follow a subset relationship (i.e., an added word and/or phrase defines a more specific set of information which is contained within the preceding set of information). An example of this relationship is designated by the notation "arts>music>jazz" indicating that "jazz" is a subset of "music" which is a subset of "arts". This may for example designate the path "arts>music>jazz" 1645. Such a subset relationship is represented in FIG. 17. The selected subset of information is contained within a perimeter of the set 1715. A guide and/or item associated with a more specific subject, which may correspond to a longer path (e.g., the path "arts>music>jazz" 1645 (FIG. 16)) may be more likely to be relevant to a query associated with the path than a guide and/or information associated with a shorter path (e.g., the path "arts>music" 1655). For example, if a query is associated with the category "arts>music>jazz" and a guide associated with "arts>music>jazz" has a rating which is equal to that of a guide associated with "arts>music", the guide associated with "arts>music>jazz" would be ranked higher.

A path which begins with a path root term, such as the path "arts>music" 1655, or the path "shopping>music>jazz" 1650 may be referred to as a "proper path". A path which does not begin with a path root term such as the path "music>jazz>artists" 1665 may be referred to as a 'path snippet'. A path snippet may occur in multiple locations within an index such as the index 1600. The presence of such a path snippet may indicate that proper paths which contain identical path snippets may be related.

As illustrated in FIG. 17, an overlap in relevant information associated within any given set(s) of information defined by a path root term may exist. For example, the information included in the root term set "arts" 1705, and the topic subset "music" 1710, and the topic subset "jazz" 1715 (i.e., associated with the path "arts>music>jazz" 1645 (FIG. 16)) may also be relevant to the information included in the root term set "shopping" 1720, and the topic subset "music" 1725, and the topic subset "jazz" 1730 (i.e., associated with the path "shopping>music>jazz" 1650 (FIG. 16)). If a hierarchical approach is used to rank guide(s), associated with the index 1600 it is unlikely that a guide(s) or item(s) associated with the category "shopping>music>jazz" will be ranked highly when selecting a guide(s) and/or item(s) to respond to a search request or other item(s) associated with the category "arts>music>jazz". In a hierarchical ranking, a guide associated with the category "arts>music" would be more likely to be highly ranked for a query associated with "arts>music>jazz" than a guide associated with "shopping>music>jazz".

The presence of a shared path snippet (e.g., "music>jazz") may be identified by the system 1500 (FIG. 15). In order to improve effectiveness of a categorization index, a link may be established between proper paths. For example, a link may be established between the proper path "arts>music>jazz" 1645 (FIG. 16) and the proper path "shopping>music>jazz" 1650. Such a link may be established based on automatic detection of a relationship between the paths by the search system 1530 (FIG. 15) and/or may be based on a judgment of a human taxonomist operating a taxonomist system such as the taxonomist systems 1545, 1550. Such a link may be unidirectional (i.e., "arts>music>jazz" is equivalent to "shopping>music>jazz", but "shopping>music>jazz" is not equivalent to "arts>music>jazz"), or bidirectional (i.e., "arts>music>jazz" is equivalent to "shopping>music>jazz" and vice-versa). A method and system for creating and maintaining linkages between proper paths is described further herein below.

While the index 1600 (FIG. 16) is illustrated with only a few levels (i.e., short paths), any number of levels and/or length of paths may exist within the index 1600. It is possible that paths which contain multiple path terms in common may exist. For example, the proper path "arts>music>jazz>artists>1960" and the proper path "arts>music>jazz>1960>artists" might exist. Such a condition may be identified, and a human taxonomist and/or the search system 1530 (FIG. 15) may determine that one or more proper paths are equivalent. The search system 1530 may determine an association between paths based on a similarity of information identifying the nodes. In such a case, a linkage may be established which associates guides and/or information associated with a proper path with any equivalent proper path. Using a different example, a proper path such as "arts>music>songwriters>baby boomers" might exist. Such a path might be determined to be strongly related to a path such as "arts>music>artists>1960s" because the first path terms are common, and the path snippet "songwriters>baby boomers" is related to the snippet "artists>1960s". A taxonomist and/or other elements of the system 1500 may determine if a linkage should be established between proper paths.

Various types of information may be associated with any proper path within the index 1600 (FIG. 16). Any proper path designates a unique element within the index 1600. Using the example in FIG. 16, the node designated by the proper path "arts>music" 1655 is different than the node designated by the proper path "arts>music>jazz" 1645 and the node designated by the proper path "shopping>music>jazz" 1650. Any element within the index 1600 may be associated with one or more records such as the categorization record 1800 illustrated in FIG. 18.

As illustrated in FIG. 18, an exemplary categorization record 1800 is provided, of which one or more may be associated with or resident in the search database 1520 (FIG. 15). The categorization record 1800 may include a categorization record ID field 1805, a categorization guide identifier field 1810, a guide rating field 1815, a categorization guide interests field 1820, a linked category ID field 1825 and a linked category function field 1830, categorization advertisement ID field 1835, an advertisement rating field 1840, a categorization resource ID field 1845, and a resource rating field 1850.

The categorization record ID field 1805 may include an identifier of a categorization, which is preferably unique and preferably used consistently. For example, in at least one embodiment, the categorization record ID field 1805 can include a randomly generated numerical code and/or a character string indicating a categorization. A categorization record ID serves to distinguish a categorization record associated with a categorization from a categorization record associated with other categorization(s). Although particular examples of identifiers are described herein, other types of identifiers uniquely indicating a categorization(s) may be utilized without departing from the spirit and scope of the embodiments herein. In at least one embodiment, a description of a proper path may be included in the content of the categorization record ID field 1805. A categorization record ID may include a categorization description, a random numeric code, and/or any other information uniquely identifying an element within an index. Using the example in FIG. 18, 'arts>music>jazz' is the categorization record ID associated with the categorization record 1800.

The categorization guide ID field 1810 may include one or more identifiers of a guide(s) which may be associated with a categorization. Using the example in FIG. 18, the guide IDs 'guide1', 'guide2' and 'guide3' have been associated with the categorization record 1800. While only a few guide identifiers have been illustrated in FIG. 18, any number of guide identifiers may be associated with a categorization.

The categorization guide rating field 1815 may include information of ratings associated with a guide(s) indicated in the categorization guide ID field 1810. For example, the guide rating field 1815 may include a rating of a guide based on search result(s) produced by the guide responsive to search request(s) associated with the categorization identified in the categorization record ID field 1805. In at least one embodiment, the categorization guide ID field 1810 and the categorization guide rating field 1815 may be linked by, for example, a pointer. Using the example illustrated in FIG. 18, the rating '3' has been associated with 'guide1', the rating '5' has been associated with 'guide2' and the rating '7' has been associated with 'guide3'. This may indicate that 'guide3' has the highest rating and might be ranked first to respond to a search request associated with 'arts>music>jazz'.

The categorization guide interests field 1820 may include information of interests associated with a guide associated with the categorization indicated in the categorization record ID field 1805. Information indicated in the guide interests field 1820 may be compared to information indicated in a search request which is associated with the categorization identified in the categorization record ID field 1805. In at least one embodiment, a match between information associated with a search request and information indicated in the guide interests field 1820 may modify the ranking of a guide when selecting a guide to respond to the search request. In at least one embodiment, a match between keywords of a query and keywords associated with a request may be used to associate a request with a categorization or node of an index. Using the example illustrated in FIG. 18, the interests 'miles davis' and 'silvano monasteries' have been associated with 'guide1', the interest 'sara montes' has been associated with 'guide2' and the interests 'sara montes' and 'daniel smith' have been associated with 'guide3'. This may indicate that 'guide1' might be selected to respond to a search request associated with the category 'arts>jazz>music' which contained the information 'miles davis' even though the rating of 'guide1' is lower than the rating of 'guide2' and 'guide3' when responding to a search request associated with the category 'arts>music>jazz'. Continuing with the example in FIG. 18, if a search request categorized as associated with the category 'arts>music>jazz' which contained the information 'sara montes' is received, 'guide3' might be selected to respond to the request, as both 'guide2' and 'guide3' are associated with the interest 'sara montes' and 'guide3' has a higher rating associated with the category 'arts>music>jazz'.

The linked category ID field 1825 may include information of categorizations which are associated with a categorization identified in the categorization record ID field 1805. The information included in the linked category ID field 1825 may be used to identify categorization records which may be associated with a guide and/or item(s) which may be selected responsive to a search request. For example, a list of related categorization record ID's may be used to identify a categorization record(s) which may include information of a guide (s) who may have relevant knowledge regarding a search request which is associated with the category 'arts>music>jazz'. Using the example in FIG. 18, the categories 'shopping>music>jazz', 'arts>music' and 'arts>music>jazz>artists' have been associated with the categorization record 1800. This may indicate that a guide and/or information associated with the categorization 'shopping>music>jazz', 'arts>music' and 'arts>music>jazz>artists' may be ranked responsive to a search request associated with the categorization 'arts>music>jazz'.

The linked category function field 1830 may include information of a function and/or other information associated with a linkage between a category listed in the linked category ID field 1825 and a category indicated in the categorization record ID field 1805. Information indicated in the linked category function field 1830 may be used to modify a rating (s) and/or ranking(s) of a guide(s) and/or item(s) associated with a category indicated in the linked category ID field 1825. For example, when selecting a guide and/or item(s) to be associated with a search request determined to be associated with a categorization identified in the categorization record ID field 1805 information indicated in the linked category function field may be used to modify a rating(s) or ranking(s) associated with a guide and a linked category. In at least one embodiment, the linked category ID field 1825 and the linked category function field 1830 may be linked by, for example, a pointer. Using the example in FIG. 18, the function '-0.5' has been associated with the categorization 'shopping>music>jazz'. This may indicate that a rating of a guide associated with the categorization 'shopping>music>jazz' should be reduced by 0.5 when ranking guides to respond to a search request associated with the categorization 'arts>music>jazz'. Likewise, the function '-1.2' and '-0.8' have been associated with the categories 'arts>music' and 'arts>music>jazz>artists', respectively. This may indicate that a rating(s) of a guide(s) associated with the category 'arts>music' may be reduced by 1.2, and that the rating(s) of a guide(s) associated with the category 'arts>music>jazz>artists' may be reduced by 0.8 when ranking guides to be selected responsive to a search request associated with the categorization 'arts>music>jazz'. While only a few categorization IDs are illustrated in FIG. 18, multiple categorization ID's with various linked category functions may be utilized within the scope of the embodiments herein.

Information indicated in the linked category ID field 1825 and the linked category function field 1830 may be obtained in various ways. In at least one embodiment a human taxonomist may identify linked categorizations, and may assign a strength value. Algorithmic techniques may be used alone and/or in combination with human judgment to determine linked categorizations. For example, an algorithmic search may identify proper paths which may share one or more path terms, and may present the identified proper paths for consideration by a human taxonomist and/or automatically add a proper path(s) to the linked category ID field 1825. Information indicated in the linked category function field 1830 may be modified in various ways. In at least one embodiment, a linked category function may be modified based on rating(s) of a search result(s) provided by a guide(s) selected using the information indicated in a linked category ID field. For example, a higher success rate by a guide(s) associated with a categorization identified in the linked category ID field 1825 may decrease a difference in ratings for guides associated with the categorization. A human taxonomist may be presented with various types of information to assist in modification and/or addition of links and/or paths within a selection index or data structure, as will be described further herein below.

The categorization advertisement ID field 1835 may include one or more identifiers associated with an advertisement(s). Using the example in FIG. 18, the advertisement IDs 'indiana jazz festival' and 'www.cheaptickets.com' have been associated with the categorization record 1800. While only a few advertisement identifiers have been illustrated in FIG. 18, any number of advertisement IDs may be associated with a categorization.

The categorization advertisement rating field 1840 may include information of one or more ratings associated with an advertisement(s). For example, the categorization advertisement rating field 1840 may include a rating of an advertisement(s) based on frequency of selection of an advertisement by a guide(s) responsive to search request(s) associated with the categorization identified in the categorization record ID field 1805, payments by advertisers, opinions of users, etc. In at least one embodiment, the categorization advertisement ID field 1835 and the categorization advertisement rating field 1840 may be linked by, for example, a pointer. Using the example illustrated in FIG. 18, the rating '7' has been associated with the advertisement 'indiana jazz festival' and the rating '7.3' has been associated with the advertisement 'www.cheaptickets.com'. This may indicate that the advertisement 'www.cheaptickets.com' has the highest rating and might be selected first to responsive to a search request associated with the category 'arts>music>jazz'. Advertisements associated with categories identified in the linked categorization ID field 1825 may be ranked responsive to a search request associated with 'arts>music>jazz'.

The categorization resource ID field 1845 may include one or more identifiers associated with a resource(s). Using the example in FIG. 18, the resource IDs 'www.jazzismything.org', 'www.jazzwiki.org' and 'chicagoconcerts.org__17.dec.07' have been associated with the categorization record 1800. While only a few resource identifiers have been illustrated in FIG. 18, any number of resource identifiers may be associated with a categorization.

The categorization resource rating field 1850 may include information of one or more ratings associated with a resource (s). For example, the categorization resource rating field 1850 may include a rating of a resource(s) based on frequency of use of a resource(s) by a guide(s) responsive to search request (s) associated with the categorization identified in the categorization record ID field 1805. In at least one embodiment, the categorization resource ID field 1845 and the categorization resource rating field 1850 may be linked by, for example, a pointer. Using the example illustrated in FIG. 18, the rating 'A' has been associated with the resource 'www.jazzismything.org', the rating 'b-3' has been associated with the resource 'www.jazzwiki.org' and the rating '6' has been associated with the resource 'chicagoconcerts.org__17.dec.07'. Any type of rating information may be included in a rating field(s) such as the categorization resource rating field 1850.

Content of the categorization record 1800 may be used to select a guide, an advertisement, a resource and/or other item(s) to be associated with a search request associated with the category 'arts>music>jazz'. An item selected based on an association with a categorization may be deemed to be unsuitable for various reasons. For example, it may be that a guide (s) associated with the category 'arts>music>jazz' is not available when needed to respond to a query, an available guide(s) may have a lower rating than a desired value, etc. In such a case it may be desirable to rank guides associated with the categorization 'arts>music>jazz' against guides associated with linked categorizations, which may permit selection of a more suitable guide.

A categorization record table 1860 of which one or more may be associated with or resident in the search database 1520 (FIG. 15) is illustrated in FIG. 19. The categorization record table 1860 may be composed of one or more categorization records such as the categorization records 1800a, 1800b, 1800c, and 1800d as illustrated in FIG. 19.

In order to select a guide(s) to respond to a search request associated with the categorization 'arts>music>jazz' it may be desirable to rank available guides including those who may not be associated with the categorization 'arts>music>jazz', as this may produce a more relevant response to a search request. Information indicated in a categorization record table such as the categorization record table 1860 may be used to select a guide(s) and/or other information responsive to a search request. For example, a ranking of guide(s) based on information associated with a search request associated with the category 'arts>music>jazz' may be performed using information indicated in the categorization record table 1860.

As indicated in the categorization guide ID field 1810 of the categorization record 1800*a*, the guides 'guide1', 'guide2' and 'guide3' are associated with the categorization 'arts>music>jazz'. As indicated in the categorization guide ID field 1810 of the categorization record 1800*b*, the guides 'guide4' and 'guide5' are associated with the categorization 'arts>music'. As indicated in the categorization guide ID field 1810 of the categorization record 1800*c*, the guides 'guide6' and 'guide7' are associated with the categorization 'arts>music>jazz>artists'. As indicated in the categorization guide ID field 1810 of the categorization record 1800*d*, the guide 'guide8' is associated with the categorization 'shopping>music>jazz'.

In order to select a guide to respond to a user search request associated with the categorization 'arts>music>jazz', guides associated with the categorization 'arts>music' may be included in a ranking. A guide rating(s) associated with the categorization 'arts>music' may be based on various factors. For example, a guide might be rated based on a search result(s) produced by the guide(s) which are associated with any proper path which includes the proper path 'arts>music', and/or the guide might be rated based on search results associated with search requests categorized as 'arts>music', etc. An adjustment to a guide rating(s) indicated in the linked category function field 1830 may be applied to a guide rating(s) associated with a categorization associated with a shorter proper path. For example, a guide rating associated with the categorization 'arts>music' might be reduced by 1.2 when ranking guides to respond to a search request associated with the categorization 'arts>music>jazz'.

In order to select a guide to respond to a user search request associated with the categorization 'arts>music>jazz', guides associated with the categorization 'arts>music>jazz>artists' may be included in a ranking. A guide rating associated with the categorization 'arts>music>jazz>artists' may be based on various factors. For example, a guide might be rated based on a search result(s) produced by a guide(s) which are associated with the proper path 'arts>music>jazz>artists', etc. An adjustment to a guide rating(s) indicated in the linked category function field 1830 may be applied to a guide rating(s) associated with a categorization associated with a longer proper path. For example, a guide rating associated with the categorization 'arts>music>jazz>artists' might be reduced by 0.8 when ranking guides to respond to a search request associated with the categorization 'arts>music>jazz'.

In order to select a guide to respond to a user search request associated with the categorization 'arts>music>jazz', guides associated with the categorization 'shopping>music>jazz' as indicated in the linked category ID field 1825 of the category record 1800*a* may be included in a ranking. A guide rating associated with the categorization 'shopping>music>jazz' may be based on various factors. For example, a guide might be rated based on a search result(s) produced by the guide(s) which are associated with the proper path 'shopping>music>jazz' and/or the guide might be rated based on search results produced by a guide(s) which are associated with any proper path which includes the proper path 'shopping>music>jazz', etc. An adjustment to a guide rating(s) indicated in the linked category function field 1830 of the category record 1800*a* may be applied to a guide rating(s) associated with the linked categorization 'shopping>music>jazz'. For example, a guide rating associated with the categorization 'shopping>music>jazz' might be reduced by 0.5 when ranking guides to respond to a search request associated with the categorization 'arts>music>jazz'.

Continuing with the example illustrated in FIG. 19, the guides 'guide1', 'guide2', 'guide3', 'guide4', 'guide5', 'guide6', 'guide7', and 'guide8' may be ranked in order to select a guide(s) to respond to a search request associated with the categorization 'arts>music>jazz'. The ratings of the guides 'guide1', 'guide2', and 'guide3' are not adjusted, the ratings of 'guide4' and 'guide5' are reduced by 1.2 (i.e., 'guide4' has a rating of 1.8, and 'guide5' has a rating of 3.8) as the rating are associated with the categorization 'arts>music', the ratings of 'guide6' and 'guide7' are reduced by 0.8 (i.e., 'guide6' has a rating 8.2, and 'guide7' has a rating 5.2), and the rating of 'guide8' is reduced by 0.5 (i.e., 'guide8' has a rating 5.5). If guides are ranked from highest rating to lowest rating, 'guide6' would be ranked first, 'guide3' would be ranked second, 'guide7' would be ranked third, 'guide8' would be ranked fourth, 'guide2' would be ranked fifth, 'guide5' would be ranked sixth, 'guide1' would be ranked seventh, and 'guide4' would be ranked eighth.

While the rating and ranking of guides has been described using numeric ratings and subtractive modifications, other types of ranking and adjustment factors will immediately occur to one of ordinary skill in the relevant art after being presented with the disclosure herein. For example, the rating(s) of a guide(s) and/or item(s) when associated with a search request and a categorization may be considered in terms of 'distance' from the node or categorization. A rating(s) of a guide(s) may be adjusted by the distance between a categorization associated with a search request and a categorization associated with the guide. A path link within a selection data structure or index is associated with a function which may be used to modify a rating(s) of a guide(s) associated with a linked proper path when ranking guides to respond to a search request associated with a different proper path. Using the example illustrated in FIG. 16 and FIG. 19, the 'distance' from the node "arts>music>jazz" to the node "arts>music" is 1.2, the 'distance' from the node "arts>music>jazz" to the node "arts>music>jazz>artists" is 0.8, and the 'distance' from the node "arts>music>jazz" to the node "shopping>music>jazz" is 0.5. The function associated with each node link in the example is subtraction, but any function(s) may be used to modify a rating(s) of a guide and/or information associated with a selection index. A distance function may be defined in various ways, which may allow the distance between any proper path and any other proper path to be computed. As previously mentioned, the functional relationships between proper paths or nodes may be bidirectional or unidirectional. For example, the distance from the node 'arts>music' to the node 'arts>music>jazz' may be different than the distance from the node 'arts>music>jazz' to the node 'arts>music'.

The examples used herein above with respect to FIGS. 16, 17, 18 and 19 have been illustrated using a limited number of records, categorization levels, topics, proper paths and guides for the purposes of illustration, any number of records, categorization levels, topics, proper paths and guides required to operate the embodiments may be utilized. While the example of selection of a guide(s) to be associated with a search request based on information associated with a categorization associated with the search request and the guide(s) has been used for the purposes of illustration, no limitation is implied thereby. Any type of item(s) might be selected to be associated with a target item(s) based on information associated with a categorization and/or other information associated with the target item(s) and the selected item(s). While several types of items have been illustrated as being associated with the same index, it is envisioned that multiple indexes may be used for different types of items which may be related using linkages such as those defined herein.

Figure 20:
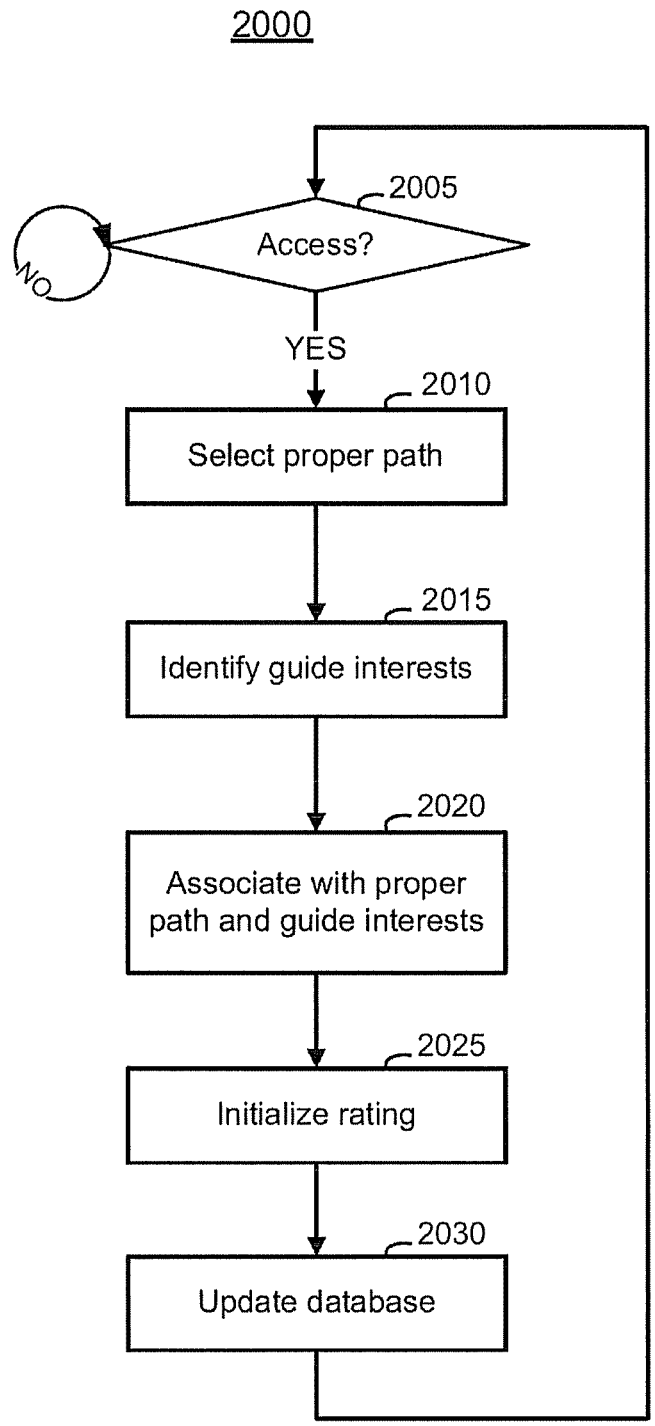
FIG. 20 is a flowchart of a process of associating information with a database.

As illustrated in FIG. 20, a process 2000 for associating a guide or item with a proper path is provided. The process 2000 may be operative on the search system 1530 (FIG. 15).

In operation 2005 a determination is made as to whether a request for access to a categorization record(s) is received. If in operation 2005 it is determined that a request for access to a categorization record(s) is not received, control remains at operation 2005 and process 2000 continues to wait. If in operation 2005 it is determined that a request for access to a categorization record(s) is received, control is passed to operation 2010 and process 2000 continues.

The determination in operation 2005 may be made based on various criteria. For example, an access request may be received at a server of the search system 1530 (FIG. 15), or a voice message may be received at an access number associated with the search system 1530, a text message may be received by a device associated with the search system 1530, etc. Any type of communication service(s) associated with the search system 1530 may be utilized to generate a request for access to a categorization record.

In operation 2010 a proper path is selected. In at least one embodiment, a GUI such as the GUI 3000 depicted in FIG. 30 may be presented in order that a proper path may be selected. In at least one embodiment, a proper path may be identified based on information provided from an external database. For example, a proper path beginning with a path root term may be generated by a system which includes information associated with a guide(s) which has been mapped to match with a path root term(s) and/or a topic(s) currently existing in the search system 1530 (FIG. 15). A proper path may be identified based on information indicated by a guide. For example, a guide may identify a document(s), media or other information which may be processed in order to obtain a path root term(s) and/or topic(s) which may be associated with a guide (s). A proper path may be associated with information associated with an item(s) such as an advertisement(s) and/or a search resource(s), a search result(s), a search request(s), etc. In at least one embodiment, a taxonomist may select a proper path. Control is passed to operation 2015 and process 2000 continues.

In operation 2015 a guide interest is associated with a proper path. A guide interest may be selected in various ways. For example, a guide may enter and/or select a word(s), phrase or sentence which is to be associated with a proper path using a GUI such as the GUI 3000 illustrated in FIG. 30. Alternately a guide interest(s) may be associated with a proper path based on information indicated by a guide, and/or information included in an external database. A resource may provide information of guide interests. In at least one embodiment, a taxonomist may provide information of guide interests. Control is passed to operation 2020 and process 2000 continues.

In operation 2020 a guide and/or item(s) is associated with a proper path and a guide interest(s). A guide and/or item(s) may be associated with a proper path and a guide interest(s) in various ways. For example, a guide may be associated with a proper path and a guide interests(s) based on an action(s) of a guide, such as activating a control in a GUI, pressing a keypad control, etc. A guide may be associated with a proper path and a guide interest(s) based on information obtained from an external database(s). A guide may be associated with one or more guide interests which are associated with a proper path. In at least one embodiment, a guide may not be allowed to be associated with a proper path without being associated with a guide interest(s). In at least one embodiment, a taxonomist may associate items with a proper path. Control is passed to operation 2025 and process 2000 continues.

In operation 2025 a rating of a guide and/or other information associated with a proper path is assigned. A rating may be assigned in various ways. For example, a guide rating may be assigned based on a test administered to a guide, a guide rating may be assigned based on another rating(s) associated with a guide, a guide rating may be assigned based on information included in an external database, a guide rating may be initialized to a pre-determined value, etc. A rating associated with a guide, a proper path and a guide interest(s) may be used to select a guide(s) to respond to a user search request as further described herein. Likewise a rating of any item(s) associated with an index may be maintained and utilized to select an item(s). Control is passed to operation 2030 and process 2000 continues.

In operation 2030 the search system 1530 (FIG. 15) is updated. Information regarding a guide, a proper path, a rating(s), a guide interest, an item(s) and/or other information may be recorded in the search system 1530. For example, a guide interest(s) associated with a proper path, a rating(s) of a guide, a rating(s) of any item(s) associated with information indicated in the search system 1530, time information, etc. may be recorded. Control is passed to operation 2005 and process 2000 continues.

Figure 21:
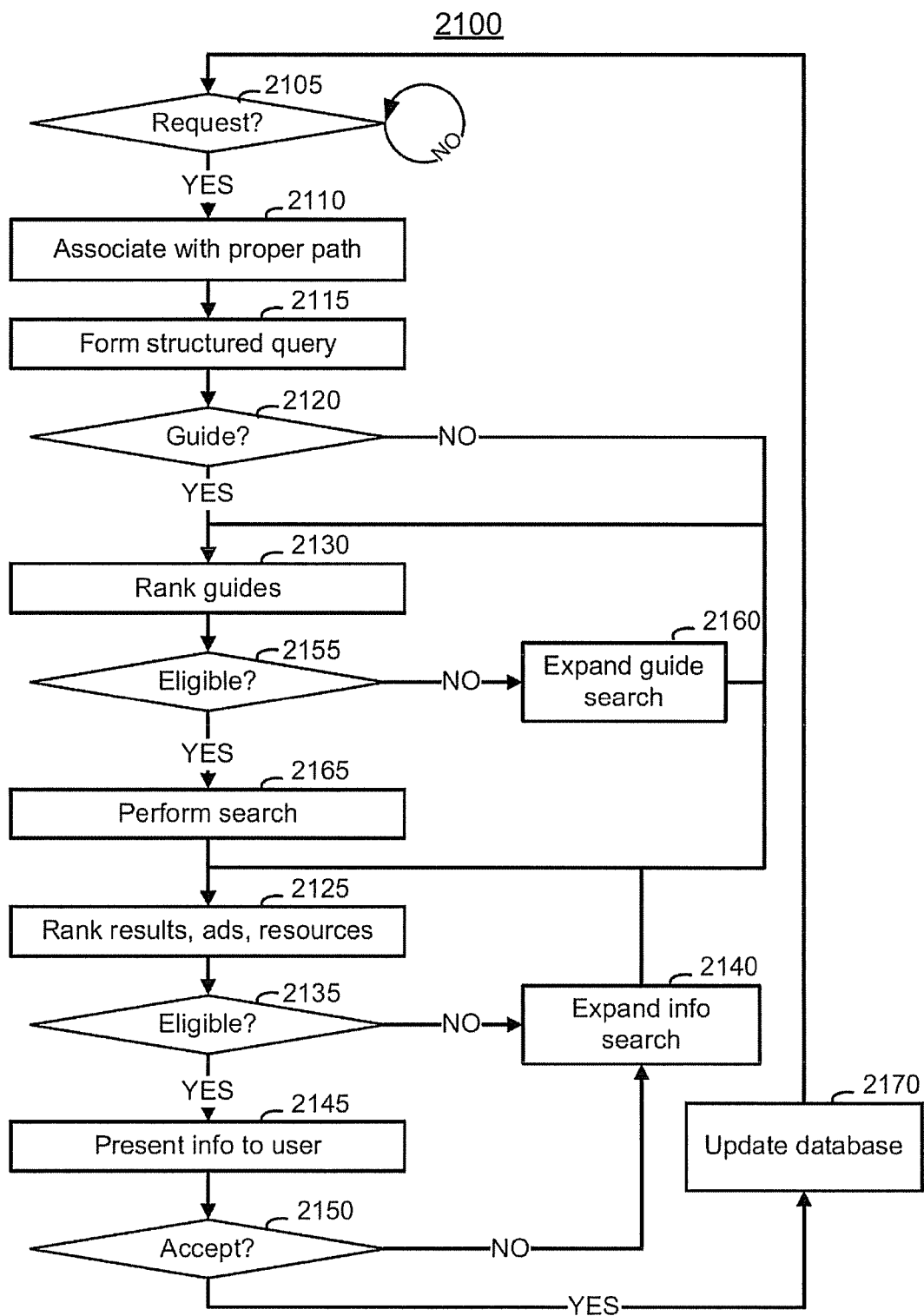
FIG. 21 is a flowchart of a process of performing an information search.

As illustrated in FIG. 21, a process 2100 for performing an information search is provided. The process 2100 may be operative on any suitable element(s) of the system 1500 (FIG. 15).

In operation 2105 a determination is made as to whether a request is received. If in operation 2105 it is determined that a request is not received, control remains at operation 2105 and process 2100 continues to wait. If in operation 2105 it is determined that a request is received, control is passed to operation 2110 and process 2100 continues.

The determination in operation 2105 may be made based on various criteria. For example, a request may be received at a server of the search system 1530, a voice connection may be received at an access number associated with the search system 1530, and/or a text, multimedia or Instant Messaging (IM) message may be received by a device associated with the search system 1530. Any type of communication service(s) associated with the search system 1530 may be utilized to submit a request. A request may be received based on a condition such as time, event(s), and/or other trigger, etc.

In operation 2110 a request is associated with one or more proper paths. A request may be associated with a proper path in various ways. For example, a proper path may be associated with a request by an automated system and/or a person such as a user and/or a guide. In at least one embodiment, a guide may interact with a user and/or interpret a user request in order to associate a proper path(s) with a request. Control is passed to operation 2115 and process 2100 continues.

In operation 2115 a structured query is created based on a request. A structured query may include an interrogative and/or other functional word(s) a form of a verb and a noun and/or noun clause(s). A structured query may be created by a person such as a guide and/or a user, and/or may be created using an automated system(s). Control is passed to operation 2120 and process 2100 continues.

In operation 2120 a determination is made as to whether a guide(s) is required to respond to a request. If in operation 2120 it is determined that a guide(s) is not required to respond to a request, control is passed to operation 2125 and process 2100 continues. If in operation 2120 it is determined that a guide(s) is required to respond to a request, control is passed to operation 2130 and process 2100 continues.

The determination in operation 2120 may be made based on various criteria. For example, if a match is found between a request and a previous request, it may be determined that a guide(s) is not required to respond to the request. In at least one embodiment, a user action may determine whether a request requires the assistance of a guide. In at least one embodiment, a result(s) may be offered to a user responsive to a request, and acceptance of a result(s) by the user may be used to determine whether a guide is required to respond to the request.

In operation 2125 item(s) which may be presented to a user are ranked. For example, a result(s), an advertisement(s), a resource(s), etc. may be ranked based on a rating(s) associated with a proper path(s) associated with a request. Control is passed to operation 2135 and process 2100 continues.

In operation 2130 a guide(s) associated with a request are ranked. For example, a guide(s) may be ranked based on a rating(s) associated with a proper path(s) associated with the request. Control is passed to operation 2155 and process 2100 continues.

In operation 2135 a determination is made as to whether a result(s), an advertisement(s), a resource(s), etc. is eligible to be presented to a user responsive to a request. If in operation 2135 it is determined that a result(s), an advertisement(s), a resource(s), etc. is not eligible to be presented to a user responsive to a request, control is passed to operation 2140 and process 2100 continues. If in operation 2135 it is determined that a result(s), an advertisement(s), a resource(s), etc. is eligible to be presented to a user responsive to a request, control is passed to operation 2145 and process 2100 continues.

The determination in operation 2135 may be made based on various criteria. For example, a quantity of items such as advertisements, results, and resources which have been ranked may be required to exceed a value in order for an item(s) to be determined to be eligible to be presented to a user, a ranking of an item(s) may be required to exceed a value in order for an item(s) to be determined to be eligible to be presented to a user, an item may be ineligible if it has been previously provided to a user, etc. Different criteria may be applied to different types of information. Criteria for determining eligibility may be modified dynamically. For example, if no eligible item(s) is identified which has a rating greater than a value the value may be modified in a subsequent determination of eligibility.

In operation 2140 one or more search criteria are modified in order to identify additional item(s) associated with a selection index. A modification of search criteria may include modification of eligibility criteria, inclusion of information associated with linked proper paths which meet a criterion, etc. Control is passed to operation 2125 and process 2100 continues.

In operation 2145 an item(s) are presented to a user responsive to a request(s). A result(s), an advertisement(s), a resource(s), etc. may be presented to a user using any communication service(s) associated with the user. For example, a result(s) may be provided to a user via a web browser operative on a user system, and/or an advertisement(s) may be presented as audio information via a voice enabled device such as a mobile phone, and/or a resource(s) may be presented using an interactive interface, etc. Control is passed to operation 2150 and process 2100 continues.

In operation 2150 a determination is made as to whether a result(s) and/or item(s) is accepted by a user. If in operation 2150 it is determined that a result(s) and/or item(s) is not accepted by a user, control is passed to operation 2140 and process 2100 continues. If in operation 2150 it is determined that a result(s) and/or item(s) is accepted by a user, control is passed to operation 2170 and process 2100 continues.

The determination in operation 2150 may be made based on various criteria. In at least one embodiment, any item(s) presented to a user may be determined to be accepted by the user. An item may be determined to be accepted by a user based on active and/or passive indications by the user. For example, if a user clicks on an item in a web page, presses a key on a phone keypad, and/or provides a spoken response, such actions may be used to determine if an item(s) is accepted by the user. A time-out and/or other passive criteria may be used to determine if an item is accepted by a user.

In operation 2155 a determination is made as to whether a guide(s) is eligible to produce a result(s) responsive to a request. If in operation 2155 it is determined that a guide(s) is not eligible to produce a result(s) responsive to a request, control is passed to operation 2160 and process 2100 continues. If in operation 2155 it is determined that a guide(s) is eligible to produce a result(s) responsive to a request, control is passed to operation 2165 and process 2100 continues.

The determination in operation 2155 may be made based on various criteria. For example, a number of guides who have been ranked may be required to have rankings that exceed a value in order for a guide(s) to be determined to be eligible to produce a result(s), or a quantity of guides ranked may be required to exceed a value for any guide(s) to be eligible to produce a result(s). Criteria for determining guide eligibility may be modified dynamically. For example, if no eligible guide(s) is identified who has a rating greater than a value the value may be modified in a subsequent determination of eligibility.

In operation 2160 one or more search criteria are modified in order to identify additional guide(s) associated with a selection index. A modification of search criteria may include modification of eligibility criteria, inclusion of a guide(s) associated with linked proper paths which meet criteria, etc. Control is passed to operation 2130 and process 2100 continues.

In operation 2165 a search is performed by an eligible guide(s) and a result(s) are obtained. A result(s) are associated with a request and a proper path. Control is passed to operation 2125 and process 2100 continues.

In operation 2170 the search system 1530 (FIG. 15) is updated. Information associated with a guide(s), a result(s), a user(s), a resource(s), an advertisement(s), an item(s), a request(s) and/or other information may be recorded in the search system 1530. For example, a list of results, advertisements, guides, resources, etc. associated with a user(s) may be updated and/or information of a rating(s) and/or ranking(s) associated with a guide(s), an advertisement(s), a user(s), a result(s), a resource(s), etc. and/or other information may be recorded and/or modified. Control is passed to operation 2105 and process 2100 continues.

As illustrated in FIG. 22, an exemplary user record 2200 is provided, of which one or more may be associated with or resident in the search system 1530 (FIG. 15). The user record

2200 may include a user record ID field 2205, a user channel ID field 2210, and a user request field 2215.

The user record ID field 2205 may include an ID of a user, which is preferably unique and preferably used consistently. For example, in at least one embodiment, the user record ID field 2205 can include a randomly generated numerical code, and/or a string indicating a user. A user record ID serves to distinguish a user record associated with a user from a user record associated with other user(s). Although particular examples of IDs are described herein, other types of IDs uniquely indicating a user(s) may be utilized without departing from the spirit and scope of the embodiments. In at least one embodiment, a telephone number associated with a mobile phone service account may be included in the content of the user record ID field 2205. A user record ID may include a username, an IM credential, an email address, etc. Using the example in FIG. 22, '502.331.2204-4772' is the user record ID associated with the user record 2200.

The user channel ID field 2210 may include one or more IDs associated with a user. The user channel ID field 2210 may include information which may be used to establish communication with a user system. For example, a telephone number, an email address, an IM credential, a username, etc. may be included in the user channel ID field 2210. Using the example in FIG. 22, the telephone number '502.331.2204' and the email address 'usertom@chacha.com' are the user channel IDs which have been associated with the user record 2200. While only a few channel IDs have been illustrated in FIG. 22, any number of channel IDs may be associated with a user.

The user request field 2215 may include information of one or more requests associated with a user ID. For example, the user request field 2215 may include a unique ID(s) associated with a user request(s) submitted using a user system associated with any channel ID associated with a user. Using the example illustrated in FIG. 22, the user requests '502.331.2204,12.12.08, 13 Oct. 2006' and 'usertom@chacha.com, 12.48.08, 27 Oct. 2006' have been associated with the user '502.331.2204-4722'.

As illustrated in FIG. 23, an exemplary guide record 2300 is provided, of which one or more may be associated with or resident in the search database 1520 (FIG. 15). The guide record 2300 may include a guide record ID field 2305, a guide channel ID field 2310, a guide request ID field 2315, a guide rating field 2320, a guide categorization ID field 2325, and a guide interests ID field 2330.

The guide record ID field 2305 may include an ID of a guide, which is preferably unique and preferably used consistently. For example, in at least one embodiment, the guide record ID field 2305 can include a randomly generated numerical code, and/or a string indicating a guide. A guide record ID serves to distinguish a guide record associated with a guide from a guide record associated with other guide(s). Although particular examples of IDs are described herein, other types of IDs uniquely indicating a guide(s) may be utilized without departing from the spirit and scope of the embodiments. In at least one embodiment, a guide record ID may include a first and last name of a guide. In at least one embodiment, a telephone number associated with a mobile phone service account may be included in the content of the guide record ID field 2305. A guide record ID may include a guide username, an IM credential, an email address, etc. Using the example in FIG. 23, 'guide6' is the guide record ID associated with the guide record 2300.

The guide channel ID field 2310 may include one or more IDs associated with a guide. The guide channel ID field 2310 may include information which may be used to establish communication with a guide system. For example, a telephone number, an email address, an IM credential, a username, etc. may be included in the guide channel ID field 2310. Using the example in FIG. 23, the telephone number '317.244.2444' and the email address 'guidebob@chacha.com' are the guide channel IDs which have been associated with 'guide6'. While only a few channel IDs have been illustrated in FIG. 23, any number of channel IDs may be associated with a guide.

The guide request ID field 2315 may include information of one or more requests associated with a guide. For example, the guide request ID field 2315 may include a unique ID(s) associated with a user request(s) which have been assigned to a guide. Using the example illustrated in FIG. 23, the request record ID '502.331.2204,12.12.08, 13 Oct. 2006' and the request record ID '502.455.3301,12.48.08, 27 Oct. 2006' have been associated with 'guide6'. This may indicate that 'guide6' has been selected to respond to the requests '502.331.2204,12.12.08, 13 Oct. 2006' and '502.455.3301, 12.48.08, 27 Oct. 2006'

The guide rating field 2320 may include information of one or more ratings associated with a guide. Content of the guide rating field 2320 may be used to select a guide to be assigned to a request. In at least one embodiment, a rating may be associated with a keyword(s), a category(ies), and/or other information which has been associated with a request. Any information indicated in the search system 1530 (FIG. 15) may be used to determine a rating of a guide. Using the example illustrated in FIG. 23, the rating 'Master-Voice' has been associated with the guide record 2300. This may indicate that 'guide6' may accept voice based requests and has the rating of 'Master'. While only one type of rating has been illustrated in FIG. 23, ratings of a guide may be associated with various types of information. For example a guide may have a rating associated with one or more keywords, categories, skills, profiles, users and/or other types of information which may be associated with a guide and/or a request. Any type of information which may indicate a rating such as a number, text, etc. may be included in the guide rating field 2320.

The guide categorization ID field 2325 may include information of one or more categorizations associated with a guide. A categorization associated with a guide may be utilized to select a guide(s) to respond to a user request(s) which is associated with the categorization. Using the example illustrated in FIG. 23, the categorizations 'shopping>music>jazz', 'science>chemistry>organic', 'recreation>games>tennis' and 'sports>professional>bass fishing' are associated with 'guide6'. This may indicate that the guide 'guide6' may respond to a user request(s) associated with the categorizations 'shopping>music>jazz', 'science>chemistry>organic', 'recreation>games>tennis' and 'sports>professional>bass fishing'.

The guide interests ID field 2330 may include information of one or more interests associated with a guide. An interest(s) associated with a guide may be utilized to select a guide(s) to respond to a user request(s) which is associated with the interest(s). Using the example illustrated in FIG. 23, the interests 'john coltrane', 'thelonius monk', 'synthesis', 'history of the game', 'Oregon', and 'utah' are associated with the guide record 2300. In at least one embodiment, the guide categorization ID field 2325 and the guide interests ID field 2330 may be linked by for example a pointer. Using the example illustrated in FIG. 23, the interests 'john coltrane' and 'thelonius monk' may be associated with the categorization 'shopping>music>jazz', the interest 'synthesis' may be associated with the categorization 'science>chemistry>organic', the interest 'history of the game' may be associated with the categorization 'recreation>tennis>games', and the interests 'Oregon' and 'utah' may be associated with the categorization 'sports>professional>bass fishing'.

As illustrated in FIG. 24, an exemplary taxonomist record 2400 is provided, of which one or more may be associated with or resident in the search database 1520 (FIG. 15). The taxonomist record 2400 may include a taxonomist record ID field 2405, a taxonomist channel ID field 2410, a taxonomist authorization info field 2415, and a taxonomist rating field 2420.

The taxonomist record ID field 2405 may include an ID of a taxonomist, which is preferably unique and preferably used consistently. For example, in at least one embodiment, the taxonomist record ID field 2405 can include a randomly generated numerical code, and/or a string indicating a taxonomist. A taxonomist record ID serves to distinguish a taxonomist record associated with a taxonomist from a taxonomist record associated with other taxonomist(s). Although particular examples of IDs are described herein, other types of IDs uniquely indicating a taxonomist(s) may be utilized without departing from the spirit and scope of the embodiments. In at least one embodiment, a taxonomist record ID may include a first and last name of a taxonomist. In at least one embodiment, a telephone number associated with a mobile phone service account may be included in the content of the taxonomist record ID field 2405. A taxonomist record ID may include a taxonomist username, an IM credential, an email address, etc. Using the example in FIG. 24, 'taxonomists' is the taxonomist record ID associated with the taxonomist record 2400.

The taxonomist channel ID field 2410 may include one or more IDs associated with a taxonomist. The taxonomist channel ID field 2410 may include information which may be used to establish communication with a taxonomist system. For example, a telephone number, an email address, an IM credential, a username, etc. may be included in the taxonomist channel ID field 2410. Using the example in FIG. 24, the telephone number '317.331.2224' and the email address 'taxpayer@taxonomist1.name' and the URL 'www-.blogspace.com/taxonomist1' are the taxonomist channel IDs which have been associated with the taxonomist record 2400. While only a few channel IDs have been illustrated in FIG. 24, any number of channel IDs may be associated with a taxonomist.

The taxonomist authorization information field 2415 may include information of one or more categorizations and/or privileges associated with a taxonomist ID. For example, the taxonomist authorization information field 2415 may include an ID of a categorization (e.g., a categorization ID) and information of an access privilege(s) for a taxonomist associated with a categorization. Using the example illustrated in FIG. 24, the categorization record ID 'arts>music', and the categorization record ID 'geography>world' have been associated with the taxonomist record 2400. The authorization information '$_{13}$ all' and '_readonly' have been associated with the taxonomist record 2400. This may for example, indicate that the taxonomist 'taxonomists' has unrestricted access privileges to information associated with the categorization 'arts>music' and read-only access to information associated with the categorization 'geography>world'.

The taxonomist rating field 2420 may include information of one or more ratings associated with a taxonomist. The content of the taxonomist rating field 2420 may include one or more ratings of a taxonomist which may be used to determine access rights and/or other information regarding a taxonomist associated with a categorization(s). Any information indicated in the search system 1530 (FIG. 15) may be used to determine a rating of a taxonomist. Using the example illustrated in FIG. 24, the ratings '7.0' and 'rookie' have been associated with the taxonomist record 2400. This may for example indicate that 'taxonomist1' has a rating of '7.0' associated with the categorization 'arts>music' and a rating of 'rookie' associated with the categorization 'geography>world'. While only a few types of ratings have been illustrated in FIG. 24, ratings of a taxonomist may be associated with various types of information. For example a taxonomist may have a rating associated with one or more keywords, categories, skills, profiles, users or other types of information which may be associated with a taxonomist and/or a request. Any type of information which may indicate a rating such as a number, text, etc. may be included in the taxonomist rating field 2420.

As illustrated in FIG. 25, an exemplary request record 2500 is provided, of which one or more may be associated with or resident in the search database 1520 (FIG. 15). The request record 2500 may include a request record ID field 2505, a structured query ID field 2510, a user ID field 2115, a categorization ID field 2520, a guide ID field 2525, an advertisement ID field 2530, a result ID field 2535, and a resource ID field 2540.

The request record ID field 2505 may include an ID of a request, which is preferably unique and preferably used consistently. For example, in at least one embodiment, the request record ID field 2505 can include a randomly generated numerical code, and/or a string indicating a request. A request record ID serves to distinguish a request record associated with a request from a request record associated with other request(s). Although particular examples of IDs are described herein, other types of IDs uniquely indicating a request(s) may be utilized without departing from the spirit and scope of the embodiments herein. In at least one embodiment, the request record ID includes a text string indicating content of a request. A request record ID may include a username, an IM credential, an email address, etc. Using the example in FIG. 25, '502.331.2204,12.12.08, 13 Oct. 2006' is the request record ID associated with the request record 2500.

The structured query ID field 2510 may include an ID of one or more structured queries, which is associated with a request. A structured query may be constructed by a user and/or a guide. Using the example in FIG. 25, 'where is live jazz in Chicago tonight' is the structured query ID associated with the request record 2500. This may indicate that 'where is live jazz in chicago tonight' is a structured query associated with the request '502.331.2204,12.12.08, 13 Oct. 2006'.

The user ID field 2515 may include an ID of a user(s) who submitted a request. Content of the user ID field 2515 may be used to establish communication with a user(s) based on content of a user record such as the user record 2200 (FIG. 22). Using the example in FIG. 25, the user ID '502.331.2204-4772' is associated with the request '502.331.2204,12.12.08, 13 Oct. 2006', which may indicate that the user '502.331.2204-4772' submitted the request '502.331.2204,12.12.08, 13 Oct. 2006', and may be presented with an item(s) such as a result(s) identified in the result ID field 1135.

The categorization ID field 2520 may include an ID of one or more categorizations, which are associated with a request. A categorization(s) may be associated with a request by a user, a guide, and/or an automated system. Using the example in FIG. 25, 'arts>music>jazz' is the categorization ID associated with the request '502.331.2204,12.12.08, 13 Oct. 2006'.

The guide ID field 2525 may include information of one or more guides associated with a request. Content of the guide ID field 2525 may be used to establish communication with a guide based on content of a guide record such as the guide record 2300 (FIG. 9). Using the example illustrated in FIG. 25, the guides 'guide6', and 'guide1' have been associated with the request record 2500, which may indicate that 'guide6', and 'guide1' have been selected to respond to the request '502.331.2204,12.12.08, 13 Oct. 2006'.

The advertisement ID field 2530 may include information of one or more advertisements associated with a request. Content of the advertisement ID field 2530 may be used to present an advertisement to a user based on content of an advertisement record such as the advertisement record 2800 (FIG. 14). Using the example illustrated in FIG. 25, the advertisements 'cheaptickets.com', and 'jazzmusicmp3' have been associated with the request record 2500, which may indicate that 'cheaptickets.com', and 'jazzmusicmp3' have been selected to be presented to a user responsive to the request '502.331.2204,12.12.08, 13 Oct. 2006'.

The result ID field 2535 may include information of one or more results associated with a request. Content of the result ID field 2535 may be used to indicate a result associated with a result record such as the result record 2600 (FIG. 26) which has been associated with a request. Using the example illustrated in FIG. 25, the result 'chicagoconcerts.org__17.dec.07' has been associated with the request record 2500. This may indicate that the result 'chicagoconcerts.org__17.dec.07' has been selected to be provided responsive to the request '502.331.2204,12.12.08, 13 Oct. 2006'.

The resource ID field 2540 may include information of one or more resources associated with a request. Content of the resource ID field 2540 may be used to indicate a resource associated with a resource record such as the resource record 2700 (FIG. 27) which has been associated with a request. Using the example illustrated in FIG. 25, the resource 'www.chicagoconcerts.org' has been associated with the request record 2500. This may indicate that the resource 'chicagoconcerts.org' has been selected to be provided responsive to the request '502.331.2204,12.12.08, 13 Oct. 2006'. A resource(s) may be provided to a user(s) and/or a guide(s).

As illustrated in FIG. 26, an exemplary result record 2600 is provided, of which one or more may be associated with or resident in the search database 120 (FIG. 15). The result record 2600 may include a result record identifier (ID) field 2605, a result categorization ID field 2610 and a result access information field 2615.

The result record ID field 2605 may include an ID of a result, which is preferably unique and preferably used consistently. For example, in at least one embodiment, the result record ID field 2605 can include a randomly generated numerical code, and/or a text string indicating a result. A result record ID serves to distinguish a result record associated with a result from a result record associated with other result(s). Although particular examples of IDs are described herein, other types of IDs uniquely indicating a result(s) or result may be utilized without departing from the spirit and scope of the embodiments herein. Using the example in FIG. 26 'chicagoconcerts.org__17.dec.07' is the result record ID associated with the result record 2600.

The result categorization ID field 2610 may include an ID of one or more categorization(s) associated with a result. Information included in the result categorization ID field 2610 may be utilized to rate and/or select a result(s) responsive to a request associated with a categorization indicated in the result categorization ID field 2610. Using the example illustrated in FIG. 26, the categorizations 'arts>music>jazz' and 'shopping>music>jazz' are associated with the result 'chicagoconcerts.org__17.dec.07'.

The result access information field 2615 may include access information associated with a result. Information included in the result access information field 2615 may be utilized to provide a result(s) to a user responsive to a request. Information such as a URL, a text snippet and/or other information associated with a result may be indicated in the result access information field 2615. Using the example illustrated in FIG. 26, the snippet 'nora jones is live at the house of blues 8 PM 31.dec.07' and the URL 'www.chicagoconcerts.org' are associated with the result 'chicagoconcerts.org__17.dec.07'.

As illustrated in FIG. 27, an exemplary resource record 2700 is provided, of which one or more may be associated with or resident in the search database 270 (FIG. 15). The resource record 2700 may include a resource record ID (ID) field 2705, a resource categorization ID field 2710 and a resource access information field 2715.

The resource record ID field 2705 may include an ID of a resource, which is preferably unique and preferably used consistently. For example, in at least one embodiment, the resource record ID field 2705 can include a randomly generated numerical code, and/or a text string indicating a resource. A resource record ID serves to distinguish a resource record associated with a resource from a resource record associated with other resource(s). Although particular examples of IDs are described herein, other types of IDs uniquely indicating a resource(s) may be utilized without departing from the spirit and scope of the embodiments herein. Using the example in FIG. 27 'chicagoconcerts.org\schedules\__12.dec.07' is the resource record ID associated with the resource record 2700.

The resource categorization ID field 2710 may include an ID of one or more categorization(s) associated with a resource. Information included in the resource categorization ID field 2710 may be utilized to rate and/or select a resource(s) responsive to a request associated with a categorization indicated in the resource categorization ID field 2710. Using the example illustrated in FIG. 27, the categorizations 'arts>music>jazz', 'arts>music>chicago' and 'regional>entertainment>chicago' are associated with the resource record 2700. This may indicate that the resource 'chicagoconcerts.org\schedules\__12.dec.07' might be provided responsive to a request associated with the categorization(s) 'arts>music>jazz', 'arts>music>chicago' and 'regional>entertainment>chicago'.

The resource access information field 2715 may include access information associated with a resource. Information included in the resource access information field 2715 may be utilized to provide a resource(s) to responsive to a request. Information such as a URL, a macro instruction and/or any other information associated with a resource may be indicated in the resource access information field 2715. Using the example illustrated in FIG. 27, the URL 'www.chicagoconcerts.org' is associated with the resource 'chicagoconcerts.org\schedules\__12.dec.07'.

As illustrated in FIG. 28, an exemplary advertisement record 2800 is provided, of which one or more may be associated with or resident in the search database 280 (FIG. 15). The advertisement record 2800 may include an advertisement record ID (ID) field 2805, an advertisement categorization ID field 2810 and an advertisement access information field 2815.

The advertisement record ID field 2805 may include an ID of an advertisement, which is preferably unique and preferably used consistently. For example, in at least one embodiment, the advertisement record ID field 2805 can include a randomly generated numerical code, and/or a text string indicating an advertisement. An advertisement record ID serves to distinguish an advertisement record associated with an advertisement from an advertisement record associated with other advertisement(s). Although particular examples of IDs are described herein, other types of IDs uniquely indicating an advertisement(s) may be utilized without departing from the spirit and scope of the embodiments herein. Using the example in FIG. 28 'cheaptickets.com' is the advertisement record ID associated with the advertisement record 2800.

The advertisement categorization ID field 2810 may include an ID of one or more categorization(s) associated with an advertisement. Information included in the advertisement categorization ID field 2810 may be utilized to rate and/or select an advertisement(s) responsive to a request associated with a categorization indicated in the advertisement categorization ID field 2810. Using the example illustrated in FIG. 28, the categorizations 'arts>music>jazz', and 'recreation>concerts>tickets' are associated with the advertisement 'cheaptickets.com'.

The advertisement access information field 2815 may include access information associated with an advertisement. Information included in the advertisement access information field 2815 may be utilized to provide an advertisement(s) responsive to a request. Information such as a URL of an ad server, an advertisement type, and/or information associated with an advertisement may be indicated in the advertisement access information field 2815. Using the example illustrated in FIG. 28, the information 'banner_'www.cheaptickets.com/online' and the information 'audio_'www.cheaptickets.com/audio' is associated with the advertisement 'cheaptickets.com'. This may for example indicate that an advertisement accessible using the URL 'www.cheaptickets.com/online' is to be presented when a banner type advertisement is delivered and that an advertisement accessible using the URL 'www.cheaptickets.com/audio' is to be presented when an audio advertisement is delivered.

Figure 29:
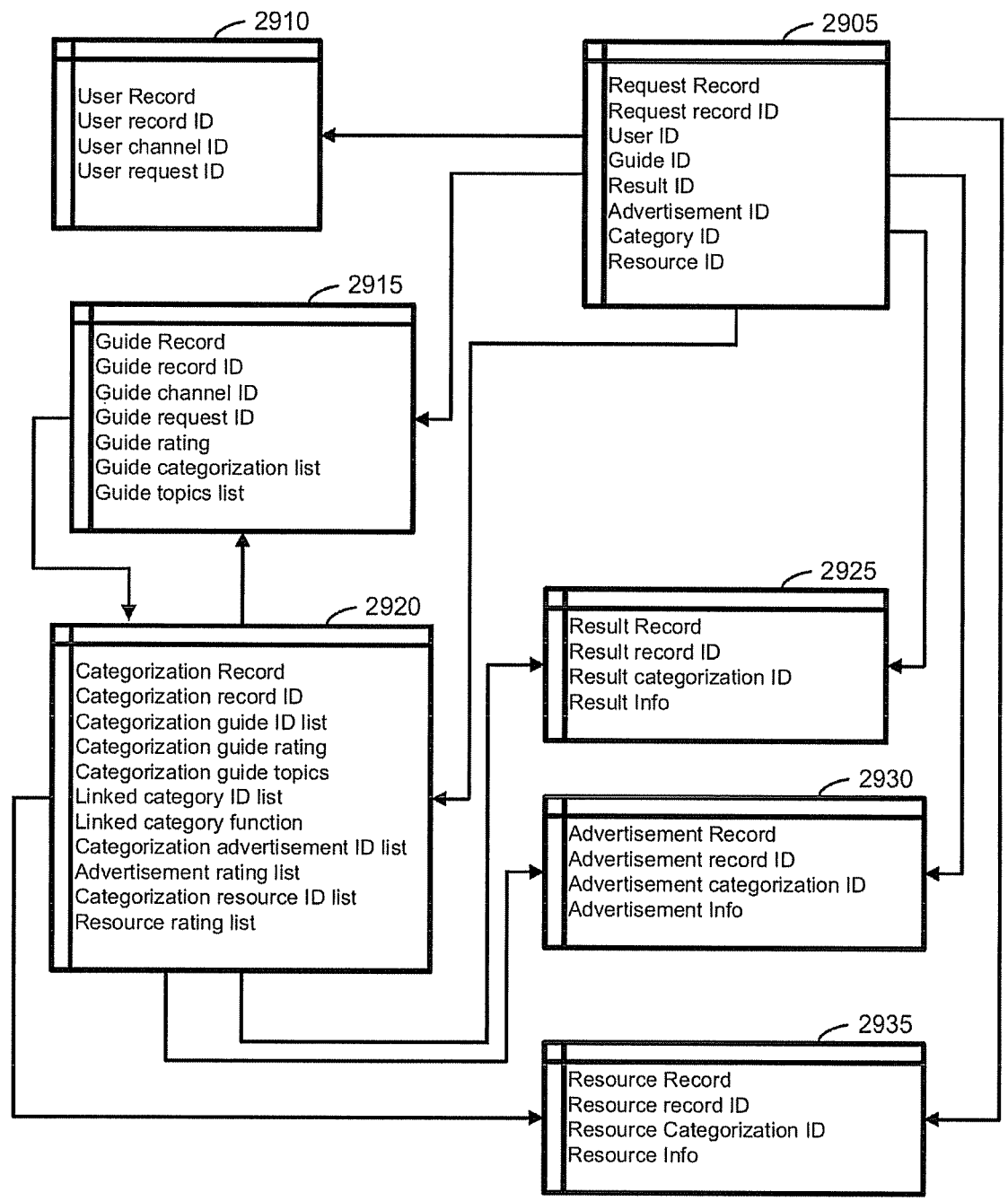
FIG. 29 illustrates a database relationship.

A simplified database relationship between records in the search system 1530 (FIG. 15) is depicted in FIG. 29. If a user associated with the user record 2910 submits a request, the request record 2905 may be created, with a pointer added to the user ID field of the request record 2905 which indicates the user record 2910. If a user, a guide and/or an automated system selects a categorization (category) to be associated with a request, a pointer to the selected categorization record 2920 is added to the category ID field of the request record 2905. If a guide is selected to respond to a request, an identifier of the selected guide record 2915 is added to the Guide ID field of the request record 2905. Multiple guides may respond to a request. Utilizing a categorization associated with a request, a result(s), a resource(s), an advertisement(s) and/or other item(s) may be ranked and selected responsive to the request. If an item(s) is selected, an ID of the item may be added to the request record. For example, a pointer to the result record 2925, the advertisement record 2930, and the resource record 2935 might be added to the result, advertisement, and resource ID fields of the request record 2905.

Figure 30:
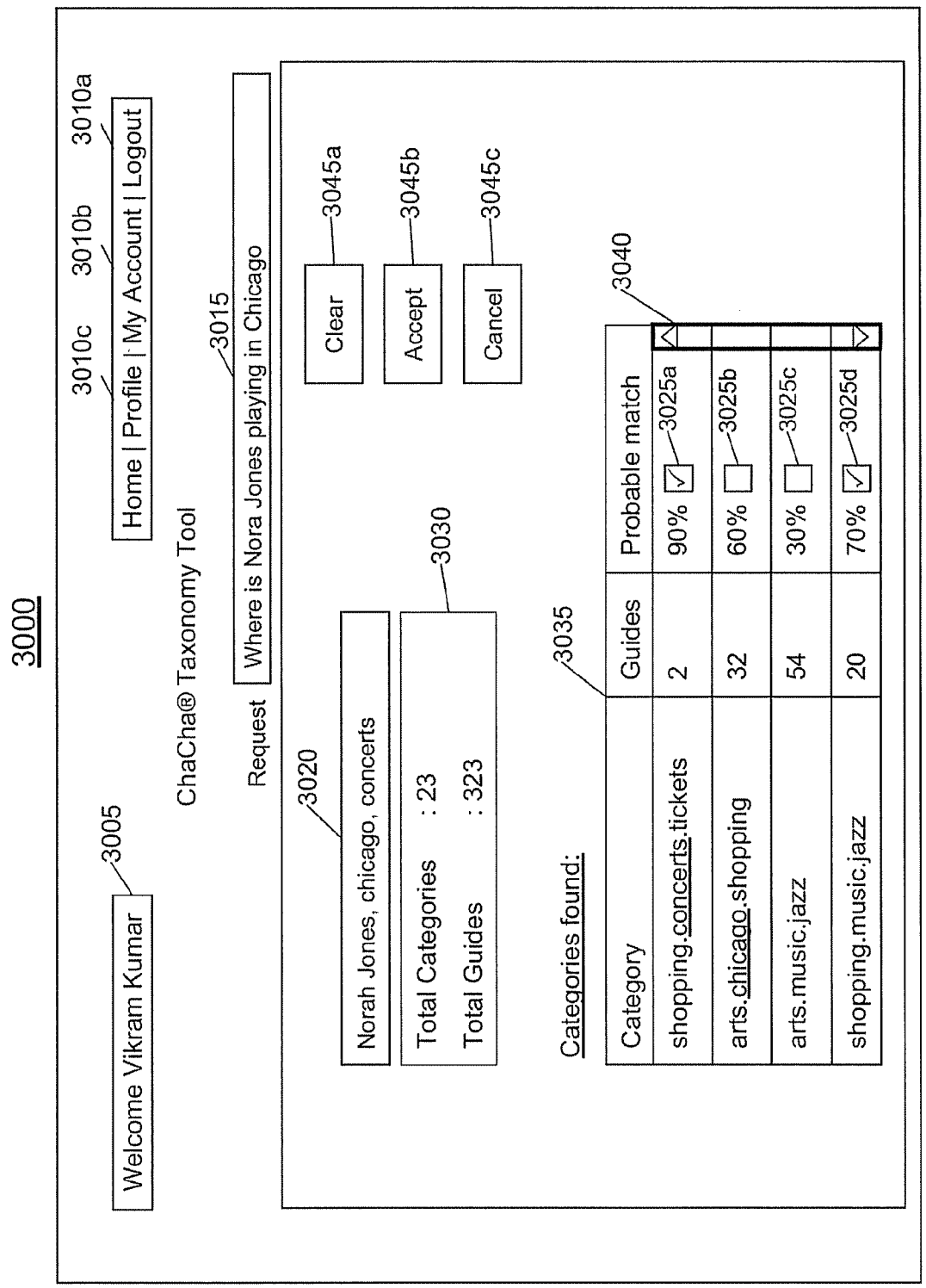
FIG. 30 illustrates a graphical user interface (GUI).

An exemplary graphical user interface to associate a proper path or category with a request is illustrated in FIG. 30. The categorization selection GUI 3000 may be used to associate a category(ies) with a request.

As illustrated in FIG. 30, the categorization selection GUI 3000 may include a guide/user identifier 3005, navigation controls 3010, a request box 3015, category filter controls 3020, category selection controls 3025, a category indicator 3030, a category display window 3035, viewing controls 3040, and action buttons 3045. The categorization selection GUI 3000 may be presented in order to associate a category(ies) with a request and/or other item(s).

The guide/user identifier 3005 may include information associated with a user or guide. For example a login ID may be displayed in the guide/user identifier 3005.

The navigation controls 3010 may be used to logon or logoff of the search system 1530 (FIG. 15). Activation of the login control 3010a may toggle between logged in and logged out of the system. The navigation controls 3010 may be used to navigate to other GUIs. For example, the 'Profile' navigation control 3010c and the 'My Account' control 3010b may display information associated with the user ID indicated in the guide/user identifier 3005.

The request box 3015 includes information of a request. Although a text request is illustrated in FIG. 30, other information associated with a request, such as audio, images, videos, etc. which may be associated with a request may be indicated in the request box 3015. For example, an audio recording of a request, or an image associated with a request may be accessible using the request box 3015.

The category filter controls 3020 may be used to select a category(ies). For example, as words, and/or phrases are entered in the category filter controls 3020, categories may be selected to be displayed in the category indicator 3030 and the category display window 3035. As illustrated in FIG. 30 categories matching keywords indicated in the category filter controls 3020 may be displayed in the category display window 3035.

The category indicator 3030 may provide information associated with a selected category(ies). Using the example in FIG. 30 twenty-three categories which index three hundred twenty-three guides have been selected by the filtering words 'Norah Jones', 'chicago' and 'events'.

The category display window 3035 may indicate information associated with a selected category(ies). For example, the number of available guides associated with a particular category, the probability of a match between a category and a request, and/or other information may be indicated. The viewing controls 3040 allow a user to navigate within the category display window 3035.

The category selection controls 3025 indicate whether a category has been selected. For example, the category selection controls 3025a and 3025d indicate that the categories 'shopping.concerts.tickets' and 'shopping.music.jazz' have been selected to be associated with the request 'Where is Nora Jones playing in Chicago'. The selection status of a category may be changed by for example clicking on the category selection controls 3025.

The action buttons 3045 allow actions to be taken regarding information in the GUI 3000. The 'Clear' button 3045a clears any indicators of the category selection controls 3025 when activated. The 'Accept' button 3045b records the information obtained using the GUI 3000 when activated. The 'Cancel' button 3045c discards any information obtained without recording it when activated.

While the GUI 3000 has been illustrated using the example of associating a category(ies) with a request, the GUI 3000 might also be used to associate any types of items with a category(ies). For example, an advertisement, a resource, a guide, groups thereof, etc. might be indicated in the request box 3015 and might be associated with a category(ies) using the GUI 3000.

Figure 31:
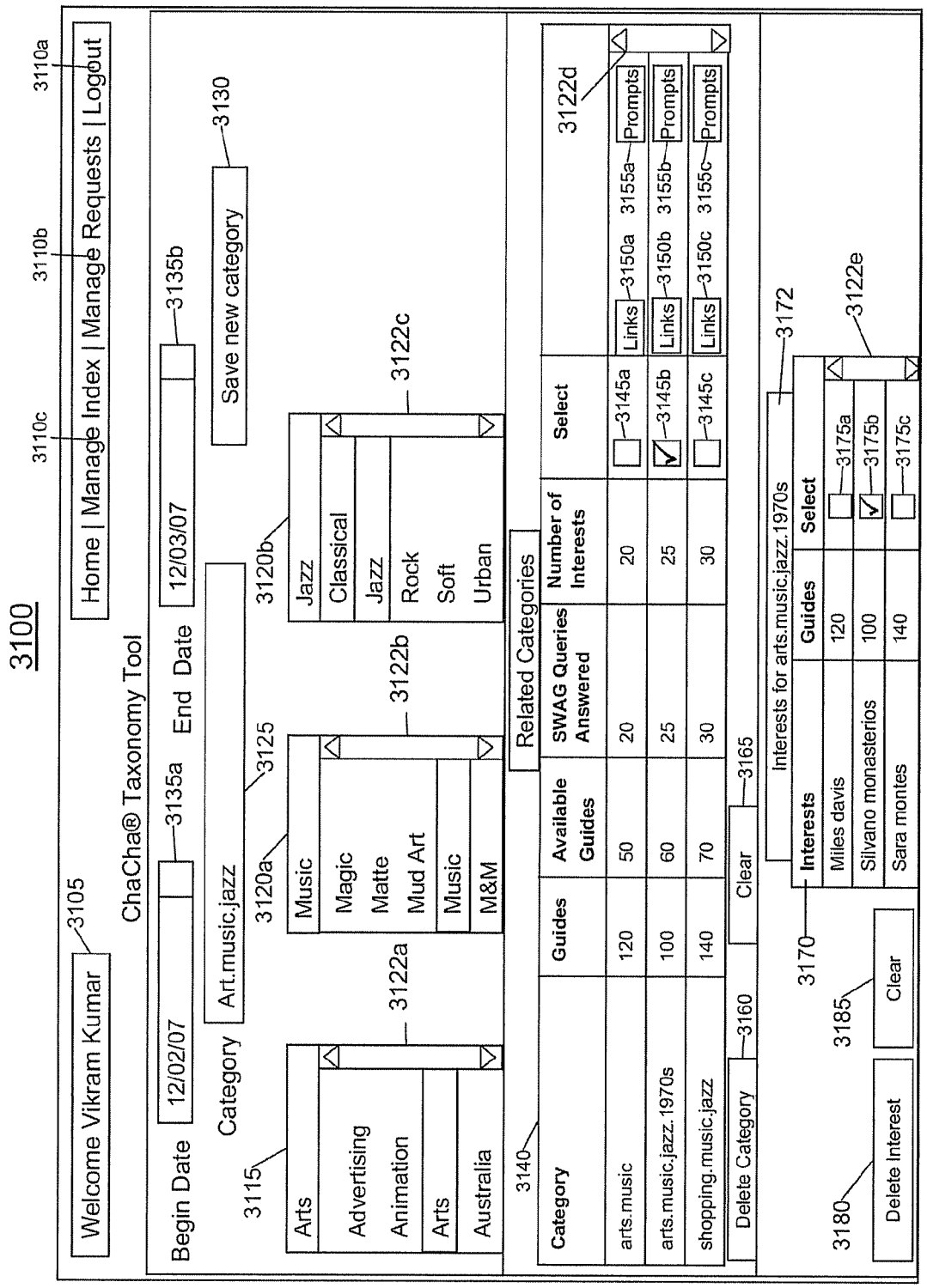
FIG. 31 illustrates a GUI.

An exemplary graphical user interface to create and modify an index is illustrated in FIG. 31. The GUI 3100 may be used to view and modify information included in the search system 1530 (FIG. 15).

As illustrated in FIG. 31, the GUI 3100 may include a taxonomist/user identifier 3105, navigation controls 3110, a root term selection control 3115, topic term selection controls 3120, a category indicator 3125, a new category button 3130, category filter controls 3135, a category display window 3140, viewing controls 3122, category selection indicators 3145, link management buttons 3150, prompt management buttons 3155, a category delete button 3160, a category clear button 3165, interest display window 3170, an interest category indicator 3172, interest selection indicators 3175, an interest delete button 3180 and an interest clear button 3185.

The taxonomist/user identifier 3105 may include information associated with a user of the GUI 3100. For example a login ID may be displayed in the taxonomist/user identifier 3105.

The navigation controls 3110 may be used to logon or logoff of the search system 1530 (FIG. 15). Activation of the login control 3110a may toggle between logged in and logged out of the system. The navigation controls 3110 may be used to navigate to other GUIs. For example, activation of the 'Manage Index' navigation control 3110c may cause the GUI 3100 to be presented, and activation of the 'Manage Requests' navigation control 3110b may cause the GUI 3400 to be presented.

The root term selection control 3115 and the topic term selection controls 3120 allow selection of a root term, and a topic term(s). A category associated with the selections in the root term selection control 3115 and the topic term selection control(s) 3120 is indicated in the category indicator 3125. Any number of topic term selection controls such as the topic term selection controls 3120a and 3120b may be provided. The 'Save new category' button 3130 may be active when a category not indicated in the search system 1530 (FIG. 15) is present in the category indicator 3125. A category may be saved using the 'Save new category' button 3130. The viewing controls 3122 may be used to navigate within the root term selection control 3115, the topic term selection controls 3120, the category display window 3140 and the interest display window 3170.

The related category display window 3140 indicates information regarding categories which may be related to a category indicated in the category indicator 3125. For example, categories which are linked to or otherwise associated with the category displayed in the category indicator 3125 may be presented. Using the example illustrated in FIG. 31, a category indication, a number of registered guides, a number of available guides, a number of queries, and a number of guide interests are displayed.

The category filter controls 3135 may be used to apply a filter to information displayed in the category display window 3140. A start date may be selected using the filter control 3135a, and an end date may be selected using the filter control 3135b. The category selection indicators 3145 indicate whether a category indicated in the category display window 3140 has been selected. The category selection indicators 3145 may be toggled by, for example, clicking on the indicator. The category clear button 3165 clears any category selections indicated by the category selection indicators 3145. The category delete button 3160 deletes any categories selected as indicated by the category selection indicators 3145. Using the example in FIG. 31, activation of the delete category button 3160 would cause the category 'arts>music>jazz>1970s' to be deleted from being linked with the category 'arts>music>jazz' as indicated in the category selection indicator 3145b.

Figure 32:
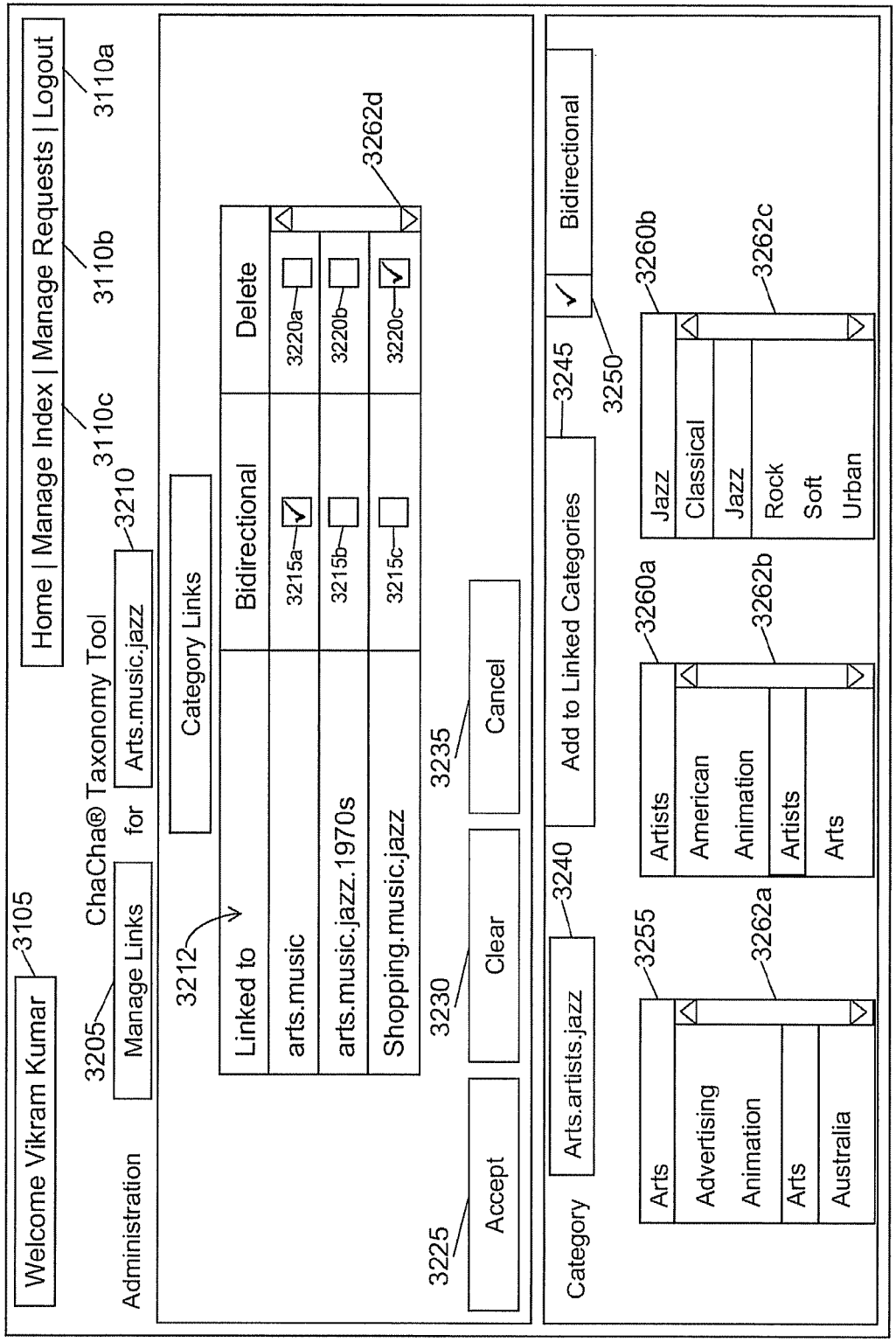
FIG. 32 illustrates a GUI.

Activation of the link management buttons 3150 may cause the GUI 3200 illustrated in FIG. 32 to be displayed. Activation of the prompts management buttons 3155 may cause the GUI 3300 illustrated in FIG. 33 to be displayed. Using the example in FIG. 31, activation of the link management button 3150a may cause the GUI 3200 to be provided for the category 'arts>music'. Likewise activation of the prompts management button 3155v may cause the GUI 3300 to be provided for the category 'shopping>music>jazz'.

The interest display window 3170 displays information of guide interests associated with a category which is indicated in the interest category indicator 3172. As illustrated in FIG. 31, information of guide interests which are associated with the category 'arts.music.jazz.1970s' are displayed in the interest display window 3170.

The interest selection indicators 3175 indicate whether an interest indicated in the interest display window 3170 has been selected. The interest selection indicators 3175 may be toggled by clicking on the indicator. The interest clear button 3185 clears any interest selections indicated by the interest selection indicators 3175. The interest delete button 3180 deletes any interests selected as indicated by the interest selection indicators 3175. Using the example in FIG. 31, activation of the delete interest button 3180 may cause the interest 'silviano monastieros' from being associated with the category 'arts>music>jazz>1970s'.

An exemplary graphical user interface to create and modify linkages associated with a category is illustrated in FIG. 32. The GUI 3200 may be used to view and modify information included in the search system 1530 (FIG. 15).

As illustrated in FIG. 32, the GUI 3200 may include a taxonomist/user identifier 3105, navigation controls 3110, a root term selection control 3255, topic term selection controls 3260, an added category indicator 3240, an 'Add to linked categories' button 3245, an added link direction selector 3250, an activity indicator 3205, a selected category indicator 3210, viewing controls 3262, a linked category display window 3212, link direction indicators 3215, link deletion indicators 3220, an 'Accept' button 3225, a 'Clear' button 3230, and a 'Cancel' button 3235.

The taxonomist/user identifier 3105 may include information associated with a user of the GUI 3200. For example, a login ID may be displayed in the taxonomist/user identifier 3105.

The navigation controls 3110 may be used to logon or logoff of the search system 1530 (FIG. 15). Activation of the login control 3110a may toggle between logged in and logged out of the system. The navigation controls 3110 may allow a user to navigate to other GUIs from the GUI 3200. For example, activation of the 'Manage Index' navigation control 3110c may cause the GUI 3200 to be presented, and activation of the 'Manage Requests' navigation control 3110b may cause the GUI 3400 to be presented.

The root term selection control 3255 and the topic term selection controls 3260 may be used to select a root term and a topic term(s). A category associated with the selections in the root term selection control 3255 and the topic term selection control(s) 3260 is indicated in the added category indicator 3240. Any number of topic term selection controls such as the topic term selection controls 3260a and 3260b may be provided. A category indicated in the added category indicator 3240 is reflected in the root term selection control 3255 and the topic term selection controls 3260. The 'Add to linked categories' button 3245 may be active when a category which is not linked to the category indicated in the selected category indicator 3210 is present in the added category indicator 3240, and may be saved using the 'Add to linked categories' button 3245. The viewing controls 3262 may be used to view items in the root term selection control 3255, topic term selection controls 3260, and the linked category display window 3212. The added link direction selector 3250 may be used to select the directionality of a link associated with a category indicated in the added category indicator 3240.

The linked category display window 3212 displays information associated with the category indicated in the selected category indicator 3210. The link direction indicators 3215 indicate whether a link is unidirectional or bidirectional. As previously explained with respect to FIG. 19, a link may be any type of function and may be directional as indicated in the exemplary categorization records 1800*a* and 1800*c*. The link deletion indicators 3220 may be used to delete a link between a category indicated in the selected category indicator 3210 and a category in the linked category display window 3212. For example, the presence of a check mark in the deletion indicator 3220 may cause a link to be deleted when the 'Accept' button 3225 is activated. The link deletion indicator 3220 may be toggled by clicking on the link deletion indicator 3220. The 'Accept' button 3225 records information obtained using the GUI 3200 when activated. The 'Clear' button 3230 (FIG. 32) clears any link direction indicators and/or link deletion indicators indicated in the linked category display window 3212 when activated. The 'Cancel' button 3235 discards any information obtained using the GUI 3300 without recording it when activated.

The activity indicator 3205 indicates an activity currently being performed using the GUI 3200. The activity indicator 3205 may be used to select additional activities using for example a drop-down list, which may allow navigation to other GUIs such as the GUI 3300 (FIG. 33).

Figure 33:
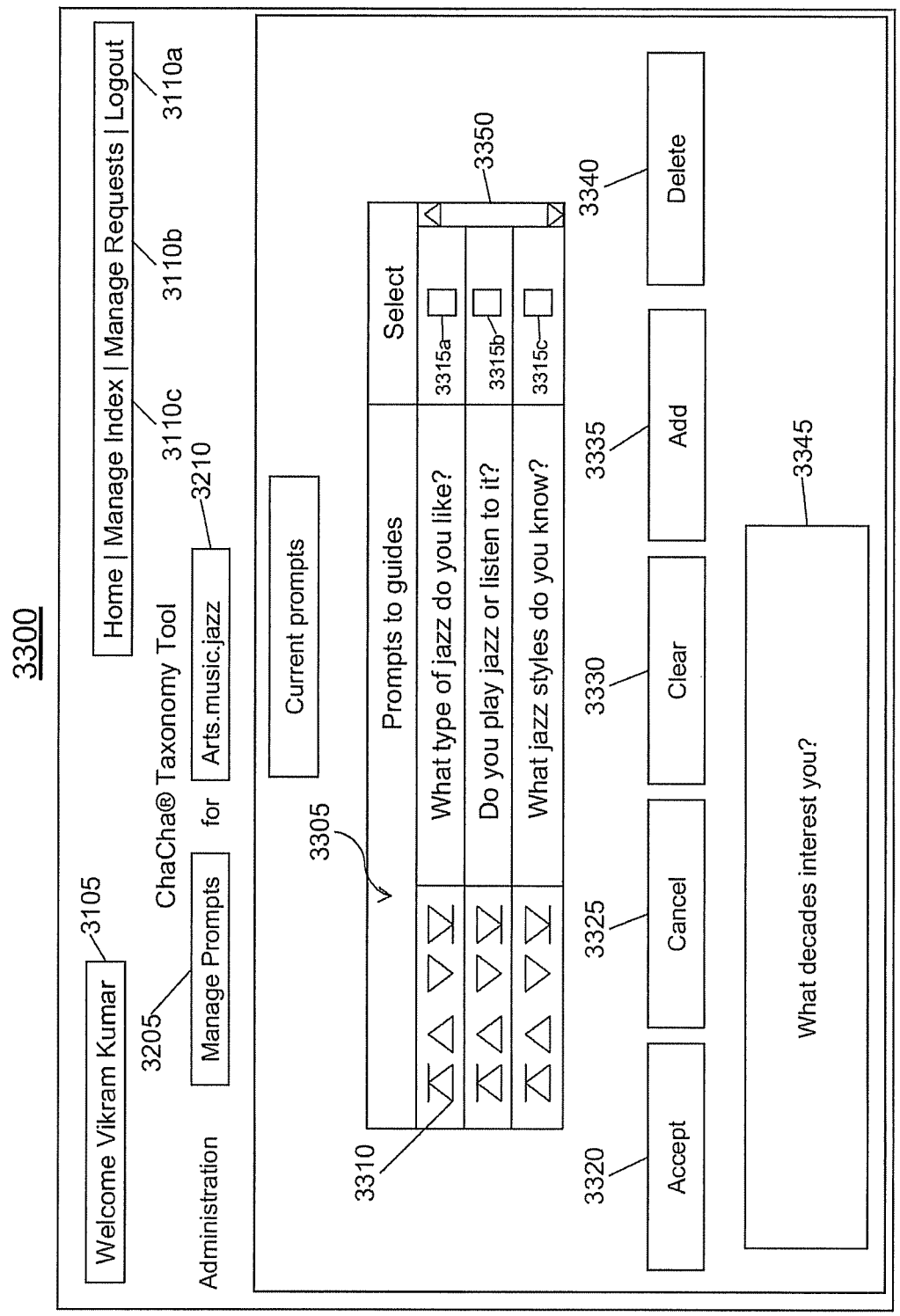
FIG. 33 illustrates a GUI.

An exemplary graphical user interface to create and modify prompts associated with a category is illustrated in FIG. 33. The GUI 3300 may be used to view and modify information associated with an index. A prompt(s) may be associated with a category in order that a guide who selects the category may be assisted in determining other categories and/or guide interests which may be selected and/or recommended to be added to an index.

As illustrated in FIG. 33, the GUI 3300 may include a taxonomist/user identifier 3105, navigation controls 3110, an activity indicator 3205, a selected category indicator 3210, a category prompt display window 3305, prompt ordering controls 3310, prompt selection indicators 3315, an 'Accept' button 3320, a 'Cancel' button 3325, a 'Clear' button 3330, an 'Add' button 3335, a 'Delete' button 3340, a prompt entry box 3345, and viewing controls 3350.

The taxonomist/user identifier 3105 may include information associated with a user of the GUI 3300. For example, a login may be displayed in the taxonomist/user identifier 3105.

The navigation controls 3110 may allow a user of the GUI 3300 to logon or logoff of the search system 1530 (FIG. 15). Activation of the login control 3110*a* may toggle between logged in and logged out of the system. The navigation controls 3110 allow a user to navigate to other GUIs from the GUI 3300. For example, activation of the 'Manage Index' navigation control 3110*c* may cause the GUI 3200 to be presented, and activation of the 'Manage Requests' navigation control 3110*b* may cause the GUI 3400 to be presented.

The activity indicator 3205 indicates an activity currently being performed using the GUI 3300. The activity indicator 3205 may be used to select additional activities using for example a drop-down list, which may allow navigation to other GUIs such as the GUI 3200 (FIG. 32). The selected category indicator 3210 indicates a category associated with prompts indicated in the category prompt display window 3305. The prompt ordering controls 3310 may be used to move a prompt to a different location in the category prompt display window 3305. Prompts may be presented to a based on the order indicated in the category prompt display window 3305.

The prompt selection indicators 3315 may be used to select a prompt associated with a category indicated in the selected category indicator 3210. For example, the presence of a check mark in the selection indicator 3315 causes a prompt to be deleted from the category prompt display window 3305 when the 'Delete' button 3340 is activated. The prompt selection indicators 3315 may be toggled by clicking on the prompt selection indicators 3315.

The prompt entry box 3345 may be used to provide text for a new. If prompt text is present in the prompt entry box 3345, it may be added to the category prompt display window 3305 by activating the 'Add' button 3335. The 'Clear' button 3330 clears the prompt selection indicators 3315 when activated.

The 'Accept' button 3320 records information obtained using the GUI 3300 when activated. The 'Cancel' button 3325 discards any information obtained using the GUI 3300 without recording it when activated. The viewing controls 3350 allow viewing of items in the category prompt display window 3305.

Figure 34:
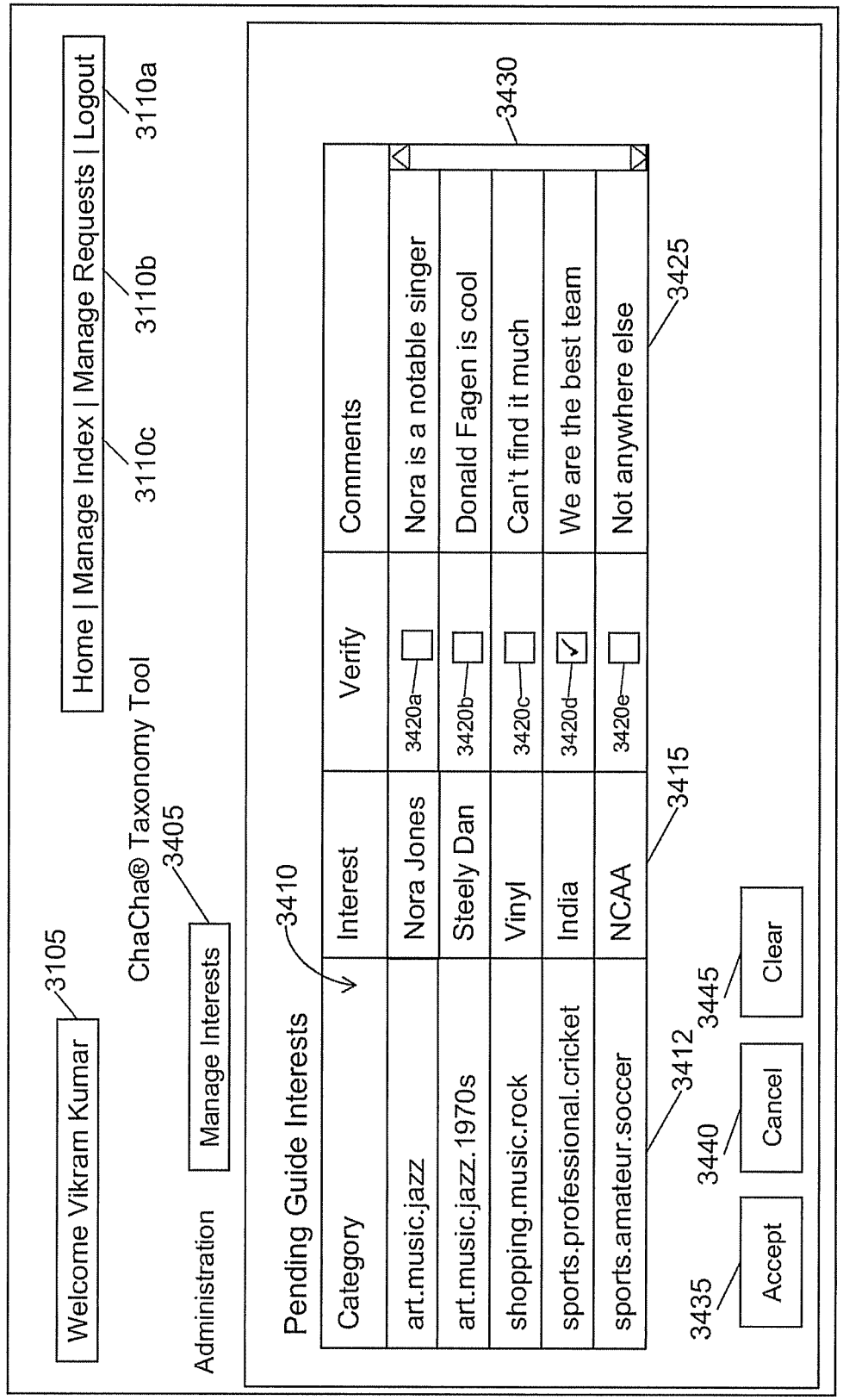
FIG. 34 illustrates a GUI.

An exemplary graphical user interface to review guide interests to be associated with a category is illustrated in FIG. 34. The GUI 3400 may be used to view and modify information of an index. In at least one embodiment, a guide interest (s) may be recommended to be associated with a category by a guide(s), a taxonomist(s) and/or a user(s).

As illustrated in FIG. 34, the GUI 3400 may include a taxonomist/user identifier 3105, navigation controls 3110, an activity indicator 3405, an interest display window 3410, category indicators 3412, interest indicators 3415, opinion indicators 3420, a comment indicator 3425, viewing controls 3430, an 'Accept' button 3435, a 'Cancel' button 3440, and a 'Clear' button 3445.

The taxonomist/user identifier 3105 may include information associated with a user of the GUI 3400. For example a login ID may be displayed in the taxonomist/user identifier 3105.

The navigation controls 3110 may allow a user of the GUI 3400 to logon or logoff of the search system 1530 (FIG. 15). Activation of the login control 3110*a* may toggle between logged in and logged out of the system. The navigation controls 3110 allow a user to navigate to other GUIs from the GUI 3400. For example, activation of the 'Manage Index' navigation control 3110*c* may cause the GUI 3200 to be presented, and activation of the 'Manage Requests' navigation control 3110*b* may cause the GUI 3400 to be presented.

The activity indicator 3405 indicates an activity currently being performed using the GUI 3400. The activity indicator 3405 may be used to select additional activities using for example a drop-down list, which may allow navigation to other GUIs such as the GUI 3500 (FIG. 35).

The interest display window 3410 presents information associated with guide interests which are to be reviewed to be associated with a category. The category indicators 3412 indicate a category associated with a guide interest indicated in the guide interest indicators 3415. The opinion indicators 3420 may be used to provide information of an opinion regarding an interest by activating an opinion indicator 3420. For example, the check mark in the opinion indicator 3420*d* may indicate that a user has verified that the interest 'India' should be associated with the category 'sports>professional>cricket', The comment indicators 3425 may provide information submitted by a person recommending an interest to be added to a category.

The 'Clear' button 3445 clears the opinion indicators 3420 when activated. The 'Accept' button 3435 records information obtained using the GUI when activated. The 'Cancel' button 3440 discards any information obtained using the GUI 3400 without recording it when activated. The viewing controls 3430 allow viewing of items in the interest display window 3410.

An exemplary graphical user interface to review categories and/or topics is illustrated in FIG. 35. The GUI 3500 may be used to view and modify information of an index). In at least one embodiment, a category and/or topic may be recommended a guide(s), a taxonomist(s) and/or a user(s).

As illustrated in FIG. 35, the GUI 3500 may include a taxonomist/user identifier 3105, navigation controls 3110, an activity indicator 3505, a category/topic display window 3510, category indicators 3512, topic indicators 3515, opinion indicators 3520, comment indicators 3525, viewing controls 3530, an 'Accept' button 3535, a 'Cancel' button 3540, and a 'Clear' button 3545.

The taxonomist/user identifier 3105 may include information associated with a user of the GUI 3500. For example, a login ID may be displayed in the taxonomist/user identifier 3105.

The navigation controls 3110 may allow a user of the GUI 3500 to logon or logoff of the search system 1530 (FIG. 15). Activation of the login control 3110a may toggle between logged in and logged out of the system. The navigation controls 3110 allow a user to navigate to other GUIs from the GUI 3500. For example, activation of the 'Manage Index' navigation control 3110c may cause the GUI 3200 to be presented, and activation of the 'Manage Requests' navigation control 3110b may cause the GUI 3400 to be presented.

The activity indicator 3505 indicates an activity currently being performed using the GUI 3500. The activity indicator 3505 may be used to select additional activities using for example a drop-down list, which may allow navigation to other GUIs such as the GUI 3400 (FIG. 34).

The category/topic display window 3510 presents information associated with categories and/or topics which are to be reviewed. The category indicators 3512 indicate a category (ies). The topic indicators 3515 indicate a topic(s). The opinion indicators 3520 may be used to provide information of an opinion regarding a topic and/or category by activating the related opinion indicator. For example, the check mark in the opinion indicator 3520d may indicate theta the category 'sports.poker.professional' has been identified as a category which may be added with the 'Accept' button 3535. The comment indicators 3525 may contain information submitted by a person recommending a category and/or topic to be added to an index. The 'Clear' button 3545 clears the opinion indicators 3520 when activated. Any combination of new topics and/or categorizations may be indicated in the category/topic display window 3510. Using the example in FIG. 35, the underline in the category indicators 3512 indicates existing topic terms which are added to a category to form a new category or proper path. The topic indicator 3515 indicates a new topic term which is to be added to the index.

The 'Accept' button 3535 records information obtained using the GUI 3500 when activated. The 'Cancel' button 3540 discards any information obtained using the GUI 3500 without recording it when activated. The viewing controls 3530 allow viewing of items in the category/topic display window 3510.

Figure 36:
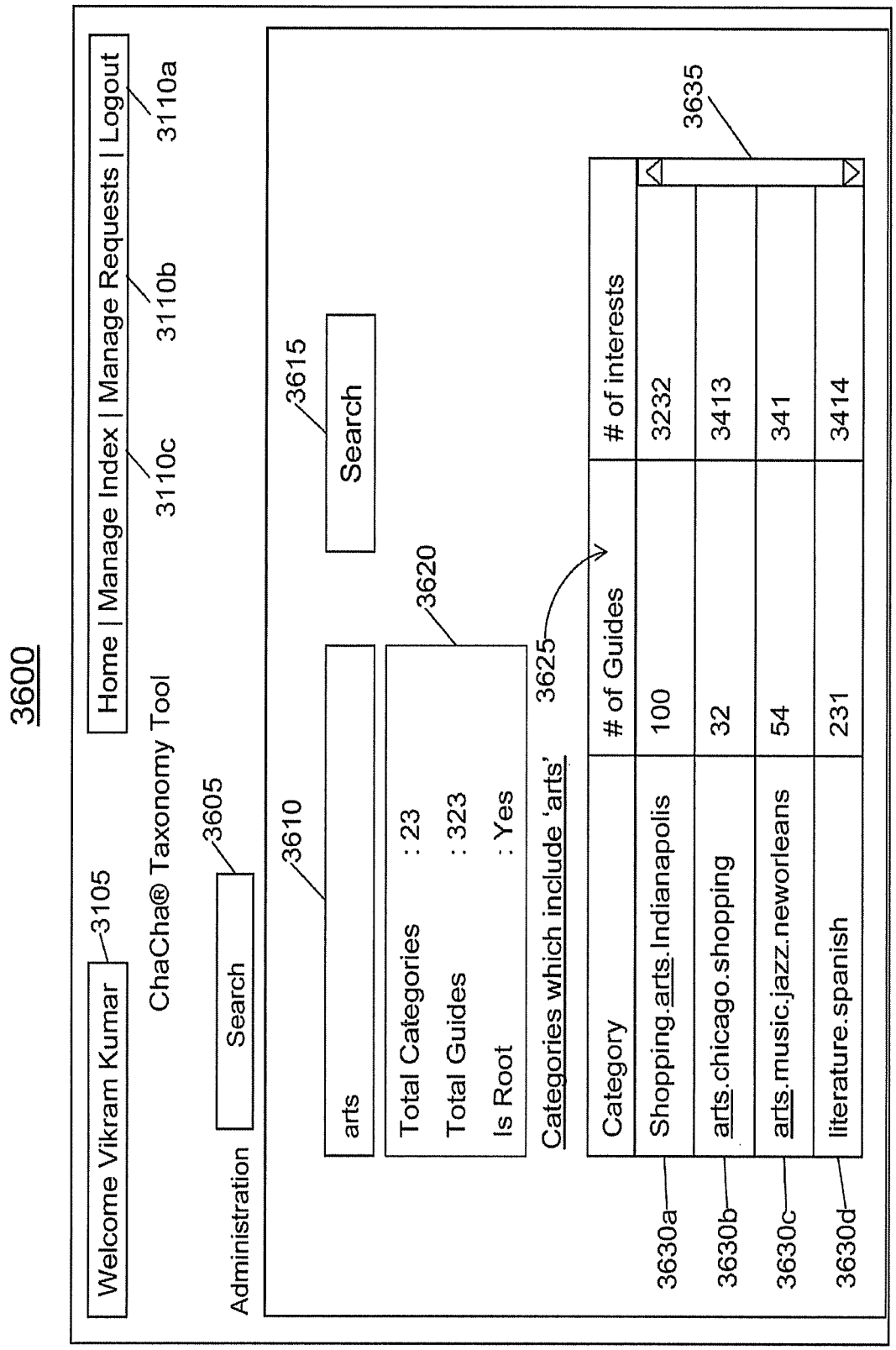
FIG. 36 illustrates a GUI.

An exemplary graphical user interface to locate topic terms and/or guide interests is illustrated in FIG. 36. The GUI 3600 may be used to locate information included in the search system 1530 (FIG. 15). The GUI 3600 is presented if the activity indicator 3605 is set to 'Search'.

As illustrated in FIG. 36, the GUI 3600 may include a taxonomist/user identifier 3105, navigation controls 3110, an activity indicator 3605, a search box 3610, a search button 3615, an index statistics window 3620, a category display window 3625, a category indicator controls 3630 and viewing controls 3635.

The taxonomist/user identifier 3105 may include information associated with a user of the GUI 3600. For example, a login may be displayed in the taxonomist/user identifier 3105.

The navigation controls 3110 may allow a user of the GUI 3600 to logon or logoff of the search system 1530 (FIG. 15). Activation of the login control 3110a may toggle between logged in and logged out of the system. The navigation controls 3110 allow a user to navigate to other GUIs from the GUI 3600. For example, activation of the 'Manage Index' navigation control 3110c may cause the GUI 3200 to be presented, and activation of the 'Manage Requests' navigation control 3110b may cause the GUI 3400 to be presented.

The activity indicator 3605 indicates an activity currently being performed using the GUI 3600. The activity indicator 3605 may be used to select additional activities using for example a drop-down list, which may allow navigation to other GUIs such as the GUI 3400 (FIG. 34).

The search box 3610 may be used to provide a search string which is to be located in an index. The search button 3615 may be used to initiate a search for the string indicated in the search box 3610 when activated. The index statistics window 3620 indicates information regarding categories which may be associated with results of a search for a string entered in the search box 3610. Using the example in FIG. 36, information of a number of guides and a number of categories and whether a term is a path root term related to the search string 'arts' are displayed. Other types of information, such as a number of guide topics, etc. may also be displayed in the index statistics window 3620.

The category display window 3625 presents information regarding categories located as a result of a search for information entered in search box 3610. The category display window 3625 indicates a number of guides and a number of interests associated with any categories displayed.

The category indicator controls 3630 indicate information regarding how a category was located. For example, a topic term may be underlined, bold, colored, or otherwise indicated. If a search string is matched to a guide interest, the absence of an indication of a topic term in a category indicates that the search string has matched a guide interest associated with the category indicated in the category indicator controls 3630. For example, the category indicators 3630a, 3630b and 3630c contain the word 'arts' as indicated by underline, while the category indicator 3630d indicates that 'arts' is a guide interest associated with the category 'literature.spanish'. Activation of a category indicator control 3630 causes the GUI 3100 (FIG. 31) to be presented with the category indicated in the category indicator 3630 (FIG. 36) in the category indicator 3125 (FIG. 31).

While the GUI 3600 has been illustrated using a search of an index of guide interests, a similar search might be conducted to locate other information associated with an index such as advertisements, guides, resources, profiles, etc.

Using the embodiments described herein, a user may submit a request(s) to a human-assisted search system, which may be associated with a condition which may cause an information search to be performed responsive to the request. A result may be provided to a user(s) based on a request associated with a condition using any or all communication services associated with a user(s). A condition associated with a request or 'trigger condition' may be any condition which is identified by a user and/or a guide(s). A guide(s) may perform an information search in order to determine whether a condition associated with a request is met. A result(s) may be provided to a user(s) using any communication service such as a messaging service (SMS, MMS, EMS, voice messaging, etc.), email, Instant Messaging (IM), a web service, regular mail, etc. In particular, a text or IM alert regarding a request and/or a result may be provided to a user(s) when a result is obtained responsive to a request associated with a condition. An alert(s) may be delivered to a user(s), and a user may create a request responsive to the alert(s). A guide(s) and/or other information may be selected responsive to a request associated with an alert(s) based at least in part on the content of the alert(s).

A database of resources may be provided which may assist a guide and/or a user to identify and/or monitor a trigger condition(s). A database of communication information associated with a user(s), a guide(s) and/or a resource(s) is utilized to allow a communication session(s) to be established between a user(s), a guide(s) and/or a resource(s). Communication may be enabled between any user system, guide system, and/or resource system which may include a desktop, laptop, server, or other computer, a mobile phone, a landline phone, a PDA, a smart phone, or any other device which may be used to submit a request to the search system 130 and/or receive a response. One or more user systems, guide systems, resource systems and/or devices may be utilized to obtain information of a user request and/or to provide a response and/or a connection to a resource(s).

A guide may be assigned to a request based on criteria determined by the search system 130. A guide may transfer a user request to a different guide.

A guide(s), a result(s), a user(s), a resource(s) and/or other item(s) may be associated with a database indicated in the search database 120. A guide(s), a result(s), a resource(s), a request(s), an advertisement(s) and/or other items may be selected based on information associated with a request and/or an item(s)

Rating(s) of a guide(s), a result(s), a resource(s), an advertisement(s), etc. may be obtained. A rating(s) of a guide(s), a result(s), a resource(s), a request(s), an advertisement(s) or other item(s) may be recorded and utilized to select a guide (s), a result(s), a resource(s), a user(s), a request(s), etc.

Using the embodiments described herein, an index of information is created which may be utilized to select a guide (s) and/or other item(s). Each node in an index is described by one or more topic terms, which may be words and/or phrases. Each node description or category may begin with a group of terms, which may be limited in number, and are referred to as path root terms. An index is created which includes linkages between the nodes which may be described by functions which are used to modify a rating(s) of information associated with the index. A human administrator or taxonomist may review node descriptions or categories and information associated with an index, and may add, modify, and/or delete linkages within the index. GUIs and other tools are provided to a assist a user, a guide, and a taxonomist to review and/or modify the index of information. A taxonomist may review additions to an index recommended by guides and/or users. One or more persons may be allowed to determine whether a new category, a new topic term, a new path root term, and/or a new guide interest is to be added to an index.

An index created using the methods and systems described herein may be utilized to select a guide(s), an advertisement (s), a search resource(s), a search result(s), and/or other information using a ranking based at least in part on one or more categories associated with a target item(s) such as a search request. Human judgment is used at least in part to determine links within an index, which may improve selection of guide (s) and/or other information.

The present invention may be implemented using a program stored, for example, in a computer-readable storage medium such as a CD-ROM, etc., or using one or more specialized terminals, devices or systems that is enabled to execute operation(s) described herein.

The many features and advantages of the invention are apparent from the detailed specification and, thus, it is intended by the appended claims to cover all such features and advantages of the invention that fall within the true spirit and scope of the invention. Further, since numerous modifications and changes will be readily perceived by those of ordinary skill in the art, it is not desired to limit the invention to the exact construction and operation illustrated and described, and accordingly all suitable modifications and equivalents may be resorted to while falling within the scope of the invention.

What is claimed is:

1. A method for providing access to information, comprising:
   obtaining a request of a user;
   selecting, by a hardware system, a human assistant other than the user based on content of the request;
   selecting a resource based on a keyword of the request;
   providing the request and an indication of the resource to the human assistant;
   directing an indication of historical information of requests and responses of human assistants to the requests to the human assistant;
   including information provided by the resource responsive to historical requests with the indication;
   defining a trigger based on a response of the selected human assistant to the indication; and
   performing an action determined based on the response when the trigger occurs.

2. The method of claim 1, wherein the human assistant defines at least in part the action.

3. The method of claim 1, wherein the resource is selected based on a keyword used to direct the request to a human guide.

4. The method of claim 1, wherein the request is based at least in part on a message received from the user.

5. The method of claim 1, wherein the action includes transmitting a message including a search result obtained by submitting the request to a destination selected by a human guide other than the user and the destination is selected by the human guide before the trigger occurs.

6. The method of claim 4, wherein the action is determined based on a communication service chosen by the user.

7. The method of claim 4, wherein the resource is provided to the human assistant based on a ranking of the resource based on at least one of a keyword, a category or a profile associated with the request and the resource provides the trigger.

8. The method of claim 1, comprising:
   defining the action at least in part by the human assistant;
   defining the trigger at least in part by the human assistant;
   providing historical information of a plurality of human assistants of the user and the resource to the human assistant;
   selecting the historical information based on one of a keyword, a category and a profile associated with the request;

qualifying by the human assistant the request;
determining by the human assistant whether the trigger has occurred based on information provided by the resource while the trigger is pending; and
transmitting a message including a response of the human assistant to a device of the user responsive to the trigger.

9. The method of claim 4, wherein the request is selected by the human assistant from a plurality of previous requests to which human assistants responded.

10. The method of claim 1, comprising:
determining whether a condition has occurred; and
defining by the human assistant the action based on the request and the condition.

11. A system, comprising:
a user device submitting a request defined by a user; and
a search service device receiving the request, selecting a human guide other than the user to respond to the request, defining a trigger which requires a condition to occur, determining whether the trigger occurs based on an action of the human guide responsive to an indicator provided to the human guide when the condition occurs, presenting the indicator comprising historical information of requests and responses of human guides to the requests to the human guide when the condition occurs, selecting the resource and the historical information based on a keyword of the request, obtaining a response by submitting the request to a destination selected by a human assistant based on historical information of requests of the user, defining the trigger based on the destination and providing the response to the user responsive to an occurrence of the trigger.

12. The system of claim 11 comprising;
a guide device defining at least in part the trigger or the request; and
a database storing information pertaining to at least the request, the trigger or the user.

13. A non-transitory computer readable storage medium storing therein an instruction causing a computer to execute an operation including providing access to information, comprising:
receiving a request of a user;
selecting a human guide other than the user to respond to the request;
selecting a resource based on a keyword of the request;
providing to the human guide an indicator including information delivered by the resource comprising historical information of requests and responses of human guides to the requests;
formulating a trigger for the request based on a response of the human guide to the indicator; and
responding to the request by performing an action determined based on the response and the resource when determining that the trigger occurs.

14. The computer readable medium of claim 13, wherein the response to the request is information obtained by a human searcher selected by the trigger.

15. The computer readable medium of claim 14, wherein the request is received based on historical information of a person other than the user and the human guide.

16. The computer readable medium of claim 13, wherein the human guide formulates the trigger by choosing a future status of the resource as a portion of the trigger.

17. The computer readable medium of claim 13, wherein the human guide formulates a query and a different trigger based on the request and the query and the different trigger are used to respond to subsequent requests.

18. The computer readable medium of claim 13, wherein an advertisement is transmitted subsequent to the formulating, and the responding includes transmitting at least one advertisement.

19. The computer readable medium of claim 13, wherein the formulating, and the determining are assisted by the human guide.

20. The computer readable medium of claim 19 comprising:
providing at least a portion of the request, the resource, and a notification of an occurrence of a criterion preceding the trigger to the human guide;
selecting by the human guide a qualified query, the resource, an answer and an advertisement; and
the responding comprising providing the answer and the advertisement.

* * * * *